United States Patent [19]

Williamson

[11] Patent Number: 4,621,410
[45] Date of Patent: Nov. 11, 1986

[54] AUTOMATED MACHINE INSTALLATION AND METHOD

[75] Inventor: David T. N. Williamson, London, England

[73] Assignees: Molins PLC, London, England; John C. Smith, Jr., Arlington, Va.

[21] Appl. No.: 429,918

[22] Filed: Sep. 30, 1982

Related U.S. Application Data

[60] Division of Ser. No. 85,289, Oct. 29, 1970, Pat. No. 4,369,563, which is a continuation of Ser. No. 695,817, Dec. 4, 1967, abandoned, which is a continuation-in-part of Ser. No. 636,993, May 8, 1967, abandoned, and a continuation-in-part of Ser. No. 578,318, Sep. 9, 1966, abandoned.

[30] Foreign Application Priority Data

Sep. 13, 1965 [GB] United Kingdom ............... 38937/65
May 12, 1966 [GB] United Kingdom ............... 21223/66
Mar. 15, 1967 [GB] United Kingdom ............... 12196/67
May 5, 1967 [GB] United Kingdom ............... 21109/67

[51] Int. Cl.⁴ ............................................. B23Q 3/157
[52] U.S. Cl. ........................................ 29/568; 29/563; 29/564; 414/279
[58] Field of Search ...................... 29/568, 26 A, 33 P, 29/563, 564, 33 R, 33.12; 414/279; 198/19, 38

[56] References Cited

U.S. PATENT DOCUMENTS

| Re. 25,886 | 10/1965 | Cargill . | |
|---|---|---|---|
| Re. 26,770 | 1/1970 | Lemelson | 29/33 |
| 2,803,333 | 8/1957 | Freeman . | |
| 2,903,120 | 9/1959 | Thomas . | |
| 2,986,261 | 5/1961 | Wenstrand . | |
| 2,988,237 | 6/1961 | Devol, Jr. . | |
| 2,997,154 | 8/1961 | Lahm et al. . | |
| 3,010,371 | 11/1961 | Riepel et al. | 29/563 X |
| 3,027,022 | 3/1962 | Peras . | |
| 3,049,247 | 8/1962 | Lemelson . | |
| 3,052,999 | 9/1962 | Sedgwick et al. . | |
| 3,054,333 | 9/1962 | Brainard et al. . | |
| 3,071,262 | 1/1963 | Bosch et al. . | |
| 3,099,873 | 8/1963 | Braynard et al. | 29/568 |

(List continued on next page.)

FOREIGN PATENT DOCUMENTS

| 236739 | 11/1964 | Austria . |
|---|---|---|
| 620478 | 5/1961 | Canada . |
| 700318 | 12/1964 | Canada . |
| 732925 | 4/1966 | Canada . |
| 566008 | 11/1932 | Fed. Rep. of Germany . |
| 839476 | 4/1952 | Fed. Rep. of Germany . |
| 1062177 | 1/1960 | Fed. Rep. of Germany . |
| 1076558 | 2/1960 | Fed. Rep. of Germany . |
| 1099306 | 2/1961 | Fed. Rep. of Germany . |
| 1141231 | 12/1962 | Fed. Rep. of Germany . |

(List continued on next page.)

OTHER PUBLICATIONS

Fehse, Wirtschaftlicher Einsatz von Drehmaschinen in der Einzel under kleinen Reihenfertigung und die Voraussentzungen hierfür, KLEPZIG FACHBERICHTE, No. 3, Mar. 1961.
"Multiple Computer System Controls Mfg. Line" *Control Engineering* Dec. 1964, pp. 83–92.
"IBM Buys Its Own Sales Pitch", BUSINESS WEEK, Oct. 30, 1965 (pp. 140–156).
"A Step Toward 'the Automatic Factory'" *Production* Jul. 1965, pp. 75–79.

(List continued on next page.)

*Primary Examiner*—William R. Briggs
*Attorney, Agent, or Firm*—John C. Smith, Jr.

[57] ABSTRACT

A system comprising a plurality of complementary numerically controlled machine tools in which different work-pieces are each subjected to appropriate selected machining operations on selected machine tools in a selected order by appropriate delivery of common form pallets loaded with the workpieces. Transporters deliver pallets between the machine tools, a storage rack, and work-setting stations where work-pieces, automatically delivered in bins from a bin store, are loaded on pallets. Tool magazines are delivered between a rack and the machine tools by a transporter. Transport and machining operations are computer controled, and monitors feed back signals indicative of location of pallets, tool magazines, and bins in the system.

244 Claims, 33 Drawing Figures

U.S. PATENT DOCUMENTS

| | | |
|---|---|---|
| 3,113,404 | 10/1963 | Narel et al. |
| 3,119,501 | 1/1964 | Lemelson |
| 3,155,217 | 11/1964 | Cross |
| 3,171,327 | 3/1965 | Williamson |
| 3,188,736 | 6/1965 | Brainard et al. |
| 3,204,492 | 9/1965 | Spreen |
| 3,211,060 | 10/1965 | McCann |
| 3,225,439 | 12/1965 | Perry et al. |
| 3,242,568 | 8/1966 | Flannery et al. |
| 3,245,144 | 4/1966 | Kumagai ............................ 29/568 |
| 3,256,600 | 6/1966 | Swanson et al. |
| 3,271,840 | 9/1966 | Solski |
| 3,286,595 | 11/1966 | Wollenhaupt ........................ 29/568 |
| 3,313,014 | 4/1967 | Lemelson |
| 3,339,273 | 9/1967 | Knosp |
| 3,355,797 | 12/1967 | Lohneis |
| 3,519,151 | 7/1970 | Lemelson |
| 3,543,392 | 12/1970 | Perry et al. |
| 3,576,540 | 4/1971 | Fair |
| 3,709,623 | 1/1973 | Stephan et al. ................... 29/568 |
| 3,854,889 | 12/1974 | Lemelson |
| 4,309,600 | 1/1980 | Perry et al. |

FOREIGN PATENT DOCUMENTS

| | | |
|---|---|---|
| 1098924 | 3/1955 | France |
| 1362309 | 10/1964 | France |
| 1401446 | 4/1965 | France |
| 1387173 | 6/1965 | France |
| 1447806 | 6/1966 | France |
| 365602 | 12/1962 | Switzerland |
| 399130 | 3/1966 | Switzerland |
| 404617 | 1/1934 | United Kingdom |
| 729687 | 5/1955 | United Kingdom |
| 841400 | 7/1960 | United Kingdom |
| 846388 | 8/1960 | United Kingdom |
| 923369 | 4/1963 | United Kingdom |
| 948181 | 1/1964 | United Kingdom |
| 955715 | 4/1964 | United Kingdom |
| 981571 | 1/1965 | United Kingdom |
| 996862 | 6/1965 | United Kingdom |
| 1035197 | 7/1966 | United Kingdom |
| 1039819 | 8/1966 | United Kingdom |

OTHER PUBLICATIONS

"Advanced Methods Used in Creating Computer Microcircuits", AUTOMATION, Jan. 1966 (pp. 84-89).
"On Line Computers Control Circuit Production" *Machinery* Dec. 1965, pp. 91-95.
"Future Marriage of N/C and Computer Control", Julian E. Wilburn, AUTOMATION, Jan. 1966, pp. 78-82.
"Automation Comes to Turbine Blade Machining" *American Machinist* Dec. 1963, pp. 97-102.
"Computer-Controlled Manufacturing Line", T. C. Ainslie and J. J. Steranko, AUTOMATION, Jan. 1967, pp. 66-74.
DeGroat, George H.—Metalworking Automation, 1962 (pp. 3-6).
"From Design to Finished Product," BUSINESS WEEK, Dec. 30, 1967 (pp. 88-90).
"Machines Lines for Stepped Shaft", 1968 (Russian Translation).
"Systems Approach to Manufacturing", A. H. Johnson, AUTOMATION, May 1965 (pp. 72-75).
Boitsov, V. V., "Mechanization and Automation Methods in Small and Large Batch Manufacture" (pp. 20-26).
"Tracing Printed Circuit Patterns by N/C Optical Techniques" by Gerald F. Rollo, AUTOMATION, Apr. 1966 (pp. 77-79).
Spizig, J., "Elastische Automatisierung mit Fertigungsketten", Werkstatt und Betrieb, 1957, Heft 5 (Translation) (pp. 290-292).
"Computer Speeds Materials Flow", AMERICAN MACHINIST, Nov. 8, 1965 (p. 81).
Goebel, H., "Relationship Between Operating and Loading Times for Machine Tools", Werkstatt und Betrieb, 1956, Heft 5 (p. 234) (Translation).
"Elektrische Auslegung einer Sortiersteurerung füf eine Transferstrasse", Mohme, T2 f.prakt. METALLBEARD., 57 Jahrgang 1963, Heft 9.
"Special Automatic Lines Consisting of Machine Tools with Programmed Control" (pp. 260-266 from Russian Book) (Translation).
Yu and Amann, "Numerically Controlled Machining Used to Fabricate Experimental Turbomachinery Components", General Motors Engineering Journal, First Quarter 1964 (pp. 10-16).
Evanson et al, "Applied Principles of Automation", Tool Engineers Handbook, 2nd Ed., 1959 (Section 10).
Schütte, A. H., "Automation for Small Machines", Jul. 1962, No. 11.
Kohrung, "Fundamentals of Systems for the Numeric Control" (pp. 38-39) (Translation) Grundlagen und Praxis numerisch gesteuerter Werkzeungmaschinen (1966).
Kohrung, "Automatic Changing of Workpieces and Tools", Grundlagen und Praxis numerisch gesteuerter Werkzeungmaschinen, 1966 (pp. 146-151) (Translation).
Japan, Toyota Technical Report, vol. 5, No. 1, 1964, "15 Head 18 Shaft Transfer Machine" (Translation).
"Punched-Tape Units Control New Type Transfer Line", The Iron Age, Mar. 20, 1958 (pp. 106-108).
"Multiple-Purpose Transfer Machines Offer Flexibility", Machinery, Apr. 1959 (pp. 121-125).
"N/C Comes to the Transfer Line", American Machinist/Metalworking Manufacturing, Jul. 8, 1963 (pp. 76-77).
Wagenseil, William, Highes aircraft Co., "The Line that Made Headlines", American Machinist, May 5, 1958, (pp. 107-109).
Diebold, John, "Die Automatische Fabrik", Published 1954 by Nest-Verlag, Nurnberg (pp. 92-115).
Montanus, "Complete Package Approach to Production Equipment", Automation, Apr. 1965 (pp. 99-109).
Wagenseil, W., "America's First Tape-Controlled Production Line", Metalworking Production, Jun. 13, 1958 (pp. 1039-1042).
Cornely, H. (Stuttgart), "The Coupling of Conventional Machine Tools into a Production Line", Industrie Anzeiger, Essen, No. 72, Sep. 7, 1962 (pp. 138-139).
Kunster (München), "Stetigförderer und Arbeitsgruppen zur Beschleunigung des Teileumlaufs in der Einzelfertigung", Werkstattstechnik, 1963, Heft 5 (pp. 226-228).
Vitoux, "Beispiele von Einrichtungen zur Fertigung mittlerer Stückzahlen", VDI-Berichte, No. 43, 1960 (pp. 46-49, 54-58).
Moll, Entwicklungstendenzen der Fertigungstechnik", Werkstattstechnik, Jul. 1961, Heft 7 (pp. 331-335).

OTHER PUBLICATIONS

Industrie-Anzeiger, Essen, Aug. 6, 1965, No. 63 (p. 1506, 141-142).

Tönshoff, (Hanover), "Entwicklungsphasen der Automatisierung bis zur digitalen Prozesssteuerung", Automatisierung, Apr. 1964 (pp 13-14).

Fordern und Heben, 1966, Heft 11 (pp. 892-894).

Schnellpressenfabrik AG Heidelberg, Bestellung Nr./902 (W 64-36/5) Jun. 15, 1964 (7 pages).

Aufstellungsplan Gr I (1 page).

Steeger, "Automatisierung der Werkzeugmaschinen als Ziel der Fertigungstechnik", Industrie-Anzeiger, Essen, Jun. 15, 1956 (pp. 41-48).

"Organisation eines neuzeitlichen Lagerbetriebes", Industrie-Anzeiger, Essen, Jul. 27, 1965 (pp 1386-1387).

"Die Aufgaben der Mess- und Regelungstechnik im Rahmen der industriellen Produktion", Industrie-Anzeiger, Essen, Sep. 24, 1965 (pp. 75-81).

Fehse, "Wirtschaftliche Grenzen beim Einstaz automatischer Drehmaschinen verschiedener Entwicklungsstufen, Machinenmarkt, Sep. 7, 1962 (pp. 31-37).

Goebel, "Einige markante Beispiele zum heutigen Entwicklungsstand von Sondermaschinen und Transferstrassen", TZ F. Prakt. Metallbearb., 1963, Heft 9.

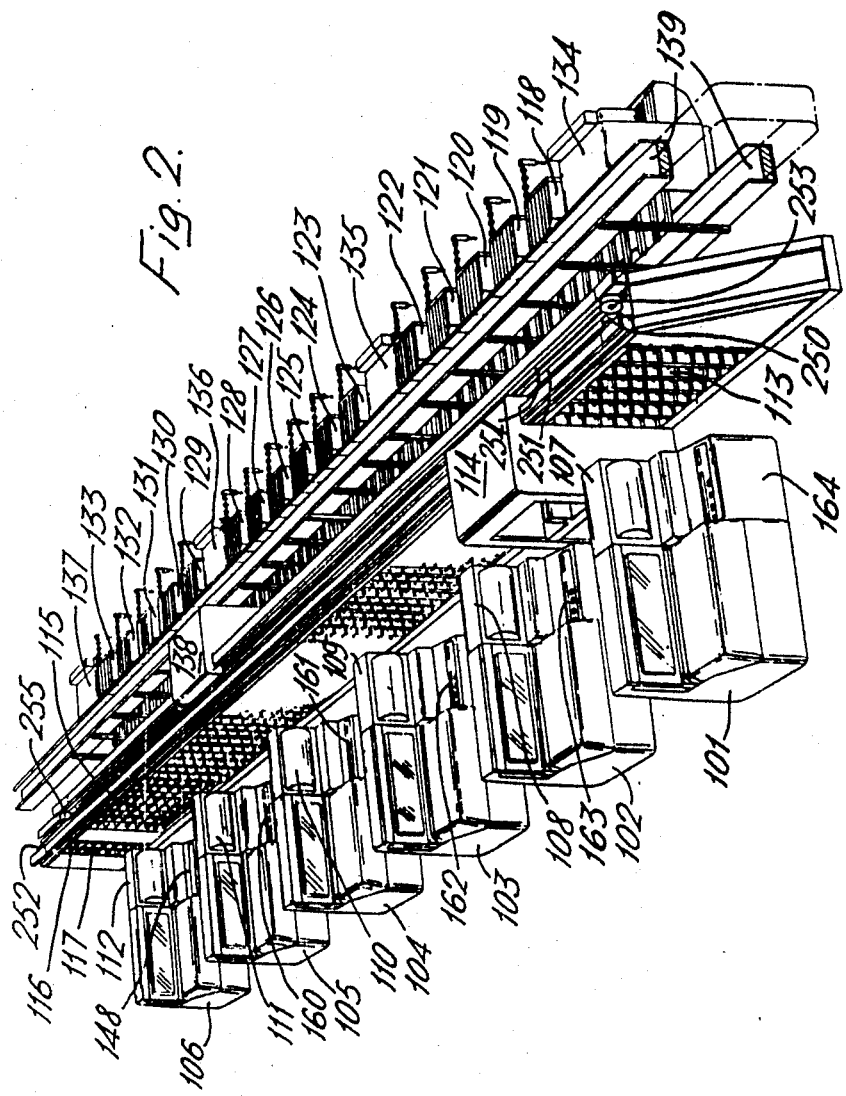

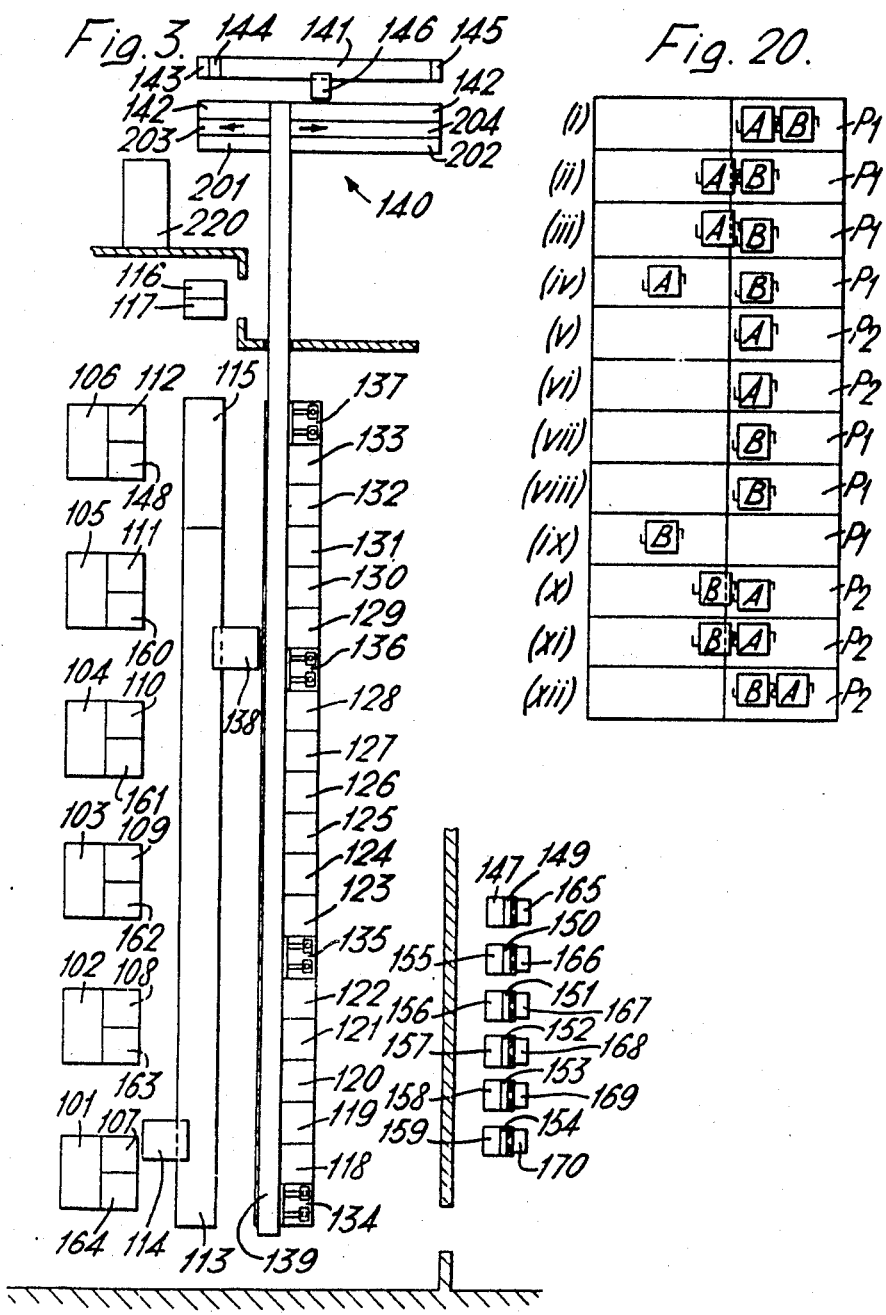

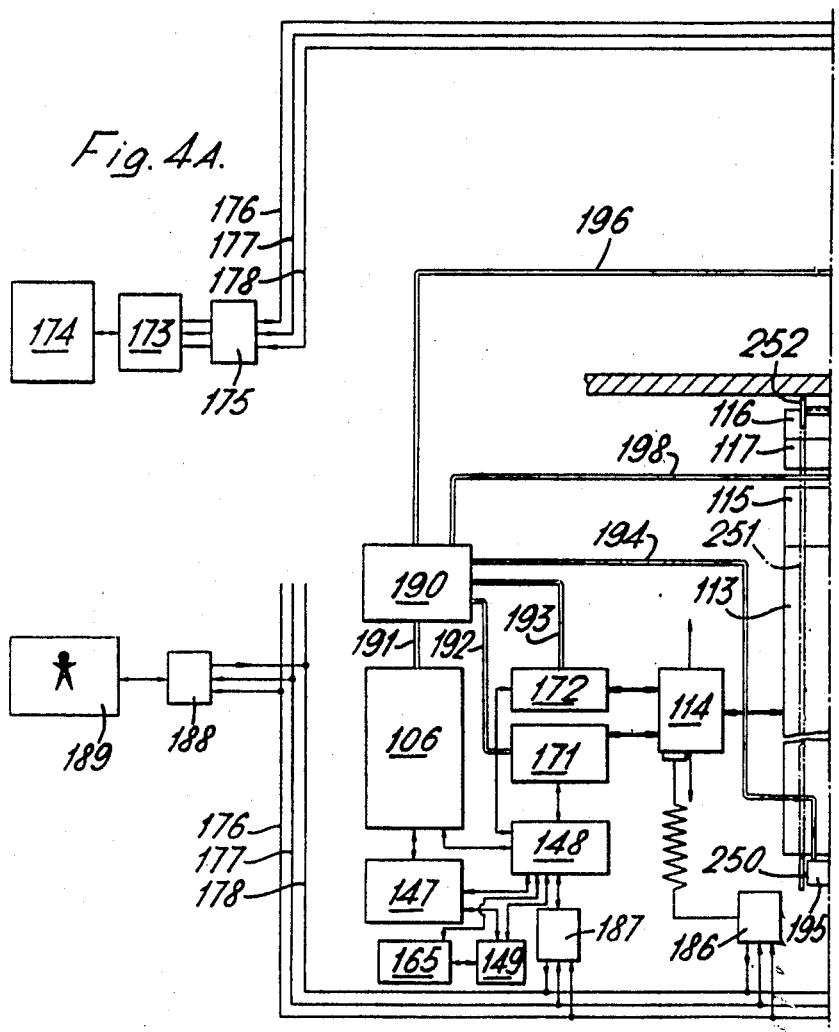

Fig. 5.

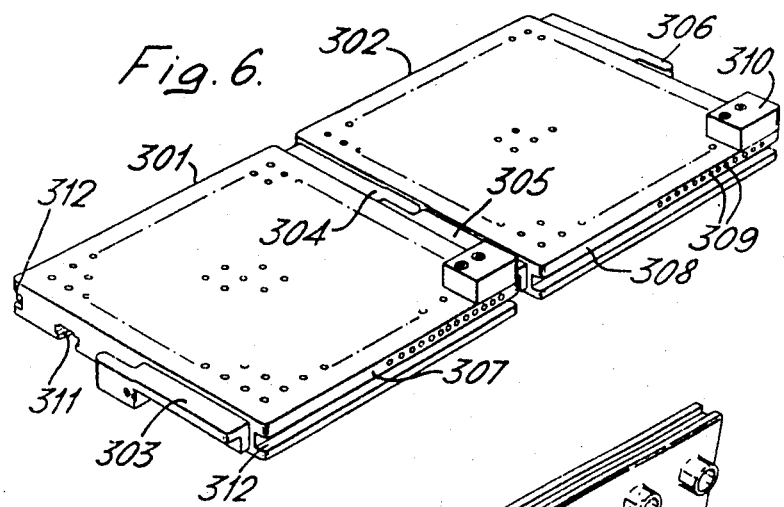
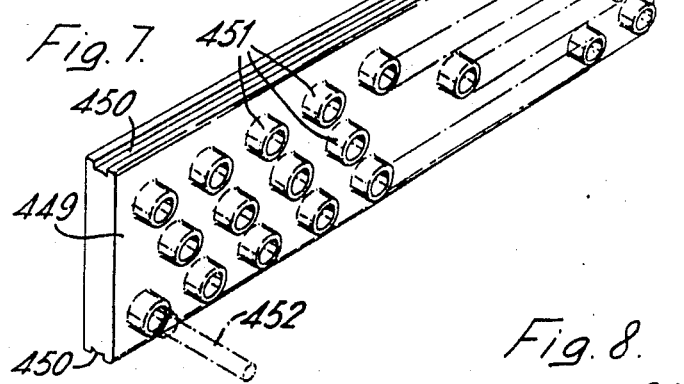
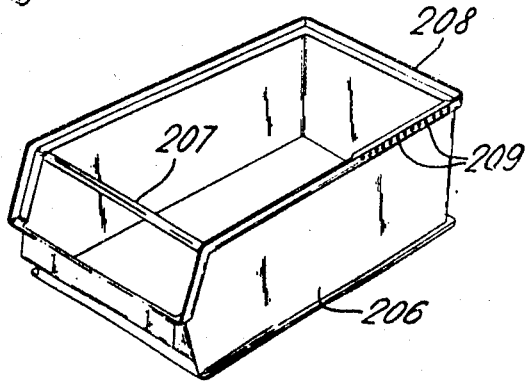

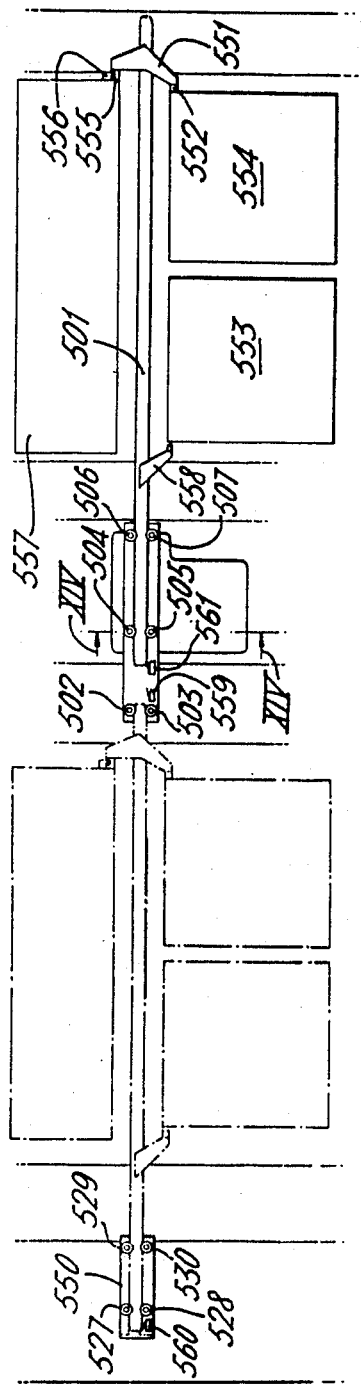
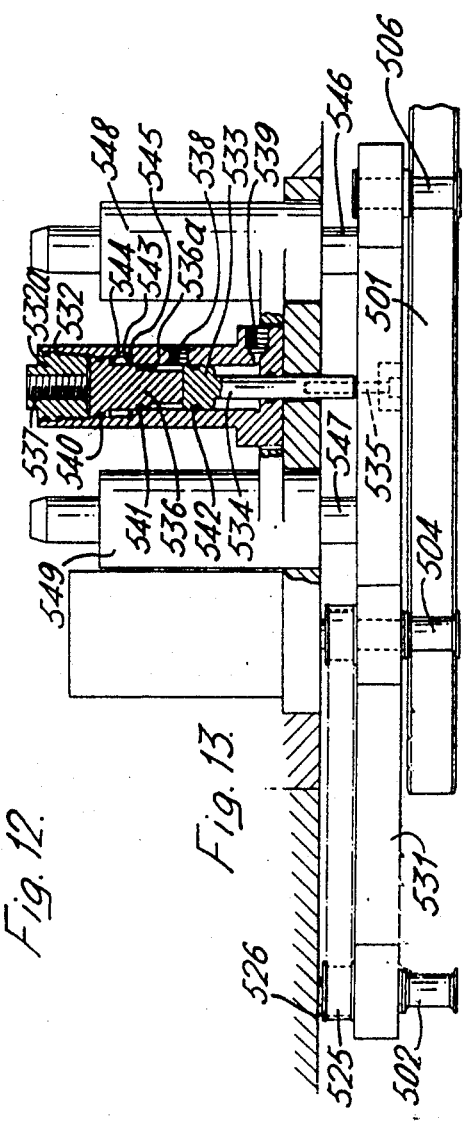
Fig. 12.
Fig. 13.

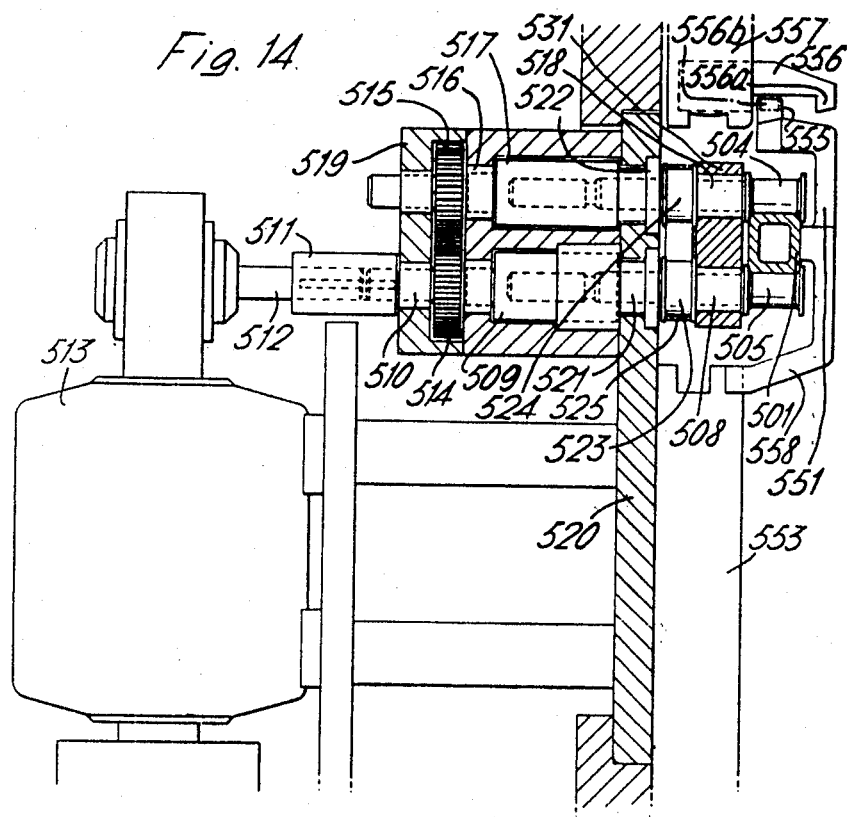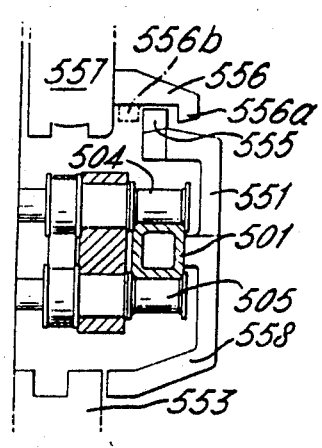

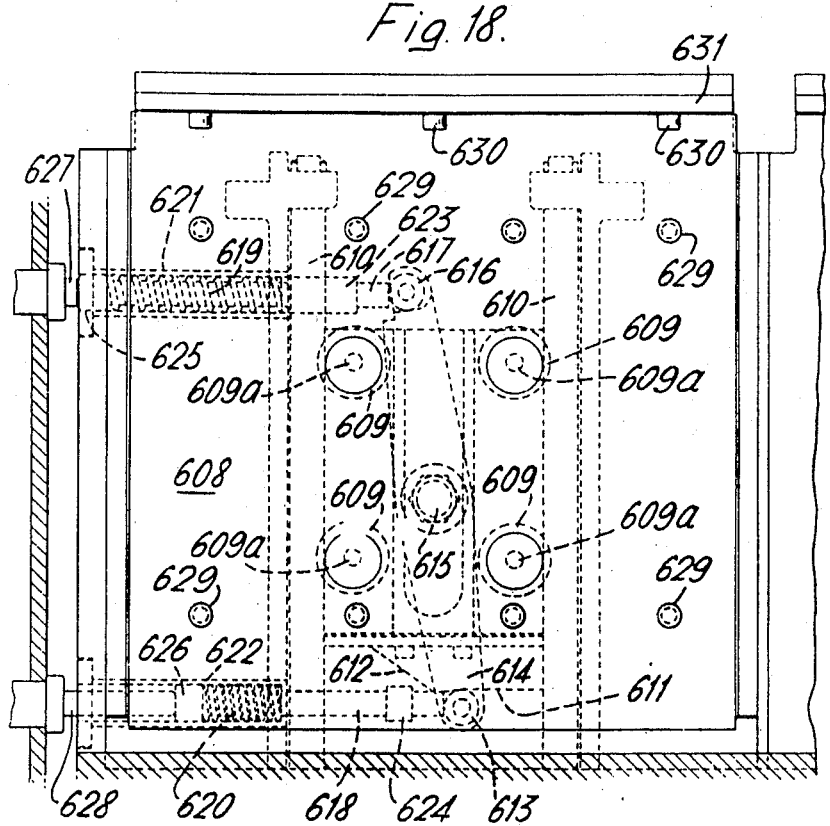
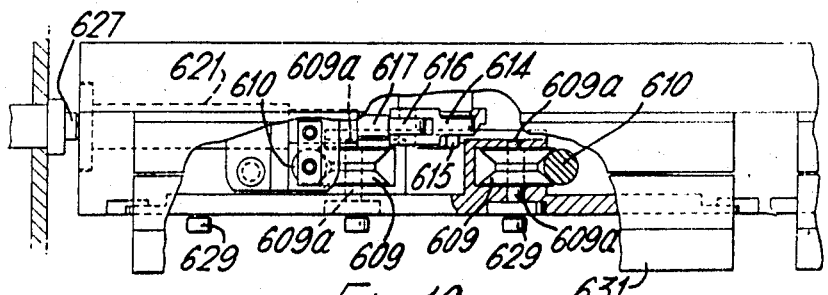

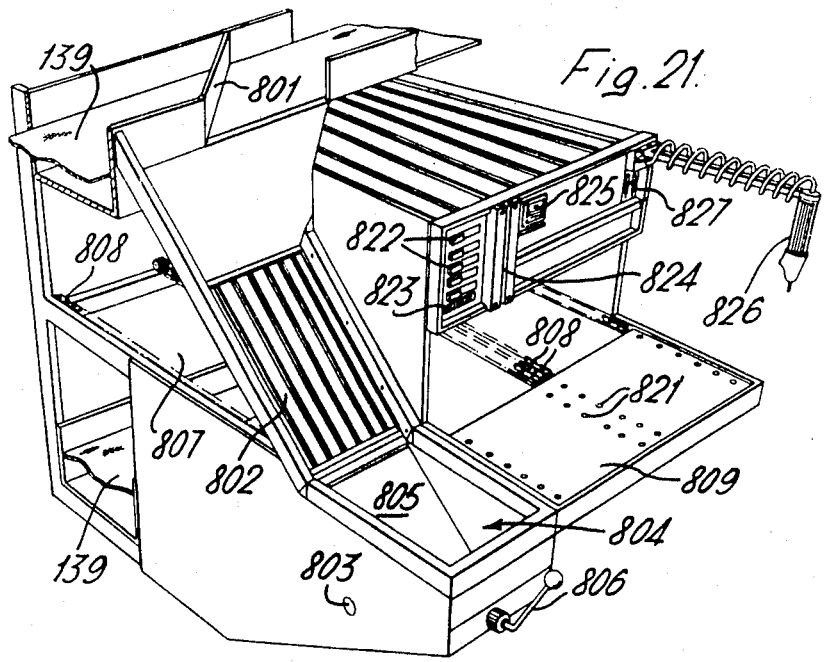
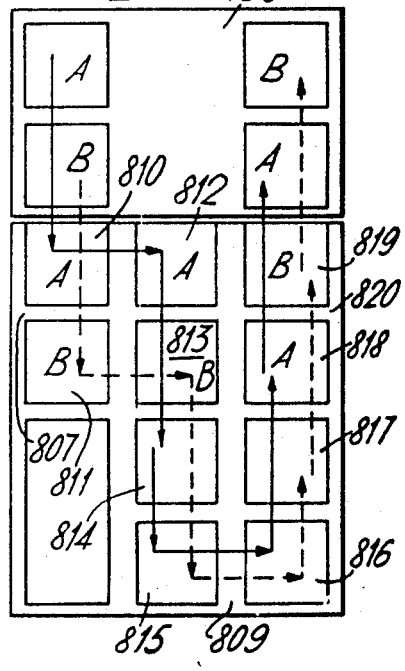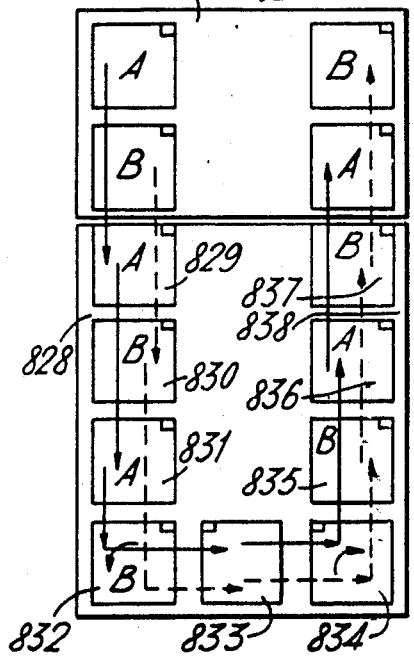

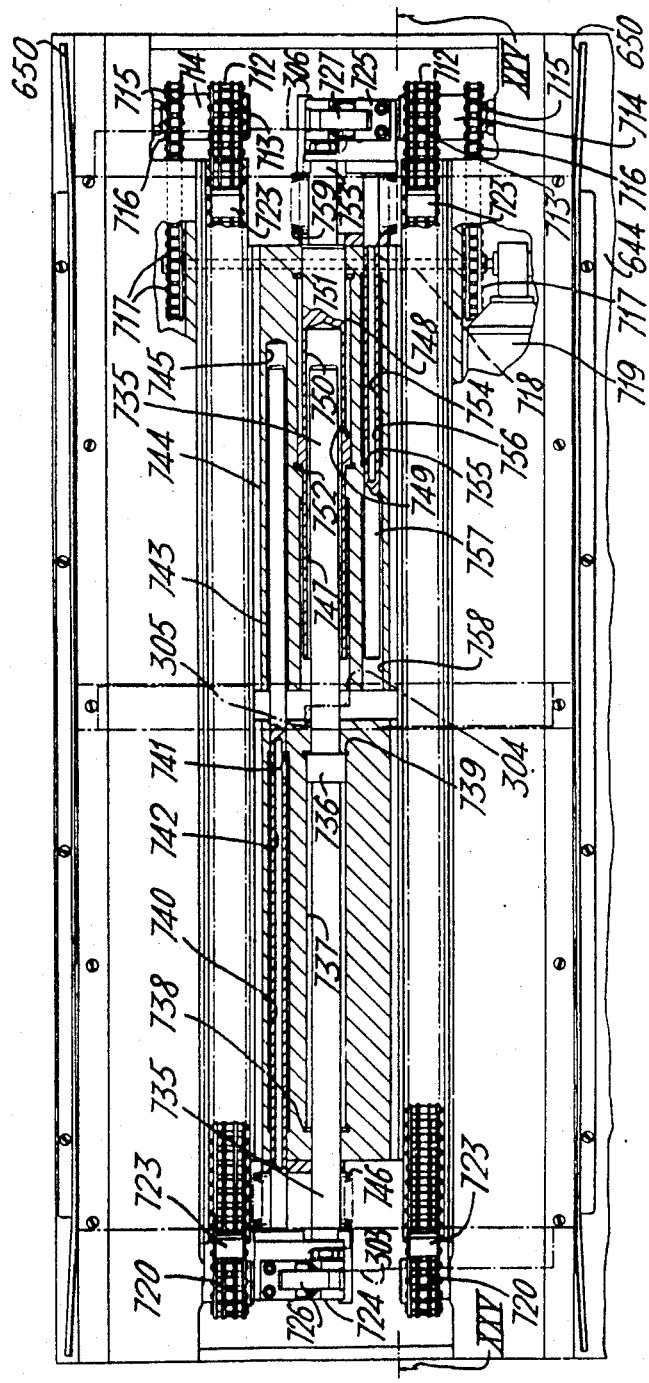

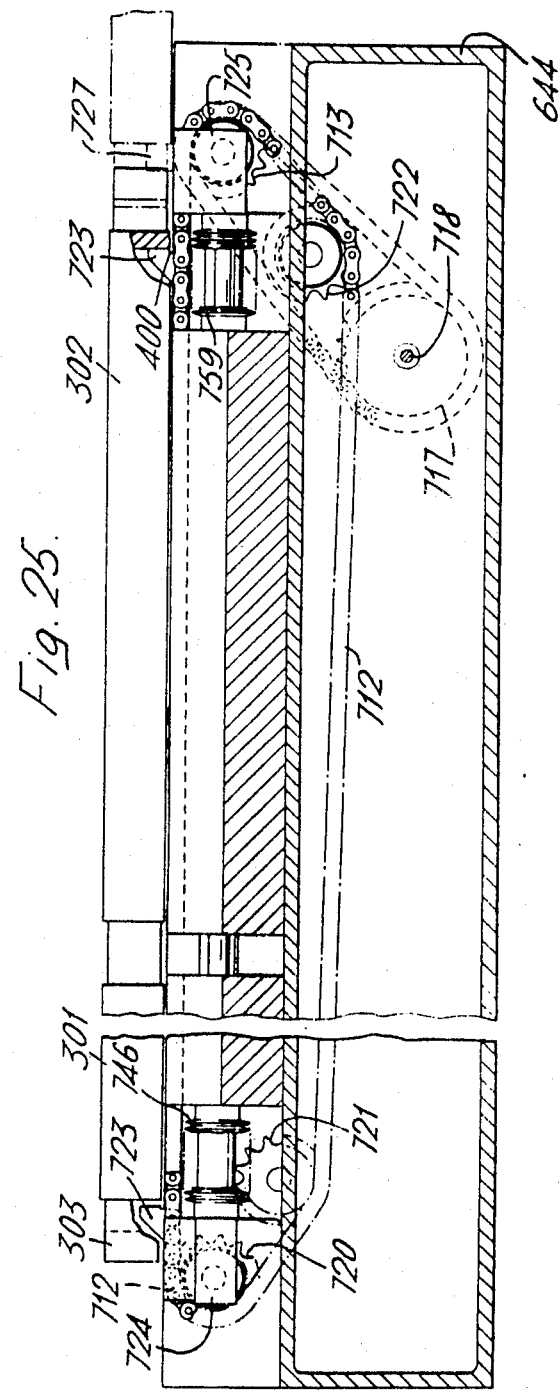

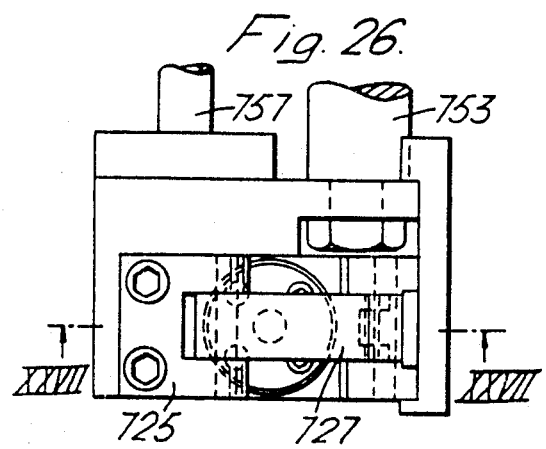
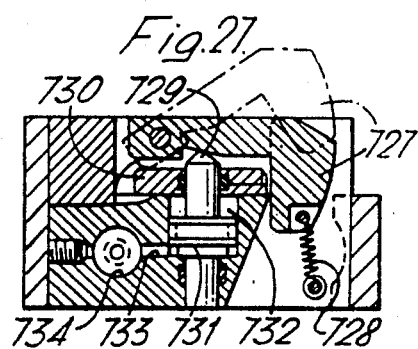
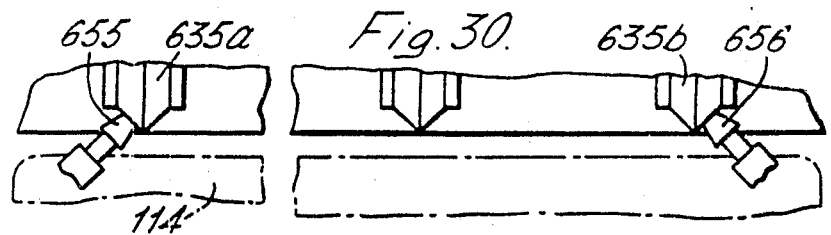

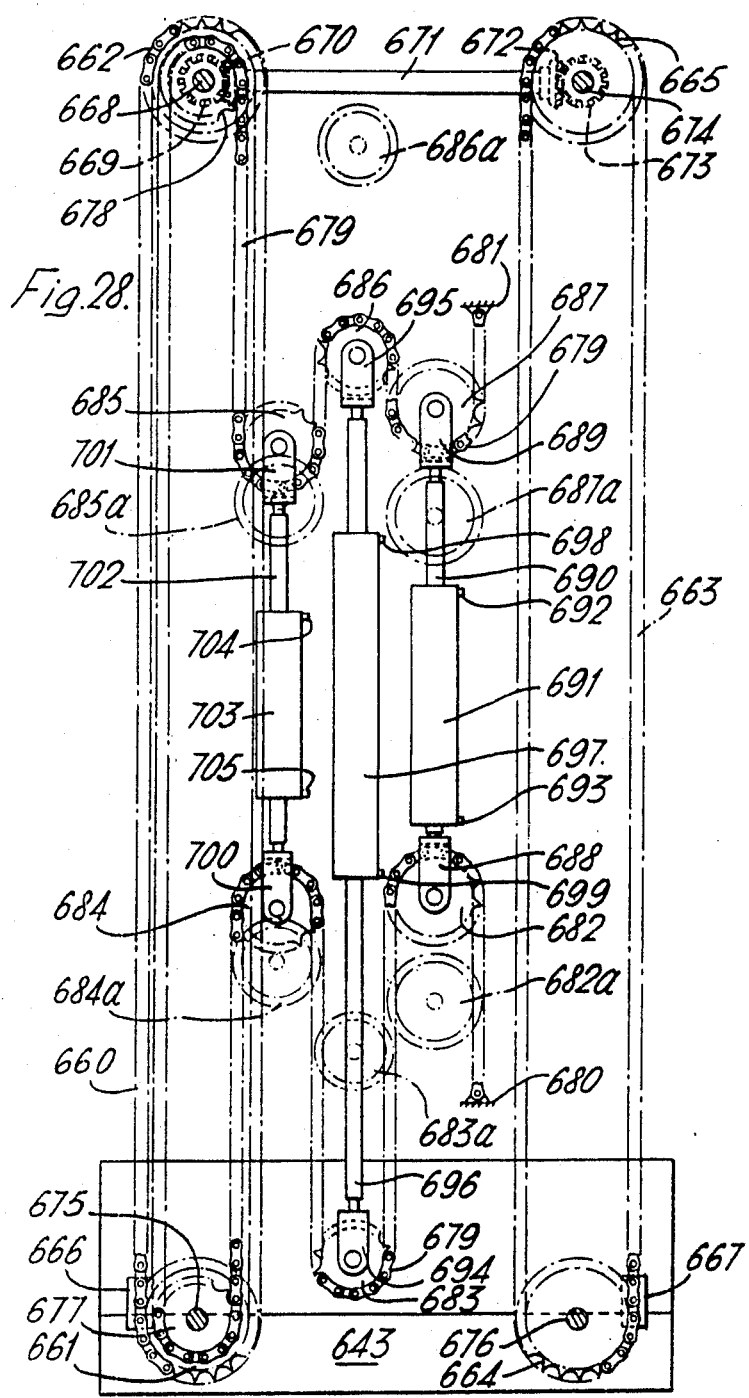

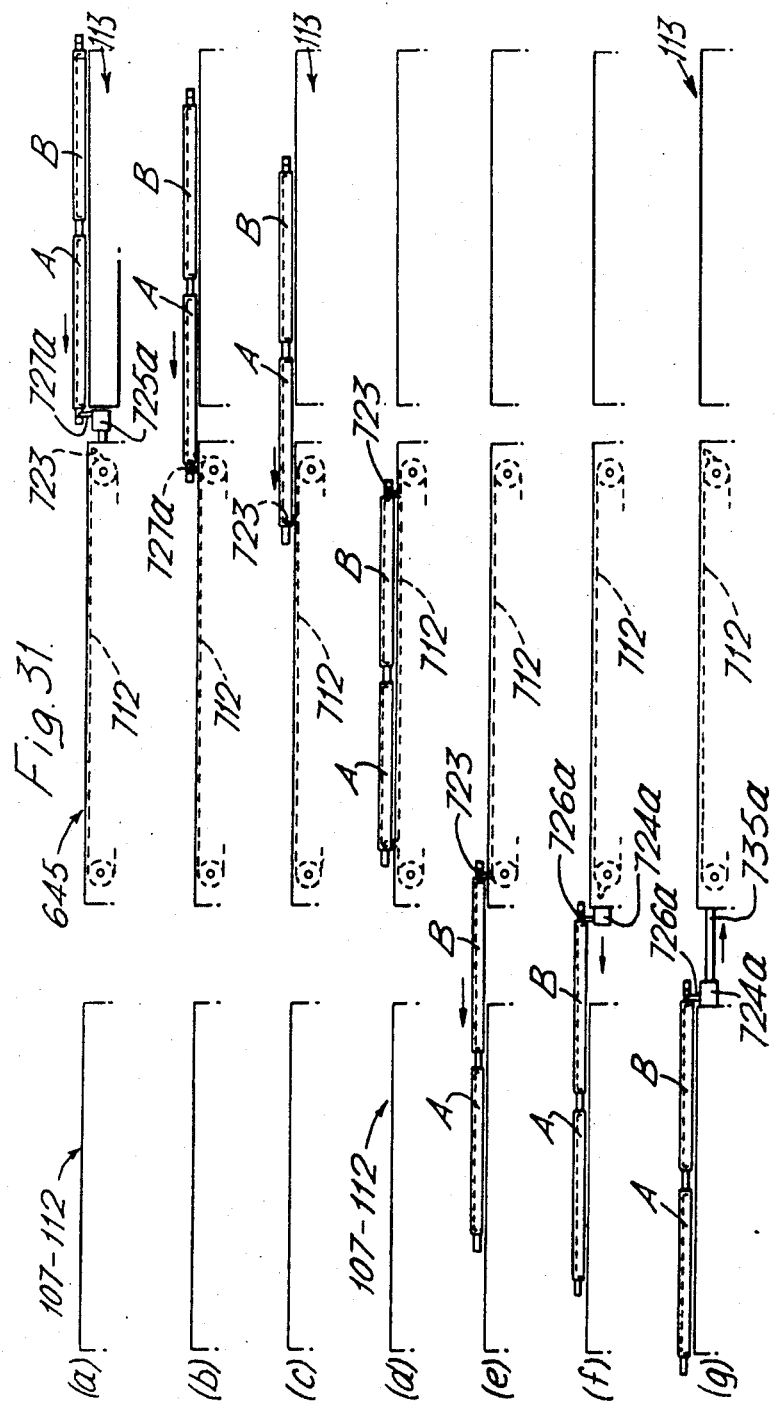

AUTOMATED MACHINE INSTALLATION AND METHOD

CROSS-REFERENCE TO RELATED APPLICATIONS

This is a divisional application of copending application Ser. No. 85,289 filed Oct. 29, 1970, now U.S. Pat. No. 4,369,563, which in turn is a continuation application of copending application Ser. No. 695,817 filed Dec. 4, 1967, now abandoned, which in turn is a continuation-in-part application of copending applications Ser. No. 636,993 filed May 8, 1967, now abandoned, and Ser. No. 578,318 filed Sept. 9, 1966, now abandoned.

BACKGROUND OF THE INVENTION

This invention relates to a concept of manufacturing components using numerically-controlled machine tools and relates to systems for machining components and including workpiece-handling equipment and equipment for controlling the detail and overall operation of the system.

Despite recent developments in forging, extrusion, powder metallurgy, electro-chemistry, high-energy-rate forming and other methods, the most important engineering processes involved in the manufacture of components in small batches of, say, 100 or less, are metal cuttng processes, e.g. milling, drilling, turning, or other conventional ways of physically removing unwanted material.

Batch production is generally accomplished today by issuing components into manufacture on an "operation" basis, i.e. the work to be done is split down into separate operations, sometimes involving as many as twenty operations for one part. Each of these may involve transferring the part from one machine tool or process to another and then to a third and fourth and so on, but even when many of the operations are confined to one machine tool, changes in the setup or position of the workpiece can be frequent. These changes in setup result in the machine tool not cutting during the change-over period so that the ratio of cutting time to total working time is of the order of 15–20%. Where the component moves from machine to machine the situation may be far worse. Even with good organisation it is rarely possible to manage a large engineering shop so that components speed less than a day between operations. Frequently this period may be nearer to one week. Even with only a few operations, the queuing problems associated with machine loading lead to a total manufacturing cycle which is rarely less than three months and is frequently as much as six months.

The number of components forming a workshop float or work in progress may be extremely high, in some cases as high as one million, and this may be the minimum necessary with current production control methods to maintain stability and give good machine loading. Such work-in-progress represents a large investment in partly finished material as well as in loss of lead time. An extremely complex and expensive production control system is required to progress the work from operation to operation and, although a computer can be used to improve the situation, such measures are no more than a palliative which does little to remove the main disadvantages of the system.

In relatively recent times it has become common in some industries to employ so-called "transfer machines" for large-scale production of machine components. For example, such machines are used for carrying out the necessary machining operations on cylinder blocks for automobile engines. Such machines are arranged with a number of positions termed "stations" to which each component is brought successively by a conveyor and at each station one or more predetermined operations is performed, e.g. milling or grinding exterior surfaces to which other parts must be accurately fitted, drilling oilways, reaming and honing cylinder bores, the components being located at each station by clamps engaging datum surfaces of the components. These transfer machines are however essentially mass-production machines; their initial cost is high, and they are inflexible in operation, as considerable time and expense is involved in changing the set-up of such a machine to vary its fixed programme of operations to allow for a change in the components to be produced; in most if not all cases, the expense of a change is such that, each time the machine is set up for a particular component, there must be a production run of months or even years if operation of the machine is to be economically justifiable.

Also in relatively recent times, complex numerically-controlled machine tools, known as "machining centres", capable of performing different types of machining operations on a workpiece at one setting, and sometimes pallet loaded, have become available. In such machining centres, sacrifices usually have to be made in machining speeds and rigidity in order to achieve the complex movements. Also, such complex machine tools cannot readily be made in twin spindle form, which involves a sacrifice of a factor of 2 in effective machining speed. Further, although a large number of components may require complex machining facilities, in probably only a relatively small proportion of these components will this sort of machining amount to more than a small proportion of the total machining required on that component; thus the single complex machine will spend a large proportion of its time carrying out relatively simple machining operations, so that its capacity for doing complex work is wasted to a great extent.

SUMMARY OF THE INVENTION

The present invention provides a machine tool installation for machining workpieces to produce a variety of components comprising a plurality of complementary numerically controlled machine tools which together are capable of performing the necessary machining operations to produce said variety of components and are arranged so that each workpiece can be delivered to a selected number of said machine tools in a selected order and each machine tool in said selected number can perform on the workpiece predetermined selected machining operations appropriate to the component of said variety to be produced from that workpiece. The invention further provides that the workpieces can be loaded on pallets of a common form which each of the machine tools is capable of locating accurately for the performance of a machining operation on the workpiece. The workpiece may be fixed to the pallet by adhesives, screws, clamps, suction, electrostatic or magnetic attraction or by any other suitable means.

By "complementary machine tools" is meant two or more machine tools which either cannot individually carry out all the required machining operations on a workpiece or which can carry out the required machining operations more economically and advantageously by the machining operations being shared between the machine tools then by all the operations being carried out on one machine tool. These complementary machine tools may be of different forms so that each machine tool may be capable of carrying out a machining operation that no other of the machine tools is inherently capable of carrying out or there may be an overlap between the machining operations that the machine tools are capable of carrying out, but with one machine tool better adapted to carry out one or more of the overlapping operations than another. Alternatively, two or more of the machine tools may be of similar form but equipped temporarily at least with different sizes or forms of cutting tools.

In contradistinction to a "machining centre", by using a number of complementary numerically controlled machine tools, the different machining capabilities are split up amongst a group of machines whose separate functions are carried out in parallel, which means also that a number of components are being machined at the same time. Also, of course, the individual machines can be designed better to carry out their more restricted functions e.g. a machine to carry out simple milling operations can be made rigid more easily than a machine which requires more compounding of movements to produce complex shapes. Also, a machine intended to work only on light alloy, for example, can be designed with its spindle speeds adapted to take advantage of the machining properties of that class of materials, whereas a machine which might have a handle a range of materials is either complicated by change-speed apparatus or has its speed restricted to that required for the slowest speed material it might be called upon to machine.

Such a system is intended, in contradistinction to a "transfer machine", for the economical production of differing components in batches preferably repeating at intervals. The system is therefore flexible in operation in that batches of different types of components can be machined one after another with the minimum of machine time being wasted in the change from one type of component to another. This latter feature is of course an attribute of a numerically-controlled machine tool which has facilities for quick changes of machining program. Also, due to the provision of a number of complementary machine tool different types of components can be machined at the same time on different machines and thus the total machining capability of the machines is employed, so far as possible, all the time. Further, there is no need for every workpiece to pass through every machine, since each workpiece is delivered only to those machine tools required to perform a machining operation on it and can pass from any one machine to any other, i.e. does not have to pass though the machines in a fixed order. Nor does any one machine tool have to remain idle until another machine tool has completed a particular operation.

One or more of the machine tools may be specialised in that it may be intended to carry out, at high speed, relatively simple milling operations, while another machine tool may be a specialized drilling machine, and a further machine tool may be able to carry out more complex operations such as milling and hole drilling at angles in all faces of a workpiece except the face concealed e.g. by a pallet.

The invention further provides transport means to transport workpieces to and from the machine tools and control means to control the transport and machining operations.

The invention further provides a store, which may be a compartmented rack, between the machining area, where the machine tools are located, and an operational area for work-setting where the workpieces are loaded on the pallets, and a transporter on each side of the rack to transport the pallets between the rack and the two operational areas.

The invention also provides controlled delivery of tool magazines to and from the machine tools, and controlled delivery of workpieces to the work-setting area.

Still further the invention provides identified carriers, more particularly pallets and bins for carrying workpieces and magazines for carrying tools, and monitoring means to feed back signals indicative of the location of a carrier in the system to the control means.

A further aspect of the invention provides a numerically controlled machine tool, transport means to transport workpieces to and from the machine tool, and control means to control transport operations performed by the transport means and machining operations performed by the machine tool.

A yet further aspect of the invention provides a numerically-controlled machine tool having means to automatically receive and locate a pallet loaded with a workpiece for a machining operation, a pallet holder capable of carrying a plurality of pallets, means to feed a pallet from said pallet holder into the machine tool and from the machine tool into the pallet holder, and control means effective to select a pallet to be fed from the holder into the machine tool.

Another aspect of the invention provides a numerically-controlled machine tool, a tool magazine holder capable of carrying a plurality of tool magazines, means to feed a tool magazine from said magazine holder into the machine tool and from the machine tool into said magazine holder, and control means effective to select a magazine to be fed from the holder into the machine tool.

Further aspects of the invention, not specifically mentioned in the brief summary above, will become apparent from the following description of preferred embodiments with reference to the accompanying drawings.

BRIEF DESCRIPTION OF THE DRAWINGS

FIG. 2 is a perspective view of part of a second embodiment of machine tool installation, FIG. 3 is a diagrammatic representation of part of the installation shown in FIG. 2, FIGS. 4A and 4B together constitute a diagrammatic representation of control devices and communication channels in the installation shown in FIG. 2, FIG. 5 is a diagrammatic representation of an example of the travel of workpiece through the installation shown in FIG. 2, FIG. 6 is a perspective view of a pair of linked pallets, FIG. 7 is a perspective view of a tool magazine, FIG. 8 is a perspective view of a bin, FIG. 12 is a diagrammatic front elevational view of transfer devices for transferring pallets and tool magazines between the loading unit shown in FIG. 9 and its associated machine tool, FIG. 13 is a plan view, partly in section, of some of the devices shown in FIG. 12, FIG. 14 is a sectional view on the line XIV—XIV of FIG. 12, FIG. 15 is a view like FIG. 14 showing some parts in different positions, FIG. 16 is a view like FIG. 15 showing some parts in other different positions, FIG. 18 is a front elevational view of part of the pallet loader shown in FIG. 17, FIG. 19 is a plan view partly in section, of mechanism shown in FIG. 18, FIG. 20 is a diagrammatic representation of the movement of pallets by mechanism shown in FIGS. 17, 18 and 19, FIG. 21 is a perspective view of a work-setting station or table, FIG. 22 is a diagrammatic representation of the movement of pallets through the work-setting station or table shown in FIG. 21, FIG. 23 is a diagrammatic representation of the movement of pallets through a work-resetting station or table, FIG. 24 is a plan view of pallet-carrying mechanism in a transporter, FIG. 25 is a sectional view on the line XXV—XXV of FIG. 24, FIG. 26 is a plan view of part of the mechanism shown in FIG. 24, FIG. 27 is a sectional view on the line XXVII—XXVII of FIG. 26, FIG. 28 is a side elevational view of pallet and tool magazine carrying mechanism in a transporter, FIG. 30 is a plan view of part of a transporter and a rack, FIG. 31 is a diagrammatic representation, comprising seven views, of the transfer of pallets to and from a transporter.

DESCRIPTION OF THE PREFERRED EMBODIMENTS

Figure 32:
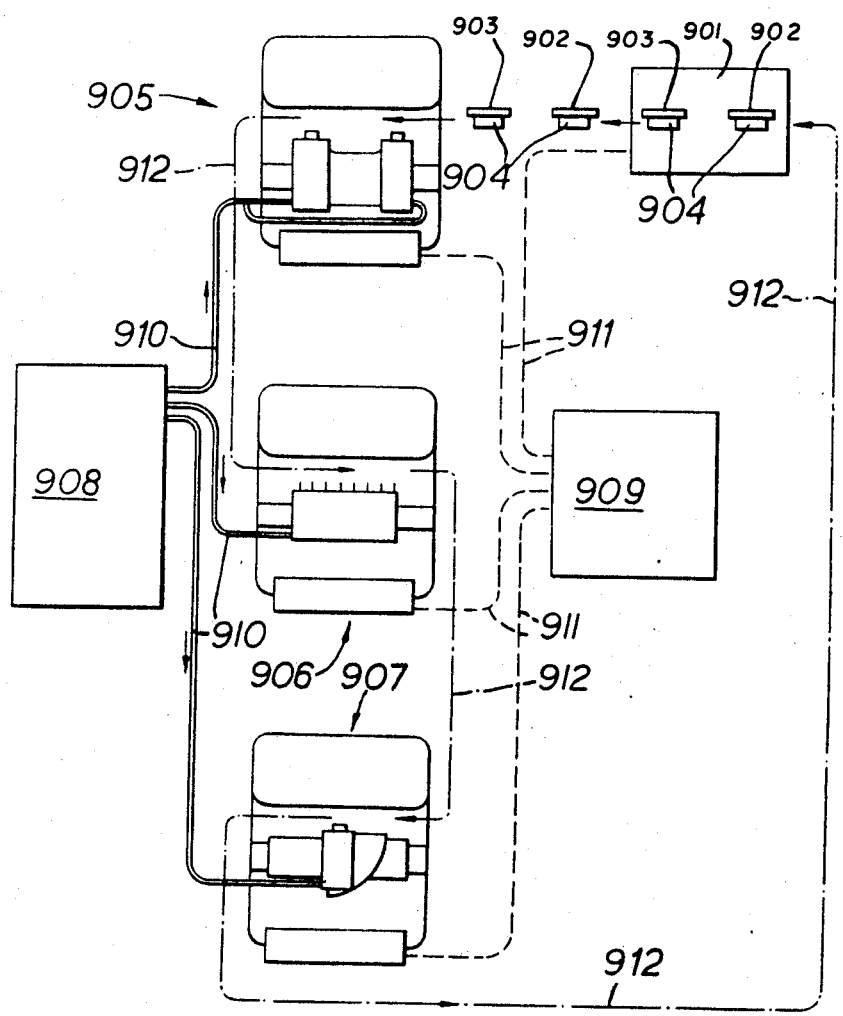
FIG. 32 is a diagrammatic representation of a third embodiment of machine tool installation.

The third embodiment, diagrammatically represented in plan in FIG. 32, is somewhat simpler than the other two embodiments. This third embodiment will therefore be described first to illustrate, by way of example, the concept of employing a plurality of complementary numerically-controlled machine tools, whereby each workpiece can be delivered to a selected number of the machine tools in a selected order, the selection being appropriate to the component to be machined from the workpiece, it being understood that the particular selected number (namely all) and the selected order described below are given solely by way of illustration and example.

DESCRIPTION OF THIRD EMBODIMENT

Referring to FIG. 32, 901 represents a combined work-fixing and inspecting unit. These two units can be separated but in this particular instance as shown as one. 902 and 903 are pallets each having fixed thereto a workpiece 904. The pallets 902 and 903 are first located, as described later, on the work-fixing unit 901, and are then taken from here and are moved to the left (as seen when looking at the drawing) and are automatically registered on and fixed to the Y slide of a 3-axis twin-spindle computer controlled machine tool 905. In both the above cases, the pallets are located by means of an automatic locator as shown in U.S. Pat. No. 3,243,178. In this tool 905 specialized metal-removal operations, say facing and contour cutting are carried out on both workpieces 904 simultaneously. The machine tool 905 is substantially the same as that shown in FIG. 1 of U.S. Pat. No. 3,171,327. The difference, however, as pointed out above, is that in the present case automatic pallet locators as disclosed in the aforementioned U.S. Pat. No. 3,243,178 are provided for automatically locating the two pallets on the vertical slides of the machine.

The pallets 902 and 903 are removed manually from the 3-axis machine tool 905. They are then fed to a 3-axis computer-controlled machine tool 906 on which they are automatically registered on and fixed to its Y axis slide, again by the automatic locator disclosed in U.S. Pat. No. 3,243,178 aforementioned. This machine is intended to perform drilling, boring, tapping, reaming and similar operations which may be required on the workpiece. The machine, therefore, carries banks of spindles which can be automatically selected and located in a similar manner to the method of location described in relation to the machine disclosed in the aforementioned U.S. Pat. No. 3,171,327.

From machine tool 906 the pallets 902 and 903 are again manually moved to a 6-axis single spindle computer controlled machine tool 907. This machine 907 is a single pallet machine. Consequently each pallet 902 and 903 is successively automatically registered on and fixed to its Y axis slide again as described in the aforementioned U.S. Pat. No. 3,243,178. The tool 907 allows for the manufacture of sculptured surfaces such as are met with in die or mould-making, for the production of geometric surfaces at odd angles on a component and for the drilling holes in a component at any angle, even parallel to the pallet surface. In order to allow the machine to perform this kind of operation the machine described in FIG. 1 of the aforementioned U.S. Pat. No. 3,171,327 is modified as disclosed in that patent by providing for rotation of the worktable and permitting the cutter head to be capable of being swivelled through 90°. In this case as stated in those patents there is only one quill and only one workpiece.

The particular choice of machine tool represented by the machine tools 905, 906, 907 are used in this preferred embodiment of apparatus according to the invention provides especial flexibility of application. Each of the machine tools 905, 906, 9o7 is capable of performing a different selection of machining operations so that they are complementary to each other and there are few such operations which cannot be carried out on at least one of said tools, and the three machine tools together allow a very large number of combinations of machining operations to be performed on each component. However, the present invention is not limited to the use of the machine tools described but is equally applicable to other machine tools which perform machining operations which are complementary to each other.

The machine 907, i.e. the 6-axis machine, can perform more machining functions than the machines 905 and 906, and if three of the axes are not used the machine effectively becomes a 3-axis machine. The machines 905 and 906, because they have two spindles, can perform their own range of work twice as fast as the machine 907, and it would be extremely difficult and expensive to make the sort of machine as machine 907 in twin-spindle form.

On completion of machining operations, each of which can be seen to be specialized according to the tool to which the pallets are fed, they together with the two completed or semi-completed components are manually removed and transferred to an inspection machine, in this case the combined workfixing and inspection unit 901. The movement of the pallets 902 and 903 through the cycle is shown by means of a chain line 912 in the diagram.

The power pack 908 delivers hydraulic oil at requisite pressure, say 2,000 p.s.i. to the slides, bearings and actuators of all the machine tools through supply lines 910. It comprises motor driven pumps, accumulators, oil filters, coolers, return tank, etc. The exact contents are outside the scope of this invention and although a single power pack serving three machine tools is shown, this is not a requisite. Three smaller individual power packs could be used or oil could be delivered from a still larger unit.

A centralized computer 909 has communication lines 911 shown in the diagram as dotted lines connecting the three machine tools 905, 906 and 907 as well as the workfixing-inspection unit 901. The control system which may be a continuous path or a point-to-point system, both being well known, is operated from a magnetic tape input. Other systems may be used and each machine can be controlled by its own individual computer.

The operation of the apparatus is briefly as follows. The workfixing unit operates by reference to two defined positions on the workpiece which may be a casting, blank, or partly-finished component, these positions being used to locate the workpiece on the pallet to a desired degree of precision. These defined positions may take the form of an edge, a scribed line, a pair of cross scribed lines, a centre punch mark, a hole or a naturally occurring recognizable feature of sufficiently high resolution. In general a combination of any two such features will enable the workpiece to be located.

Two such features are arranged to occur on the workpiece while the optical axes of two microscopes are located above the pellet in a known position so that the workpiece may be manipulated therebelow until the marks are precisely in register. One microscope is located above the machine table with the X and Y coordinates automatically displayed by numerical indicators operated from the counter of a moiré-fringe measuring system. A second microscope is provided in such a way that it may be positioned at a number of locations over the surface of the pellet. This second microscope is only required to move in increments of 20 mm over its travel in the X and Y axes. This is achieved by adding a carriage with an accurate step-locating system.

The operator first feeds a pallet onto an automatic locator on the workfixing unit 901, the locator being similar to that disclosed in the aforementioned U.S. Pat. No. 3,243,178, which shuffles it into its precise location indicating when this has been done. A planning drawing specifies the position of the workpiece on the pellet. The workpiece has already been marked according to the drawing. The operator sets the second microscope to the step position shown on the drawing and moves the first microscope until the X and Y coordinates read from the drawing are displayed on the numerical indicators. The slides are then locked and the workpiece manipulated until the fiducial marks are correctly located. The workpiece is then clamped or otherwise fixed to the pallet. This procedure is usually only required for relocation of a workpiece which has already been partly machined. Rough blanks and castings are located by means of a ruler.

The pallets are 330 mm square × 30 mm thick made of stress-relieved fine grained cast iron and may be as those disclosed in the aforementioned U.S. Pat. No. 3,243,178. The workpiece is fixed to the pallet by means of adhesives, by screws, clamps, suction, electrostatic attraction or by any other suitable means.

Once the workpiece is accurately fixed to the pallet, machining operations of the required degree of accuracy can be carried on any data-controlled machine tool possessing the ability to receive the pallet (or two such pallets) shuffle it into position and lock it there. The machine tools may be as those described as references 905, 906 and 907 or they may be in any other convenient form such as lathes, grinding machines, shapers, planing machines, etc. always provided they are data-controlled machine tools as set out above. If in addition the machine tools are provided with non-wearing bearing surfaces such as can be obtained with hydrostatic bearings and slides than the whole system has reproducibility built into it to a high degree.

DESCRIPTION AND OPERATION OF FIRST EMBODIMENT

Figure 1:
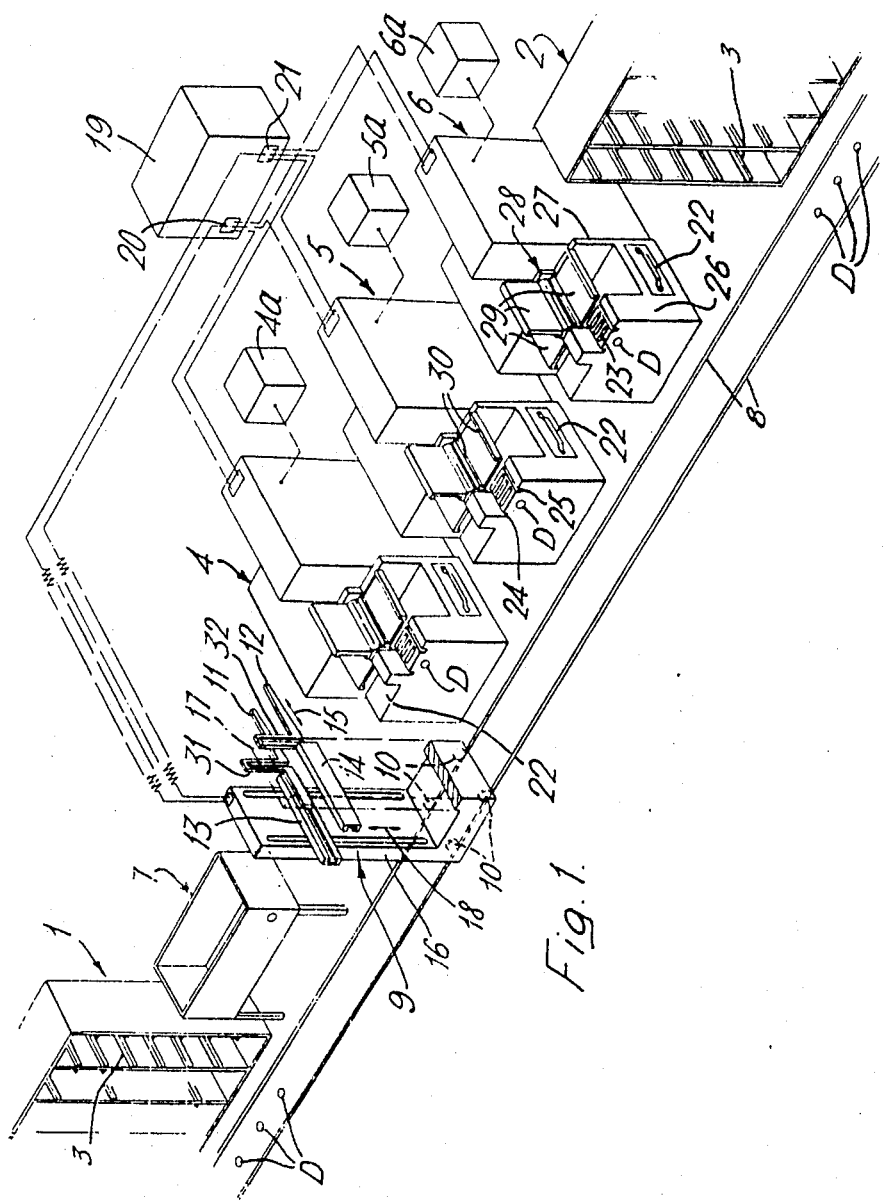
FIG. 1 is a perspective view of a first embodiment of machine tool installation.

In FIG. 1, 1 and 2 represent rack-like containers, the former for storing pallets each having one or more workpieces fixed thereon and the latter for the storage of pallets having completed components, which have been fashioned from the workpieces, fixed thereon. It is to be noted that when the expressions "component" "completed component" or "finished component" are used herein they are to be taken as including the case of a virtually completed or finished component since many of these components may require further operations, such as the removal of lands of material by which they are fixed to the pallets, before they are in fact finished or completed. The containers 1 and 2 resemble bookcases and may be considered as libraries for the storage of pallets which can be slid in and out on angle irons 3 providing compartments for the pallets. Between the containers 1 and 2 there are positioned three numerically-controlled machine tools 4, 5 and 6, each having its own control unit 4a, 5a and 6a respectively, and a dipping tank 7 for cleaning completed or part completed components from any chips that may be adhering. The units 1, 2, 4, 5, 6 and 7 extend in a line alongside of which is a track 8. A pallet transporter 9 provided with four wheels 10 is capable of moving along this track 8, the transporter being driven by an electric servo motor housed in its base and supplied from electric conductors. Neither the servo motor nor the electric conductors are shown in FIG. 1 but both are of standard design.

The transporter 9 generally resembles a fork-lift truck and comprises a pair of arms 11 and 12 having cranks 31 and 32 respectively. The arms 11 and 12 are carried by members 13 and 14 relative to which they are slidable in the directions indicated by double-headed arrow 15 by means of horizontal "T" slots in the members 13 and 14 which accommodate runners on the arms 11 and 12. The members 13 and 14 are carried by uprights 16 and 17 respectively of the 'U' shaped transporter 9 and are slidable relatively thereto in the directions indicated by double-headed arrow 18 by means of vertical slots in the uprights 16 and 17 which accommodate runners mounted on the members 13 and 14. The relative movements in the directions of the arrows 15 and 18 are achieved by electro-hydraulic means housed in the transporter 9. These means are not shown, the principles on which they operate being well known.

19 is a programmed control unit or computer having an output panel 20 and a feedback panel 21, both panels having signal connections to the transporter 9 and to the three machine tools 4, 5 and 6. Each of the control units 4a, 5a and 6a serves its own machine tool, and is programmed by tape to cause appropriate servo mechanisms in the machine tool to carry out the taped instructions resulting in tool selection, metal removal, etc. Preferably, the control system is as shown but it would be possible to combine the units 4a, 5a and 6a in the unit 19 which would then become a single but much larger computer.

Each of the machine tools is provided with an extension 22. Each extension 22 is identical, even though the machine tool to which it is attached may vary from its neighbour, and comprises a short run of horizontal roller conveyor 23, at the side of which are recesses 24 and 25. The arms 11 and 12 of the transporter 9 fit into the recesses 24 and 25 respectively. Each extension 22 is also provided with end frames 26 and 27. Journalled in the end frames 26 and 27 is the shaft of a rotatable turret 28 having four paddles or pallet holders 29 disposed about the shaft at angles of 90°. Each holder 29 has retaining guides 30 between which a pallet can be slid. The paddles of the holder 29 act as a buffer store both for incoming and outgoing pallets.

Although not specifically shown so in FIG. 1 the machines tools 4, 5 and 6 are different and perform different functions, but each of the machine tools is provided with apparatus as disclosed in U.S. Pat. No. 3,243,178 issued Mar. 29, 1966 for shuffling a pellet into accurate position of the machining of a workpiece loaded thereon.

The operation of the machine tool installation shown in FIG. 1 will now be described.

Pallets, loaded with workpieces for machining, are placed in the compartments of the container 1, each compartment having its own location reference, and each pallet bearing a number appropriate to the component to be produced from the workpiece loaded on the pallet, so that all pallets loaded with workpieces from which the same component is to be produced bear the same number. The computer 19 is programmed with a tape appropriate to the components to be produced, the programme including information giving the respective location references of the container 1 which contain the numbered pallets loaded with workpieces from which each of the components is to be produced, and further including, for each component, a selection of one or more of the machine tools 4, 5 and 6 required to perform the necessary machining operations to produce that component, and, for each machine tool in that selection, the selection of a programme appropriate to the required machining operations for the control unit associated with that machine tool.

The computer 19 not only controls the operations of the three machine tools 4, 5 and 6 but through the use of a separate comparator and circuits contained therein controls the movements and operation of the transporter 9 by means of error command signals. By way of example and illustration the cycle of transport operations performed by the transporter 9 in the case of a component produced by machining a workpiece on machine tools 4 and 6 only will be described.

For convenience movement along the track 8 will be considered as long an X axis, in the directions of the arrow 18 as along a Y axis and in the directions of the arrow 15 as along a Z axis.

1. The computer 19 issues a command to the transporter 9 to move along the X axis until it is aligned with a selected storage location in the container 1 determined by the computer and containing a pallet loaded with a workpiece from which the said component is to be produced. Any suitable positioning system can be used taking into account the fact that extremes of accuracy are not necessary in the position of the transporter 9 or of its arms 11 and 12; for example, a system similar to that employed for locating the pallets in the machine tools, as disclosed in U.S. Pat. No. 3,243,178 issued Mar. 29, 1966 may be used with position detectors D in suitable positions, or use may be made of switches (not shown) mounted on track 8 and operated by wheels 10 to provide indications of the position of the transporter 9.

2. While the transporter 9 is moving along the X axis a further error command signal from the comparator of the computer 19 causes the members 13 and 14 to move along the Y axis so that the arms 11 and 12 are aligned along the same axis with the selected storage location. As soon as the transporter 9 is aligned with the selected storage location it reads by any method known in the art the number fixed to the pallet stored therein. The number as soon as it is read by the transporter 9 is then transmitted to the computer 19 as a check that the correct programme is selected by control unit 4a of the machine tool 4.

3. After the transporter 9 and the members 13 and 14 have come to rest, the arms 11 and 12 are caused to move along the Z axis until they are under the pallet loaded with a workpice in the selected storage location.

4. A further command signal for the members 13 and 14 to move a slight distance upwards now raises the pallets above the angle irons 3 on which they were resting and causes the arms 11 and 12 to retract along the Z axis.

5. Further combined signals now cause the transporter 9 to align itself along the X axis with the machine tool 4 and the members 13 and 14 to be aligned along the Y axis just above the level of the roller conveyor 23.

6. As soon as the transporter 9 and the members 13 and 14 come to rest, the arms 11 and 12 move along the Z axis until the pallets are above the roller conveyor 23. The members 13 and 14 then move downwards so that the pallets are supported by the roller conveyor 23 with the arms 11 and 12 coming to rest in the recesses 24 and 25.

7. The arms 11 and 12 move along the Z axis until clear of the machine tool 4. The transporter 9 is now free and can be used by the computer to perform a further transport operation which may be:

(i) To select a pallet with a quite different workpiece from the container 1 for transfer to the machine tool 5 for the production of a different component, or (ii) to return to the container 1 to a different selected storage location for the transfer of a further pallet having a similar workpiece to the first fixed thereto, the further transport operation performed depending on the programme.

8. To return to the pallet on the roller conveyor 23 of the machine tool 4, plunging means which for convenience is not shown in the drawing such as a hydraulically operated pusher, transfer the pallet between the guides 30 of one paddle of the pallet holder 29.

9. The pallet holder 29 rotates in a counterclockwise direction, as seen when looking at the drawing, through 90°.

10. A further plunger which for convenience is not shown in FIG. 1 (but which may be as later described with reference to a later described embodiment) removes the pallet from the paddle of the holder 29 and ejects it onto a vertical face of the machine tool 4 proper.

11. The machine tool 4 accepts the pallet which it then shuffles into position as disclosed in U.S. Pat. No. 3,243,178 issued Mar. 29, 1966.

12. The machine tool 4 carries out its machining operation as disclosed in U.S. Pat. No. Re. 25,956 issued Feb. 22, 1966.

13. The pallet with a partially finished workpiece is transferred back to the same paddle as that from which it came by the further plunger.

14. If stage 7 (ii) indicated above has been carried out the pallet holder 29 rotates a further 90° in a counterclockwise direction. The new pallet is transferred to the machine tool 4 for machining and return to the pallet holder, after which the pallet holder 29 completes a further 180° of rotation in the same direction (normally in 90° stages, a new pallet being fed into the machine tool at each stage). As the pallet holder is rotated the accumulated swarf is deposited from the recesses in the machined components into a collector bin in the base of 22. It should be noted that the paddle configuration is beneficial for swarf removal since each pallet is inverted after it leaves the machine tool. If there is no new pallet awaiting processing (for example because the programme has occupied the transporter with stage 7 (i) indicated above), the pallet holder 29 can rotate in a counterclockwise direction through 270°.

15. At the same time as stage 14 is being carried out the transporter 9 is again aligned with the machine tool 4 on the X, Y and Z axes with the arms 11 and 12 coming to rest in the recesses 24 and 25 respectively.

16. The reverse action to that of stage 8 now takes place and the plunger (which is not shown) pushes the pallet onto the roller conveyor 23.

17. The members 13 and 14 move upwards along the Y axis thus causing the pallet to be lifted, the arms 11 and 12 move away from the machine tool 4 along the Z axis and the transporter 9 moves along the X axis to the tank 7.

18. The transporter 9 comes to rest alongside the tank 7 which contains a liquid into which the partially complete workpiece and pallet can be dipped for removal of any extraneous metal, such as chips, that may be adhering to the former. This is carried out by aligning the cranks 31 and 32 with the edge of the tank 7 and then lowering the members 13 and 14.

19. After cleaning the workpiece in the tank 7 the transporter 9 moves along the X axis until it is aligned with the machine tool 6, while the members 13 and 14 again are aligned above the level of the roller conveyor 23.

20. The sequence of stages 6 to 18 is now repeated with the machine tool 6 taking the place of the machine tool 4. The workpiece at the end of the repeated stage 12 has then been machined into a finished component.

21. After the second cleaning in the tank 7 the finished component may be dried by, say, a hot air drier. This drying means is not shown, but would be positioned alongside the track 8 next to the tank 7, the transporter 9 taking the pallet to the drier in a manner as described with regard to the tank 7.

22. After the finished component is dried, the transporter 9 moves along the X axis until it is aligned with a storage position in the dumping container 2, the exact storage position being indicated by the computer 19. The members 13 and 14 move along the Y axis and the arms 11 and 12 along the Z axis until the pallet with its finished component is slid into the appropriate angle irons 3.

23. The transporter 9 is now ready to continue with further transport operations, for example to deal with a semi-finished workpiece of the same kind on the machine tool 4 or to deal with a different workpiece on the machine tool 5. The programme selects its task for it and this task it carries out.

The final operations on the completed components stored in the container 2 may comprise removal from the pallet, inspection, and the removal of any metal that may have been used for securing the workpiece to the pallet.

In the above description of the operation of the installation shown in FIG. 1, each pallet is described as being loaded with a single workpiece, and as being stored in the containers 1 and 2, transported and fed into and from the machine tools singly and individually. In some cases, however, a pallet may be loaded with more than one workpiece, and the pallets may be stored, transported and fed into the machine tools in linked pairs in a manner as later described with reference to another embodiment, the machine tools, or some of them, being in that case twin spindle machines.

If during the operations described one of the machine tools were to break down or to become unserviceable for any other reason then the computer 19 would be provided with the facility for rescheduling or modifying the programme of operations. Thus it could cause the transporter 9 not to accept pallets destined for loading onto the failed machine tool.

FIG. 1 shows only one line of machine tools on one side of the track 8, but a second line of units could be located opposite the existing line. If this were to be done, then the transporter 9 would have to be modified, to enable it to receive and deliver pallets at either side of the track 8, for example by the provision of 9 mechanism as later described with reference to FIGS. 24 to 31.

The container 1 may be stored with taped programmes for the control unit 19 which would then have to be positioned in line with the other units or with magazines of tools for the machine tools 4, 5 and 6, in addition to the store of pallets. Transfer by the transporter 9, though slightly different from the process already described, would then follow along the same broad lines.

OVERALL DESCRIPTION OF SECOND EMBODIMENT

Before describing the system shown in FIGS. 2, 3 and 4 in detail with reference to the drawings a broad overall picture of its construction and manner of operation will be given.

The system comprises a plurality of numerically-controlled machine tools each of which receives workpieces carried on pallets and carries out machining operations on the workpieces, associated equipment to handle the workpieces, and equipment to control the operation of the system to keep the machine tools fully loaded with work so that as much as possible of the available machining time of the machine tools is utilized.

The system may be considered as having two distinct parts or areas; firstly, a machining area in which all operations are mechanized and which may function continously and secondly, a feed area in which human operators discharge important functions and which may be in operation discontinuously e.g. for only one shift each day. Numerically-controlled machine tools are in a sense automatic in operation; each tool is coupled to a numerical control unit arranged to control the machine tool's operation in a manner defined by data recorded on tape readily available to a tape deck associated with said unit, while initation of each such machining operation and selection of a tape or section of tape carrying data appropriate to each required operation is remotely controlled by a main control unit which is of the nature of a computer, as will later be explained. Workpieces are carried to and from the machine tools on pallets (i.e. workpiece carriers which are of standard form, whatever the shape or size of workpiece secured thereto) and the machine tools are adapted to receive, locate, hold, release, and eject pallets as automatic operations, initiated by the computer. Within the machining area, a transporter remotely controlled by the computer is arranged to carry pallets between the machine tools and a pallet store generally in the form of a rack containing a compartment for each pair of pallets employed.

The pallet store forms an interface, or a link or buffer store between the machining area and the feed area, the machining area being essentially one in which operations are automatically carried out continuously, and the feed area being one in which operations are discontinuous. The feed area may be considered as sub-divided into a pallet area and an ancillaries area. In the pallet area, a further transporter (similar to that in the machining area) is arranged to carry pallets between the pallet store and a work setting location consisting of a bench comprising a number of tables manned by human operators. At some of these tables, termed work-setting or work-fixing stations, the operators secure workpiece blanks to empty pallets and remove machined workpieces from pallets; the remainder of the tables are termed work resetting or refixing stations, as at these the operators alter the positions or attitudes of, or otherwise refix, or reset, workpieces on pallets, when this is necessary to permit all desired machining operations to be performed (e.g. where recesses are to be milled in all six faces of a cuboid blank).

In an ancillaries area, a third transporter is provided, generally similar in form to those operating in the machining and pallet areas and also remotely controlled by the computer, but adapted to carry bins rather than pallets. This third transporter (hereinafter termed the bin transporter) is arranged to carry bins between a bin store (again a form of rack having compartments each adapted to accommodate one bin) and a bin conveyor which conveys the bins between the ancillaries area and the work setting location. In the ancillaries area material, including workpieces and tooling required for fixing workpieces to pallets, is loaded into and unloaded from the bins by human operators.

GENERAL DESCRIPTION OF SECOND EMBODIMENT WITH REFERENCE TO FIGS. 2, 3, 4A AND 4B

Referring now to FIGS. 2 and 3, the installation shown includes six machine tools 101, 102, 103, 104, 105 and 106 which are complementary in that they can together perform the machining operations necessary to produce a variety of components; in other words any component of the said variety can be produced by feeding the workpiece from which the component is to be machined to a predetermined selection of one or more of the machine tools 101–106 and performing on the workpiece appropriate machining operations. Each of the machine tools 101–106 has an associated loading unit, indicated as 107, 108, 109, 110, 111 and 112 respectively, comprising a pallet loader or pallet holder, i.e. a device capable of carrying a plurality of pallets and having means to feed pallets from the device into the machine tool and from the machine tool back onto the device, which provides a buffer store for pallets at the machine tool, and a tool magazine loader or holder, i.e. a device capable of carrying a plurality of tool magazines and having means to feed tool magazines from the device into the machine tool and from the machine tool back onto the device, which provides a store of tool magazines at the machine tool, thus making a number of tools readily available for use by the machine. The pallet loader and tool magazine loader comprise rotatable members with paddles adapted to carry pallets and tool magazines respectively and are described in greater detail later. Each of the machine tools 101–106 is provided with mechanism for automatically shuffling a pallet into accurate position for machining of a workpiece loaded on the pallet, as described in U.S. Pat. No. 3,243,178 issued Mar. 29, 1966. and the machine tool has means to automatically select a tool from a tool magazine in the machine as described in U.S. Pat. No. Re. 25,956 issued Feb. 22, 1966.

The machine tools 101–106 are arranged in a line or row along one side of a pallet store in the form of a rack 113 having through compartments for pallets, i.e. compartments into which, or from which, pallets can be placed, or taken, at either side of the rack. A transporter 114 is positioned between the rack and the machine tools to transport pallets loaded with workpieces for machining from the rack to the machine tools, and to transport pallets loaded with workpieces which have been machined from the machine tools back to the rack. For reasons explained later the pallets are in fact stored and transported in linked pairs. The transporter 114 is movable along the rack 113 and has pallet-carrying means which are movable vertically so that the pallet-carrying means can be aligned with any compartment in the rack for delivery of a pair of pallets to, or withdrawal of a pair of pallets from, the compartment, and so that the pallet-carrying means can be aligned with the pallet loader of any of the machine tools 101–106 to deliver a pair of pallets thereto, or withdraw a pair of pallets therefrom. At one end of the pallet rack 113 there is a further rack 115 providing a tool magazine store and having compartments each adapted to contain one tool magazine. The transporter 114 can also move along the tool magazine rack and is provided with tool magazine-carrying means which are vertically movable and can therefore align with any compartment to deliver a tool magazine to, or withdraw a tool magazine from the compartment, and so that the tool magazine-carrying means can further align with the tool magazine loader of any of the machine tools 101–106 to deliver a tool magazine thereto, or to withdraw a tool magazine therefrom. The transporter will be described in greater detail later.

Each pair of linked pallets has an identifying number (arranged on the pallets in a form explained later) and has a uniquely allocated compartment in the pallet rack 113, so that a pair of pallets does not enter a compartment in the rack other than its allocated compartment. Similarly each tool magazine has an identifying number and a uniquely allocated compartment in the tool magazine rack 115 which is the only compartment that the tool magazine enters. Spaced from the end of the tool magazine rack remote from the pallet rack there are two transit sections 116 and 117, each consisting of a single vertical column of through compartments for tool magazines. These transit sections are also within the range of the transporter 114 and are provided so that a human operator can place a tool magazine containing tools which will be required for machining operations in a compartment of one transit section 116 (from one side thereof). The transporter 114 takes the magazine from the transit section (at the other side thereof) to its allocated compartment in the tool magazine rack (for onward transport to the appropriate machine tool when required). A tool magazine containing tools which will not be needed again for machining operations for some time can be taken by the transporter 114 from its compartment in the tool magazine rack 115 (or direct from the machine tool which last used the tool magazine) and placed in the other transit section 117 (at said other side thereof) for removal (from said one side) by a human operator. The transporter 114 is provided with monitoring means, in the form of read heads, to read and feed back signals indicative of the identifying number of the pallets or the tool magazine it is carrying for a purpose which will later become apparent.

Along the side of the pallet rack 113 opposite to the side on which the machine tools are located is a work-setting or work-fixing location consisting of a number of work-fixing tables 118–133, at which workpieces for machining are loaded on or fixed to pallets, and workpieces whose machining has been completed are unloaded from pallets, and a number of separate work refixing or resetting tables 134–137, at which workpieces which have been partly machined are unloaded from and reloaded on pallets in a different attitude, or otherwise re-fixed or reset (e.g. by applying different fixing clamps without altering the attitude of the workpiece), for further machining operations.

The work-fixing and refixing tables are arranged in a single line or row as shown and a transporter 138, similar to the transporter 114 and having pallet-carrying means but not tool magazine-carrying means, is provided between the pallet rack and the work-setting tables empty pallets for loading with workpieces, and pallets loaded with workpieces whose machining has been completed for unloading, and to transport from the workfixing tables to the rack pallets loaded with workpieces for machining, and empty pallets from which machined workpieces have been unloaded. The transporter 138 further transports from the pallet rack to the work refixing tables pallets loaded with partly machined workpieces for refixing or re-setting, and transports from the work refixing tables to the pallet rack pallets loaded with refixed or reset workpieces for further machining. In a manner as previously described in relation to the transporter 114, the transporter 138 can align its pallet-carrying means with any compartment of the pallet rack and with any of the work fixing and refixing tables for delivery or withdrawal of pallets.

Each of the work-refixing tables is provided with a mechanism as described in U.S. Pat. No. 3,243,178 issued Mar. 29, 1966 for automatically shuffling pallets into accurate position for work refixing or resetting operations.

A two-way conveyor 139 extends along the work setting location. The conveyor consists of an endless conveyor band having two horizontal runs at different levels, of which the upper run conveys material to the work fixing tables and the lower run conveys material from the work fixing tables. The material, consisting of workpieces, tooling for fixing workpieces to pallets, and templates and instructions for such workfixing, is conveyed in bins carried on the conveyor from and to a bin preparation area indicated generally at 140. The bin preparation area 140 is described in greater detail later, and can, for present purposes, be considered simply as an area in which bins are loaded with the necessary material for dispatch to the work-fixing tables, and in which bins returning from the work-fixing tables are unloaded. The conveyor 139 conveys from the bin preparation area 140 to the work-fixing tables 118–133 bins containing workpieces and tooling, templates and instructions for fixing the workpieces to pallets, and also empty bins for filling with machined workpieces and tooling which have been unloaded from pallets. The conveyor 139 conveys from the work-fixing tables 118–133 to the bin preparation area bins containing templates and instructions which have been used for fixing workpieces to pallets, and also bins containing machined workpieces and tooling which have been unloaded from pallets. The conveyor 139 further conveys from the bin preparation area to the work-fixing tables 118–133 bins containing tooling, templates and instructions required for refixing or resetting of partly machined workpieces on pallets, and conveys from the work-fixing tables to the bin preparation area bins containing tooling which has been unloaded from pallets and discarded during a refixing or re-setting operation and templates and instructions used for the work refixing or re-setting operations. Each of the work-fixing tables (which will be described in greater detail later) has automatic deflecting means to deflect from the conveyor a bin destined for that table. Each work-fixing and work refixing table has monitoring means, in the form of a read head, to read and feed back a signal indicative of the identifying number of a pair of pallets loaded with workpieces for machining and ready for transport from the table to the pallet rack 113 by the transporter 138. The purpose of the monitoring means will later be made apparent.

The work-fixing tables 118–133 are each manned by a human operator who performs the work-setting operations at that table. Work refixing or resetting operations are performed by the same operators. When work resetting operations are required operators go, taking with them to the appropriate work refixing tables bins received at their work-fixing tables and each containing tooling, a template and instructions for work refixing. At the work resetting station the operators perform the necessary re-fixing operations, and then return with the bins (containing any discarded tooling and the templates and instructions) to their work setting tables where the bins are placed on the lower run of the conveyor 139 for return to the bin preparation area. A panel, described more fully later, at each work-setting table informs the operator when he (or she) is required to go to a work refixing table to perform a refixing operation.

Each bin has an identifying number and there is provided in the bin preparation area 140 monitoring means to feed back a signal indicative of the identifying number of a bin and associating it with its contents when the bin is loaded, in a manner more fully explained later. Each work-fixing table also has monitoring means to read and feed back a signal indicative of the identifying number of a bin received from the conveyor 139 at that table.

The bin preparation area 140 includes a bin store, in the form of a rack having a main section (consisting of two parts 141 and 142 opposite one another) with compartments each adapted to contain one bin. Each bin has a particular uniquely allocated compartment which is the only compartment in the main section entered by that bin. There are also three transit sections 143, 144 and 145, each consisting of a single vertical column of through compartments. The first transit section 143 is for empty bins to be taken therefrom by human operators for loading. The second transit section 144 is where bins which have been loaded with material are placed by the human operators. The third transit section 145 is where bins, which have been returned on the conveyor 139 and unloaded, are placed by human operators.

A transporter 146, generally similar to the transporters 114 and 138 previously described, but having bin-carrying means instead of pallet-carrying means, is positioned between the two opposed parts 141 and 142 of the bin rack to transport empty bins from the main section 141 and 142 to the first transit section 143, to transport loaded bins from the second transit section 144 to the main section 141 and 142, and to transport empty bins from the third transit section 145 to the main section 141 and 142. The transporter 146 also takes bins for dispatch to the work-fixing and refixing tables from the main section 141 and 142, and deposits them on the upper run of the conveyor 139, which passes through an opening in the bin rack.

The compartments of the transit sections 143-145 are each provided with a switch operated by placing a bin in the compartment to feed back signals indicative of the absence of a bin in the first transit section or the presence of a bin in the second or third transit sections. The signals are used to instruct the transporter 146 to perform transport operations, subject to other commitments, to keep the first transit section as full as possible with empty bins, and to keep the second and third transit sections as empty as possible of loaded and unloaded bins respectively. The transporter 146 is provided with monitoring means, in the form of a read head, to read and feed back a signal indicative of the indentifying number of a bin it is carrying, for reasons which will later become apparent when the operations performed in the bin preparation area are more precisely described.

Figure 4B:
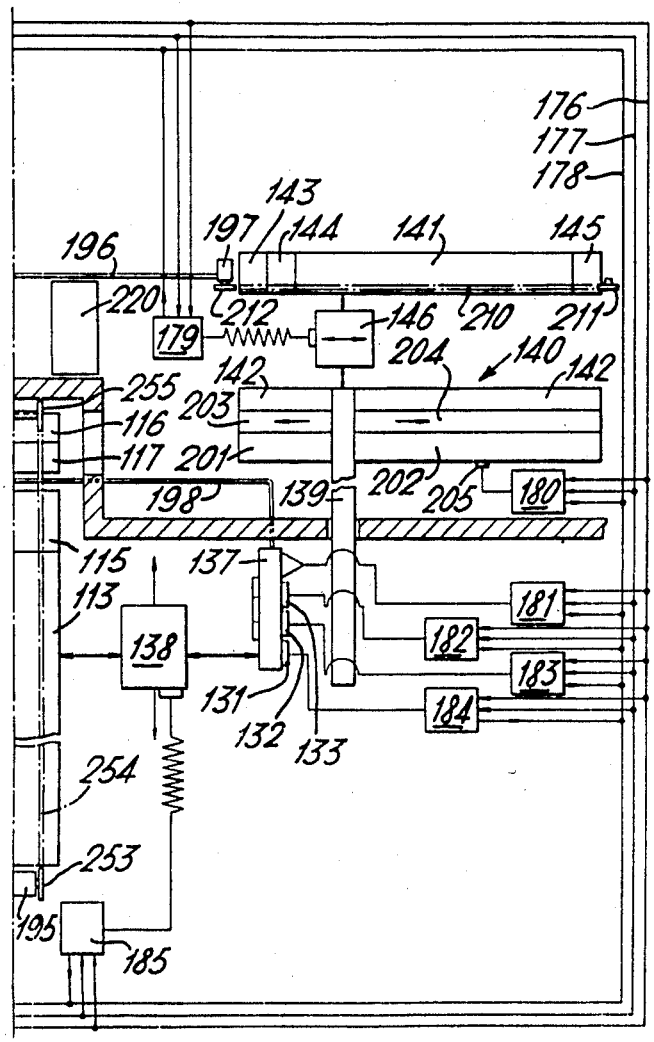

The control communications of the system are diagrammatically illustrated in FIGS. 4A and 4B in which for convenience only one machine tool 106, and its associated equipment, three work fixing tables 131-133 and one work re-fixing table 137 are shown. It is to be understood that the devices shown and described are also applicable to the other machine tools and work fixing and re-fixing tables.

The machine tool 106 has an associated numerical control unit 147, which controls relative movement between the tool holding spindle and the workpiece being machined (by controlling slides which move the spindle or the workpiece), and a function control unit 148 which controls all other functions of the machine tool such as the choice of cutter speeds, tool changing, tool datum procedure, etc. the function control unit having an operational link with the numerical control unit. The control units 147 and 148 are programmed from a tape deck 149. The location of the tape decks 149-154, with numerical control units 147 and 155-159 beneath them, and the location of the associated function control units 148 and 160-164 for each of the machine tools respectively is shown in FIG. 3. The tape deck 149 runs through cassetted tapes selected from a random access tape store 165, as described in U.S. Pat. Application Ser. No. 725,822 filed May 1, 1968, by R. H. G. Raine. There is one such tape store—165-170 in FIG. 3—for each of the tape decks 149-154. The machine tool further has, as previously mentioned, a pallet loader 171 and a tool magazine loader 172 whose operations are controlled by the function control 148.

The running control of the system or installation, including the control of transport operations performed by the transporters 114, 138 and 146, the control of machining operations performed by the machine tools and control of the pallet and tool magazine loaders 171 and 172 is effected by an on-line computer 173, which is programmed by a main scheduling computer 174. The computer 173 controls the machining operation by controlling the function control unit 148 to cause it to select a predetermined tape from the tape store 165 for use on the tape deck 149, and the computer 173 also controls the pallet loader 171 and tool magazine loader 172 through the function control unit 148. The on-line computer exercises control, via a multiplexer 175 providing a computer-to-communication-line interface, through three communication channels 176, 177, 178 leading to AID (Address, Instruction, Data) points 179-188 which are connected to positions in the system which are to be interrogated or instructed, thus providing a communication link between the computer 173 and these positions.

Each of the communication channels 176-178 has sixteen lines or wires so that coded signals can be sent by passing pulses through different combinations of lines.

The channel 176 is an Address channel to call up an addressee position, the channel 177 is an Instruction channel for issuing instructions and the channel 178 is a Data channel by which data (including feed back signals previously mentioned) is communicated from the AID points to the computer 173. The computer 173 monitors the whole system continuously by repeatedly contacting sequentially all the AID points in the system. It will be appreciated that transmissions between the computer and the AID points can be effected in very rapid succession and the computer can complete a cycle of contacting sequentially all the AID points in the system in about one second. De-coding of transmitted instruction signals into a form to effect compliance with the instruction can take place at the AID points or at the positions with which they connect.

As shown in FIG. 4B, the AID point 179 connects with the bin transporter 146 so that the computer 173 can instruct the transporter to perform transport operations (e.g. to take a bin from a specified compartment of the bin rack main section 141 and deliver it on to the conveyor 139) and can receive feed back signals from the transporter 146 indicative of the identifying number of the bin it is carrying. The AID point 180 connects with a device (which is later described) in the bin preparation area whose function includes the feed back of signals associating the number of a loaded bin with its contents.

The AID points 182, 183 and 184 connect respectively with the work-fixing tables 133, 132 and 131 so that the computer 173 can receive feed back signals from these tables indicative of the identifying numbers of bins received at these tables or of loaded pallets ready for transport from the tables. The computer 173 can also issue instructions effective to light up parts of the panel (previously mentioned and to be fully described later) to inform the human work setter what operations are required. The AID point 181 connects with the work re-fixing table 137 so that the computer can receive feed back signals from that table indicative of the identifying numbers of pallets loaded with workpieces and ready for transport therefrom.

The AID points 185 in FIG. 4B and 186 in FIG. 4A connect respectively with the transporters 138 and 114 so that the computer 173 can instruct the transporters to perform transport operations (e.g. to transport a pair of pallets from a specified compartment of the pallet store 113 respectively to a specified work-setting table, or to a specified machine tool) and can receive feed back signals from the transporters indicative of the identifying numbers of pallets (and, in the case of the transporter 114, tool magazines) being carried.

The AID point 187 in FIG. 4A connects with the function control unit 148 of the machine tool 106 so that the computer 173 can instruct the function control unit to select a specified tape from the tape store 165, and to operate the pallet loader 171 and the magazine loader 172. The pallet and magazine loaders are provided with monitoring means, in the form of read heads, to feed back to the computer 173 signals indicative of the identifying numbers of pallets and magazines respectively about to be fed into or just received from the machine tool.

The AID point 188 connects with coding and decoding devices serving a human controller 189 whose function is to deal with any unforeseen contingency not allowed for in the computer's programme and memory band, or contingencies of such rarity as to be specifically excluded from the computer's programme. If data received by the computer 173 indicates there is something wrong in the system the computer can so inform the controller 189 who can then, if necessary, interrogate the computer to ascertain the precise nature of the trouble, and can instruct the computer to modify its programme as necessary to cope with the contingency.

The AID points and their connections provide means to monitor the system continuously and keep the computer informed of the state of the system.

FIG. 4A also shows a central hydraulic power plant 190 which provides hydraulic power via a line 191 to the machine tool 106, via lines 192 and 193 to the pallet loader 171 and tool magazine loader 172 respectively, via a line 194 to a hydraulic motor 195 driving the transporters 114 and 138 (as later described), via a line 196 to a hydraulic motor 197 driving the bin transporter 146 (again as later described), and via a line 198 to the work refixing table 137, all these positions including hydraulically operated mechanisms.

The operation of the system or installation shown in FIGS. 2, 3, 4A and 4B will now be described. It is to be understood that the arrangement of an installation or system according to the present invention is flexible, as is the manner of operation, so that the system illustrated, and its manner of operation described below are given only by way of example.

GENERAL OPERATION OF SECOND EMBODIMENT

Production scheduling is carried out on a weekly or longer basis by the computer 174 which is fed with a weekly list of the parts or components, and their quantities, to be manufactured during that period. The computer extracts from punched cards or magnetic tape or its accumulated memory store the relevant information appertaining to these parts (including the selection of one or more machine tools, and the machining operations to be performed to produce the various parts or components) so as to produce a schedule of the sequence and timing of the machine loading and of the transport and other operations, in order to complete its programme. The weekly programme arrived at by the computer 174 is fed to the on-line computer 173 on a day-to-day basis, so that each day the on-line computer 173 receives from the computer 174 a programme to be carried out by the system or installation, and the on-line computer 173 controls operations performed in the system to follow that programme. The on-line computer 173, although adhering to the programme as fully as possible, is capable of modifying it according to circumstances made apparent by signals fed back from monitoring means in the system, or on receipt of instructions, e.g. from the human controller, such as the introduction of a rush order which is to be fed through the system with priority over the normally programmed orders. At the end of each day the on-line computer 173 feeds back to the scheduling computer 174 a schedule of all events which have occurred during that one day's operation. The next day's programme may have to be modified in accordance with this schedule. For example, if the system has failed to complete the programme for that day, as determined by the computer 174, the on-line computer 173 so informs the scheduling computer 174 which can then include those operations which were not completed at the beginning of the next day's programme.

Whereas two separate scheduling and on-line computers 173 and 174 are shown, it would be possible to use only one computer which could combine both functions, i.e. the scheduling carried out by the computer 174 and the on-line control of the system performed by the computer 173. The single computer would necessarily be bigger than either of the separate ones and would have to remain on-line all the time to control the system. Further the on-line computer (whether separate from or combined with the scheduling computer) could directly control the machining operations performed by the machine tools 101–106 instead of effecting such control through a numerical control unit and a function control unit associated with each machine tool, but again this would require a considerably larger computer. Such large computers, although feasible, can in some circumstances be less economical than separate computers and control units as adapted in the system shown and described.

Each job, i.e. each batch of individual similar parts or components (it being noted that the system is best suited and particularly devised for batch production rather than for mass production, although capable of the latter), is planned to pass through the system over a two day period. On the first day the workpieces, tooling etc. are loaded into bins in the bin preparation area and the full bins transferred to the bin store, and on the second day the bins are dispatched from the bin store to the work-setting tables, where the workpieces are loaded on pallets which then pass, via the pallet store 113, to the machine tools for the necessary machining operations. When appropriate the pallets will also pass to the work re-setting tables and will go back to the machine tools for further machining. A pallet carrying a workpiece requiring machining by more than one of the machine tools is always returned to the pallet store after machining by one machine tool and before machining by another. Each two-day period overlaps and preceding and succeeding periods by one day so that while bins are being loaded with workpieces one day, the workpieces loaded into bins on the preceding day are being loaded on pallets and machined.

The human operators in the bin preparation area and at the work-fixing tables work an 8 hour day while the machine tools operate (subject to time out for maintenance) 24 hours a day, the pallet store 113 provides an interface between the discontinuous human operations and the continuous machining operations. The overall average output of the human operators and of the machine tools (in terms of the quantity of individual pallets and workpieces dealt with) must, of course, be equal for the system to keep running, but the instantaneous output differs when the human operators are working by a ratio of about 3 to 1 since the human operators must perform in 8 hours the operations necessary to keep the machine tools operating for 24 hours. Thus, in general, pallets loaded with workpieces by human operators during their 8 hour day are machined by the machine tools during that 8 hours and the following 16 hours. In practice, of course, there must be a small overlap to keep the machine tools occupied while the human work-setters unload machined workpieces from pallets (this operation being programmed to take place at the beginning of the 8 hour working period of the human operators) and commence their work-setting operations. Thus, during the initial part of the day shift the machine tools will be machining workpieces which were loaded onto pallets during the previous day shift. Similarly, in the bin preparation area bins returning on the conveyor 139 and containing machined workpieces which have been unloaded from pallets by the worksetters are unloaded from the bins at the beginning of the 8 hour period worked by the human operators in that area.

To avoid unnecessarily lengthy distances of travel by the transporter 138 the programme is arranged so that pallets from a portion of the pallet rack 113 are transported to the work-setting and work re-setting tables nearest to that portion. Thus, for example, the work-setting tables 131–133 and the work re-setting table 137 are generally served with pallets from the far end portion of the pallet rack 113 as viewed in FIGS. 2 and 3.

GENERAL OPERATION AS DIAGRAMMATICALLY ILLUSTRATED IN FIG. 5

By way of illustration and example the travel of a pair of workpieces through the system or installation will now be described with reference to FIG. 5. In this figure the various locations and devices are represented along the ordinate axis, by their respective references. The abscissa represents a time scale but only for the purpose of illustrating during which part of the day, and on which day of the two-day period, the operations are performed; thus the distance along the abscissa projected by a line representing a transport operation is not to be taken as representative of the time actually taken for that operation. The time scale is divided into 8 hour periods, the figures indicating the actual time of day based on a 24 hour clock and the rectangles represent the periods of operation of the various devices and locations. A light line with equispaced breaks represents travel of an empty bin and a heavy line with equispaced breaks represents travel of a bin containing material. A light chain-dot line represents travel of a pair of empty pallets, and a heavy chain-dot line represents travel of a pair of pallets loaded with workpieces.

Figure 5:
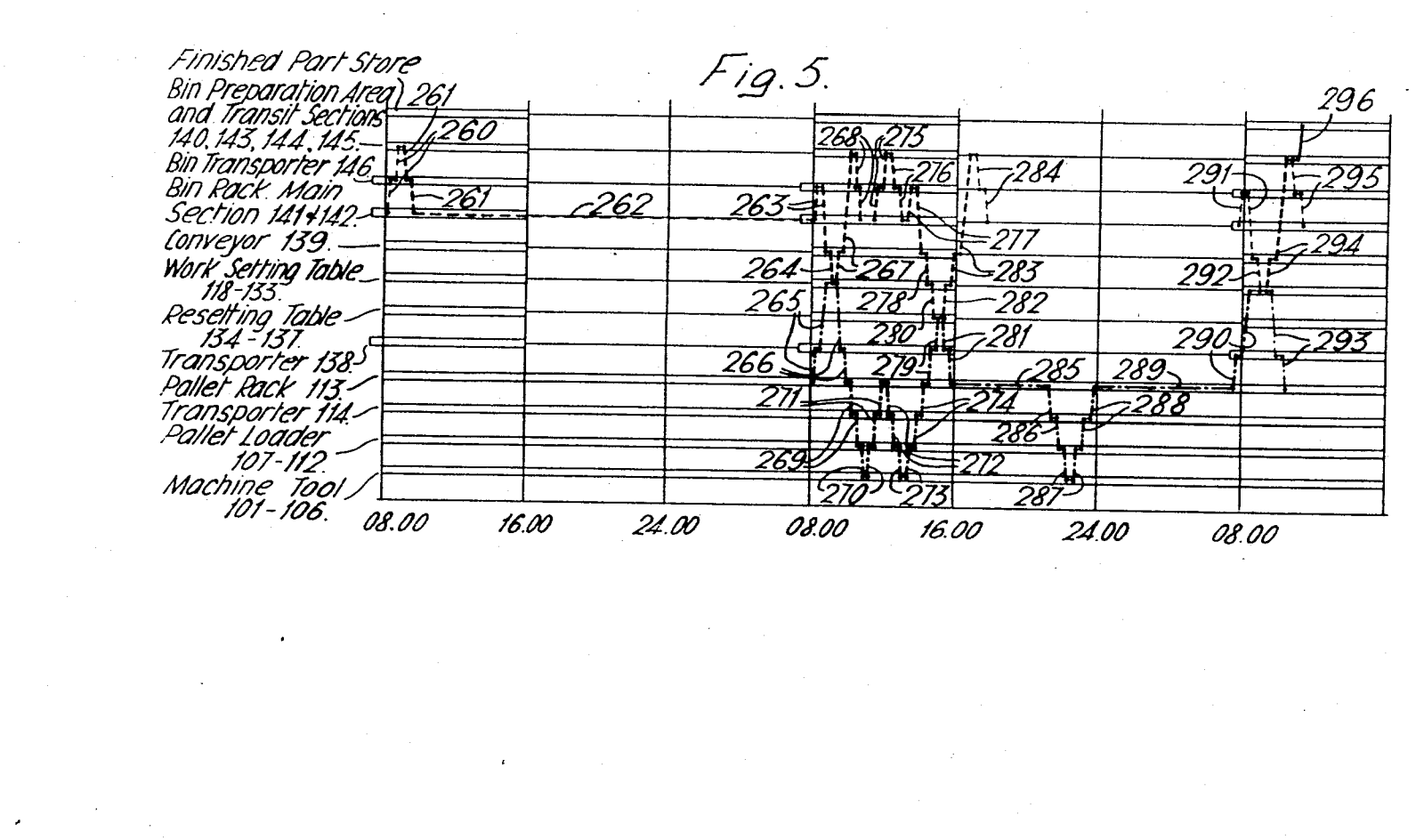

The workpieces whose travel is illustrated in FIG. 5 are ones which require machining on two machine tools prior to work re-setting and on one machine tool after work resetting. In the description that follows the reference indicating the appropriate lines in FIG. 5 is given in brackets as the transport operation represented by those lines is described.

Commencing at 800 hours on the first day, when the human bin-loading and work-setting operators begin their 8 hour shift, an empty bin is taken from its allocated compartment in the main section 141 and 142 of the bin rack by the bin transporter 146 and delivered to transit section 143 of the bin preparation area 140 (260). After removal of the bin from the transit section 143, a human operator loads the bin with workpieces, tooling, worksetting template, and instructions, when the identifying number of the bin and the number of the job with which it is loaded are read and fed back to the computer 173, and places the loaded bin in the transit section 144. The bin transporter 146 collects the bin from the transit section 144, reads its number, and places it in its allocated compartment of the main section 141 and 142 of the bin rack (261). The loaded bin then remains in this compartment until after 800 hours on the next day (262).

On the second day the bin transporter 146 collects the bin from its compartment and places it on the upper run of the conveyor 139 (263), which carries it to the designated work-setting table 118–133 (264). On arrival at the work-setting table the bin's number is read and the signal fed back initiates operation of the transporter 138 to collect the first pair of empty pallets of a group which the computer programme has allocated to that job from their compartment in the pallet rack 113 and deliver them to the work-setting table 118–133 (265). After the pair of pallets is received at the work-setting table, the work-setter loads the workpieces onto the pallets, and then places the loaded pallets at a collection position where their number is read. The signal fed back initiates operation of the transporter 138 to collect the loaded pallets from the work-setting table and deliver them to their allocated compartment in the pallet rack 113 (266). When the worksetter has finished loading the workpieces contained in the bin onto pallets, the bin, containing the template and instructions used for worksetting, is placed on the lower run of the conveyor 139 by which it is returned to the bin preparation area 140 (267). The bin is then unloaded of its remaining contents by a human operator and placed in the transit section 145, from which it is collected by the bin transporter 146, has its number read, and is then delivered to its allocated compartment in the main section 141 and 142 of the bin rack (268).

When the time comes for the workpieces to undergo their initial machining, the loaded pallets are collected from their compartment in the pallet rack 113 by the transporter 114 and delivered to the pallet loader 107–112 of the machine tool 101–106 required to perform the initial machining (269). They are then fed into the machine tool for machining after which they are returned to the pallet loader (270). The transporter 114 collects the pallets from the pallet loader 107–112 and returns them to their allocated compartment in the pallet rack 113 (271), where they stay until the time comes for their machining on the second machine tool. They are then delivered by the transporter 114 to the pallet loader of that machine tool (272), fed into the machine, machined, and returned to the pallet loader (273), from which they are delivered by the transporter 114 back to their allocated compartment of the pallet rack 113 (274).

The workpieces then have to undergo a resetting operation before they can pass to their final machining operation, and it will be noted from FIG. 5 that both of the first two machinings take place during the 8 hour shift worked by the human operators so that the workpieces are ready for resetting by a human operator before the end of that shift on the second day. This enables the workpieces to be completely machined, including the machining after re-setting, in one 24 hour day, and can be achieved as explained later by arranging the programme as far as possible so that those workpieces which require resetting are the first in the day to pass through their initial machining operations. However, as is also explained later, resetting and subsequent machining could be considered and treated as a separate job arranged to take place on the day after the initial setting and machining.

Returning to FIG. 5, while the workpieces are undergoing their initial setting and machining operations to render them ready for resetting, the bin transporter 146 collects an empty bin from its compartment in the main section 141 and 142 on the bin rack and deposits it in the transit section 143 of the bin preparation area 140 (275). The bin is taken from this transit section by a human operator, loaded with a work re-setting template, instructions and any necessary tooling, and placed in the transit section 144, from which it is then collected by the bin transporter 146 and placed in its allocated compartment in the main section of the bin rack 141 and 142 (276). As explained later, the bin containing material required for resetting could be loaded at a time different from that indicated by FIG. 5, and could, for example, be loaded at the same time as the bin containing workpieces and material required for the initial work-setting is loaded on the first day.

When the time for re-setting of the workpieces comes, the bin transporter 146 delivers the bin loaded with resetting material from its compartment in the main section 141 and 142 on the bin rack to the upper run of the conveyor 139 (277), which conveys the bin to the designated work-setting table 118–133 (278). As far as possible this work-setting table is programmed to be the same one as that at which the initial work-setting took place so that the same operator performs both the setting and resetting operations on the same workpieces. On arrival at the work setting table 118–133 the bin'number is read and the signal fed back initiates operation of the transporter 138 to collect the pair of pallets from their compartment in the pallet rack 113 and deliver them to the designated work resetting table 134–137 (279). The operator takes the bin from the work setting table 118–133 to the work resetting table 134–137 (280) and then performs the necessary resetting operations, and places the pallets loaded with the reset workpieces at a collection position at the resetting table where their number is read. The signal fed back initiates operation of the transporter 138 to collect the pallets and deliver them to their allocated compartment in the pallet rack 113 (281). After completing the resetting operations the operator takes the bin containing the resetting template, instructions and any tooling discarded during the resetting operations to the work setting table 118–133 (282) and deposits it on the lower run of conveyor 139 which carries it back to the bin preparation area 140 (283). The bin is then unloaded by a human operator and placed in the transit section 145 from which the transporter 146 delivers it to its allocated compartment in the main section 141 and 142 of the bin rack (284).

It will be understood that the operations performed by human operators are carried out before the end of the 8 hour shift worked by these operators, i.e., before 1600 hours. In FIG. 5 the last described human operation, namely unloading of the bin, is indicated as taking place after that time, but this is solely for the sake of clarity on the drawing. In practice the bin would either be returned to the bin preparation area 140 and unloaded before 1600 hours, or else it could be returned to the bin preparation area to await unloading the next morning when the human operators begin the next day's shift.

The machining of the workpieces after resetting can take place after 1600 hours and during the following 16 hours since the machining operations and the transport of pallets to and from the machine tools are automatic and do not need the intervention of human operators. The pallets thus remain in their compartment in the pallet rack 113 (285) until the programme requires that the workpieces are machined, when the transporter 114 is operated to deliver the pallets to the pallet loader 107–112 of the appropriate machine tool 101–106 (286). They are then fed into the machine tool, machined and returned to the pallet loader (287), from which they are collected by the transporter 114 and delivered to their allocated compartment in the pallet rack 113 (288).

The pallets carrying the completely machined workpieces remain in the pallet rack (289) until the next morning when the transporter 138 delivers them to the work setting table 118–133 at which they are to be unloaded (290). At this time the bin transporter 146 is operated to deliver an empty bin from its compartment in the main section 141 and 142 of the bin rack on to the upper run of the conveyor 139 (291) which carries the bin to the work-setting table 118–133 (292). The automatic operations of delivering the first pallets and empty bins to the work setting tables can take place before the human operators commence their shift at 800 hours so that the bins and pallets are ready and waiting when the human operators start work. A human operator unloads the workpieces and tooling from the pallets and places the empty pallets at the collection position on the work setting table 118–133, where their number is read, initiating operation of the transporter 138 to deliver the pallets to their compartment in the pallet rack 113 (293). The workpieces and tooling are placed in the bin which is deposited by the operator on the lower run of the conveyor 139 and returned thereby to the bin preparation area 140 (294). On arrival there the bin is unloaded, and the empty bin placed in the transit section 145 from which it is taken by the bin transporter 146 and delivered to its allocated compartment in the main section 141 and 142 of the bin rack (295). The unloaded workpieces are dispatched to their next destination, for example a finished parts store (296).

As is explained more fully later, some of the bins which are unloaded in the bin preparation area 140 may simply be placed in a queue from which human operators take empty bins for loading, thereby by-passing the transit sections 143 and 145 and the main section 141 and 142 of the bin rack and reducing the number of transport operations required to be performed by the bin transporter 146.

It will be appreciated that the automatic operations described above are performed under control and in accordance with the programme of the computer 173, and that when a reading signal fed back is said to initiate an operation it means that the computer receives the signal and causes performance of the operation at a time which is subject to other outstanding commitments of the device required to perform the operation.

To avoid unnecessarily lengthy transport operations by the transporter 114, the programme is arranged as far as possible so that workpieces are loaded onto pallets whose allocated compartments in the pallet rack 113 are near the machine tools required to perform machining operations on those workpieces.

DESCRIPTION OF NUMERICALLY-CONTROLLED MACHINE TOOLS IN SYSTEM SHOWN IN FIGS. 2 AND 6

It will be appreciated that the number and types of machine tools provided in any particular installation must be chosen to meet the machining requirements of the components to be produced by that installation and the particular combination of machines described below is given only by way of example.

The machines 101 and 102 are specialized high speed milling machines each having two cutter spindles and being generally as disclosed in U.S. Pat. No. Re. 25,956 issued Feb. 22, 1966. The machines 103 and 104 are specialised twin spindle drilling machines. The machine 105 and 106 are single spindle six-axis milling machines capable of carrying out all metal removal operations, including drilling, turning and boring, on five faces of a workpiece, the six axes of movement being explained later. The machines are particularly suitable for producing light alloy components but, if desired, generally similar suitable machines could be employed for machining steel or other materials.

Since four of the machine tools are twin spindle machines (i.e. can simultaneously perform identical machining operations on two workpieces side-by-side) the pallets on which workpieces are loaded are, as previously mentioned, transported, stored, and fed to the machine tools in linked pairs, the two single spindle machine tools being provided with means later described for unlinking and relinking the pallets of a pair.

A pair of linked pallets 301 and 302 is shown in FIG. 6. The pallet 301 is provided with side lugs 303 and 304, and the pallet 302 has similar side lugs 305 and 306, the pallets being linked by engagement of the lugs 304 and 305 to provide a linked pair with the lugs 303 and 306 projecting at the ends. Each pallet has its identifying number or process indicia (the numbers of the two pallets of a pair being the same) on one side (the sides 307 and 308 respectively) in the form of thirteen holes 309 each containing either a magnetic plug or a non-magnetic plug. Different identifying numbers are achieved by fitting magnetic plugs in different combinations of one or more holes, or, in other words, the numbers are based on a binary code with a magnetic plug indicating one and a non-magnetic plug zero. When the pallet pair is placed opposite a reading head (e.g. on the transporter 114) the identifying number can be read and a corresponding signal fed back to the on-line computer 173. The pallets are always stationary relative to the read head whenever the pallet numbers are read anywhere in the system to avoid the difficulty that the number read off would depend on the direction of travel of the pallet relative to the read head. It will be noted that the pallets 301 and 302 must be linked in one of two ways to keep the sides 307 and 308 bearing the numbers facing the same way, i.e. by either linking the lugs 304 and 305, as shown, or the lugs 303 and 306, and that the pallets must not be linked by engaging the lugs 303 and 305 or the lugs 304 and 306.

It will be appreciated that the particular method of providing identifying binary numbers is not essential, and that any other suitable method may be employed. This also applies to the identifying numbers provided on the bins and tool magazines later to be described. The read heads are, of course, adapted to detect the presence or absence of an element (which in the method described above is a magnetic plug) which indicates either 1 or 0.

Each pallet has a datum pad 310 at one corner for accurate location of a cutting tool in a manner essentially as described in U.S. Pat. No. Re. 25.956 issued Feb. 22, 1966 and also has a square matrix of fixing holes in its upper surface for fixing tooling as described in U.S. patent application Ser. No. 718,887 filed Apr. 4, 1968, by P. G. Davis. Each pallet further has "T" slots 311 in its base, and grooves 312 in its sides for a purpose which will later be made apparent.

PALLET AND TOOL MAGAZINE LOADING UNIT SHOWN IN FIGS. 9, 10 AND 11

Figure 9:
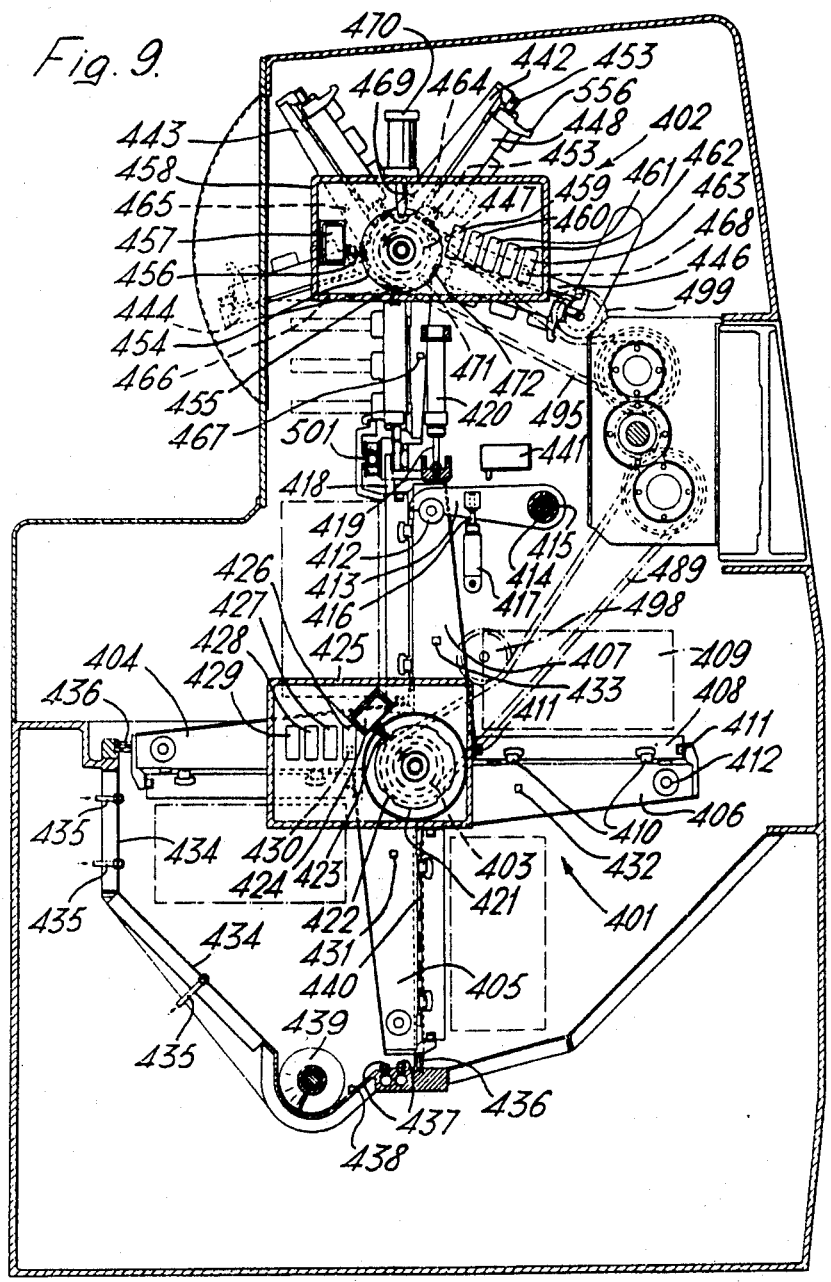
FIG. 9 is a sectional view through a loading unit associated with a machine tool and comprising a pallet holder or loader and a tool magazine holder or loader.

A loading unit, one of which is provided with each machine tool 101–106, and comprising a pallet holder or loader 401 and a tool magazine holder or loader 402 is shown in FIG. 9.

The pallet loader comprises a rotatable horizontal shaft 403 on which are mounted four substantially radial paddle members 404–407 spaced at 90° intervals and each adapted to carry a pair of pallets. In FIG. 9 the pallets are indicated by the reference 408 and the workpieces loaded on them (shown in broken line) by the reference 409. Each paddle 404–407 has projecting rollers 410, which locate in "T" slots in the base of the pallets, and further projecting end rollers 411, which locate in grooves in the side of the pallets. The rollers 410 and 411 are arranged in lines parallel to the axis of shaft 403 so that pallets can be moved onto and from a paddle by running the slots and grooves in the pallets along the rollers. The rollers 410 and 411 further serve to hold a pair of pallets on the paddle while the loader is rotated.

Each paddle 404-407 has a roller 412 mounted on one side near its outer end. At the upper vertical position (shown as occupied by the paddle 407) is a hook member 413 which can engage with this roller. The member 413 can pivot about a shaft 414 provided with a rubber bush 415, and can be moved upwardly by a rod 416 connected to the member 413 and operated by a hydraulic cylinder 417 containing a spring which urges the rod 416, and hence the member 413, downwardly.

Also adjacent the upper vertical position of a paddle 404-407 is a read-head device 418 which can be moved up and down by a rod 419 connected to it and operated by a two-way hydraulic cylinder 420. At its lower position (shown in FIG. 9) the read head device 418 can read the identifying number on the sides of the pair of pallets carried by the upper vertical paddle (shown as 407).

Connected to the shaft 403 for rotation therewith is a boss 421 having four peripheral detents 422. A roller 423, mounted on a micro-switch 424 in a fixed housing 425, can enter these detents and operate the switch 424. The housing 425 also carries four further microswitches 426-429, spaced at different distances from the shaft 403, which can respectively be operated by small projections 430-433 on the side of the paddles 404-407 and spaced at corresponding distances from the shaft 403. Thus, which of the switches 426-429 is operated depends on which paddle 404-407 is at the left hand horizontal position as viewed in FIG. 9.

Extending between the left hand horizontal position (shown occupied by the paddle 404) and the lower vertical position (shown occupied by the paddle 405) is a cover 434 accommodating air pipes 435 from which jets of compressed air are directed against the pallets and workpieces on the paddle at the left hand horizontal position and during their travel towards the lower vertical position. Brushes 436 are also provided at these two positions and further air jets 437 are arranged adjacent the brushes 436 at the lower vertical position. The air jets and brushes serve to remove swarf and foreign matter from the pallets and workpieces and the paddles, the swarf etc. falling into a channel 438 from which it is fed by a rotating archimedian screw 439 to a swarf disposal area in the machine tool. Each paddle 404-407 is provided with a brush 440, shown on the paddle 405, which brushes the base or back of a pair of pallets as they are moved across the paddle.

Adjacent the hook member 413 is a switch 441 which is operated when the member is raised, the switch being of a type such that when it is first pressed it engages a clutch in the drive (later described) to the shaft 403, and when it is next pressed it disengages the clutch.

The operation of the paddle loader is as follows.

Pairs of pallets are delivered to and received from the paddles 404-407 when stationary and at the right hand horizontal position as viewed in FIG. 9, which is shown occupied by the paddle 406, by the transporter 114. Normally the transporter first withdraws from the paddle at that position the pair of pallets on the paddle and loaded with workpieces which have been machined, and then delivers to the paddle a pair of pallets loaded with workpieces to be machined. Pairs of pallets are fed into the machine tool for machining, and received from the machine tool after machining, at the upper vertical position shown occupied by the paddle 407, the paddle remaining at that position during the machining operations. The loader is rotated anti-clockwise as viewed in FIG. 9 (by driving means later described and operable at two speeds) through 270° stages in 90° steps. Thus each 270° stage moves the pair of pallets, bearing workpieces which have just been machined, received on the upper vertical paddle to the right hand horizontal position ready for withdrawal by the transporter 114. During this travel the pallets and workpieces pass through the left hand horizontal and lower vertical positions and are therefore inverted, and cleaned by the air jets 435 and 437 and brushes 436. A pair of pallets delivered to a paddle at the right hand horizontal position pass through three 270° stages before they arrive at the upper vertical position for delivery into the machine tool. Thus, starting from the paddle positions shown in FIG. 9, the first 270° stage brings the paddle 404 to the upper vertical position, the second 270° stage the paddle 405, and the third 270° stage the paddle 406. During this travel the pallets and workpieces pass through the cleaning area of the air jets 435 etc. and the back of the pallets is cleaned by the brush 440 on the paddle as they are moved into the machine tool. By this arrangement a buffer store of two pairs of pallets bearing workpieces awaiting machining and one pair of pallets bearing workpieces which have been machined can be provided between the transporter 114 and the machine tool, so that operation of the latter is not delayed through other operational commitments of the former.

Movement through the 90° steps is effected as follows. The hook 413 is raised, thereby operating the switch 441 and engaging the clutch of the drive means to rotate the loader at its faster speed (about 15 r.p.m.). When the roller 423 drops into a detent 422 the microswitch 424 reduces the drive to its lower speed (about 2½ r.p.m.) and releases the hydraulic pressure in the cylinder 417 so that the hook 413 is spring urged downwardly. The lower surface of the hook member 413 then acts as a brake against the roller 412 on the paddle approaching the upper vertical position. This roller raises the hook member until the latter operates the switch 441, thereby disengaging the clutch of the drive means so that the paddle free wheels unti it is arrested by engagement of the hook 413 with the roller 412. The switches 426-429 then feed back a signal indicative of the position of the paddles, determined by which of the switches is operated, and if the paddle at the upper vertical position is not the one from which the next pair of pellets is to be fed into the machine tool, i.e. if the 90° step just completed does not end a 270° stage, the machine function control operates the hydraulic cylinder 417 to start another 90° step.

At the end of each 270° stage, i.e. after three 90° steps, the machine function control operates the hydraulic cylinder 420 to lower the read head 418, which can then read the identifying number of the pair of pallets about to be fed into the machine, and which can again read this number when the pallets are received from the machine tool after machining. Such readings are used to initiate further operations explained later. The read head is then raised before commencing the next 270° stage.

It will be appreciated that, instead of rotating the loader in 90° steps, provision could be made to override the switch 424 except on completion of 270° stages. It will further be appreciated that, although the loader is normally rotated through 270° stages, it can be rotated through any desired number of 90° steps if particular circumstances require pallets to be delivered to or from a particular paddle displaced from the delivery position by other than 270°. Thus, in particular, the pallet loaders associated with the single spindle six axis machine tools are required, as explained later to rotate through stages other than 270°.

The tool magazine loader 402 is generally similar to the pallet loader 401 but comprises five substantially radial paddle members 442–446 mounted on a horizontal rotatable shaft 447. Each paddle is adapted to carry one tool magazine 448. A tool magazine is shown in FIG. 7 and comprises a plate-like base 449 having side grooves 450 and twenty eight projecting sockets 451 each of which can hold one tool (indicated in broken line as 452). The magazine has its identifying number, in the same form as previously described in relation to pallets, on one side of the base 449 not visible in FIG. 7. Each magazine also has a hook 556, not shown in FIG. 7, for a purpose described later. Each of the paddles 442–446 has end rollers 453 which are arranged in lines parallel to the shaft 447 and locate in the magazine side grooves 450 so that the magazine can run between the rollers 453 as it is delivered to or from the paddle, the rollers further serving to hold the magazine on the paddle.

The shaft 447 carries a boss 454 (see also FIG. 10) having five detents 455 which a roller 456 mounted on a microswitch 457 can enter to operate the switch similar to and for the same purpose as described in relation to the boss 421 and switch 424 of the pallet loader. The switch 457 is mounted in a fixed housing 458 which also carries five further switches 459–463 spaced at different distances from the shaft 447 which are operated respectively by projections 464–468 on the side of the paddles 442–446. These further switches 459–463 correspond to and act in the same way as the switches 426–429 on the pallet loader.

Figure 10:
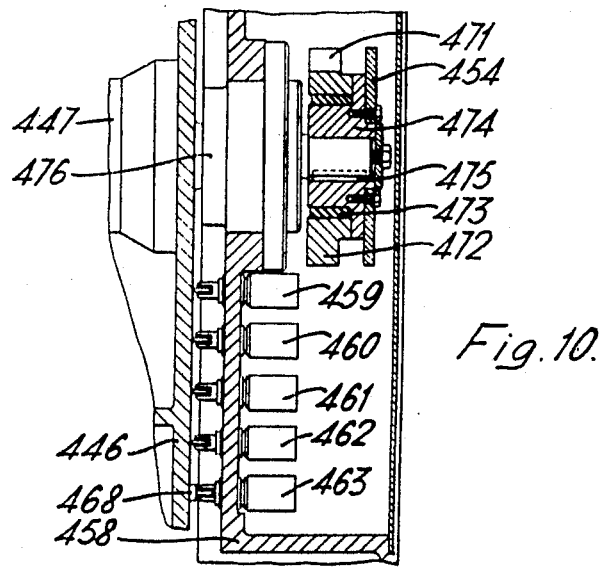
FIG. 10 is a sectional view through part of the tool magazine loader shown in FIG. 9.

The mechanism for holding the tool magazine loader stationary differs from the hook 413 arrangement provided for the pallet loader and comprises a plunger 469, operated by a double-acting hydraulic cylinder 470, and adapted to be inserted in peripheral slots 471 in a boss 472 connected to the shaft 447 for rotation therewith. As can be seen in FIG. 10, the boss 472 is mounted on a rubber bush 473 round a member 474 keyed to a stub shaft 475 which passes through bearings 476 in the housing 458 and is connected to the shaft 447. The boss 454 is also fixed to the member 474.

The operation of the tool magazine loader is as follows.

Tool magazines are fed into and received from the machine tool at the lower vertical paddle position shown occupied by the paddle 445. Tool magazine are also withdrawn from and delivered to the magazine loader by the transporter 114 at this lower vertical paddle position.

The magazine loader is rotated anticlockwise as viewed in FIG. 9 (by drive means described later and operable at two speeds) in 72° steps. A step is commenced by operating the cylinder 470 to raise and withdraw the plunger 469 from its position shown in FIG. 9. As it is raised the plunger operates a clutch operating a micro switch not shown, but similar to the switch 441 on the pallet loader, which engages a clutch in the drive causing the loader to rotate at its faster speed (about 15 r.p.m.). When the roller 456 drops into a detent 455 it operates the switch 457 to reduce the rotation to the lower speed (about 2½ r.p.m.) and as the paddles approach the end of the 72° step (i.e. as they approach the positions shown in FIG. 9) one of them operates a micro switch, not shown, which actuates the hydraulic cylinder 470 to lower the plunger 469. As the plunger is lowered it operates the previously mentioned clutch operating micro switch to disengage the clutch, and the plunger than enters a slot 471 in the boss 472 to arrest and hold the loader stationary. The hydraulic cylinder 420 is then actuated to raise the read head device 418 to a position adjacent the tool magazine on the lower vertical paddle (shown as 445), the device 418 having an upper read head to read the identifying number of the magazine. If the number so read is not that of the tool magazine required to be fed into the machine tool, the computer 173 on receipt of the signal fed back as indicative of the number read, operates through the machine function control to actuate the hydraulic cylinder 470 and commence another 72° rotational step, such steps continuing until the required tool magazine is at the lower vertical position. When the number read by the device 418 is that of the magazine to be fed into the machine tool, the signal fed back on such reading initiates the operation of a mechanism described below to feed the magazine into the machine tool. The paddle from which the magazine is fed remains in the lower vertical position until it receives the magazine back from the machine tool, when the magazine number is again read, indicating that the loader can then be rotated (after lowering the read head device 418) to place the next required magazine in the lower vertical position.

The switches 459–463 provide feed back signals indicative of the positions of the paddles, determined by which of the switches is operated, and if desired these signals could be used, as described previously in relation to the pallet loader, to initiate rotational steps until the paddle carrying the required magazine is at the lower vertical position, the magazine number then being read as a check and to initiate feeding of the magazine into the machine tool. In this case provision could be made, as also described in relation to the pallet loader, to override the switch 457 so that the loader comes to rest only when the required paddle is at the lower vertical position.

The provision of a magazine loader capable of carrying five tool magazines, each of which magazines holds twenty-eight tools, enables 140 tools to be readily available at the machine tool, which means, in the case of a twin spindle machine, that there are 70 tools available to each spindle. The tool magazines on the loader can, when required, be changed automatically by means of the transporter 114, the loader being rotated, if necessary, to place a paddle carrying a tool magazine which is to be withdrawn at the lower vertical position for collection by the transporter. The transporter then delivers this magazine to the magazine rack, from which it collects the newly required magazine and delivers it to the empty paddle of the magazine loader.

Figure 11:
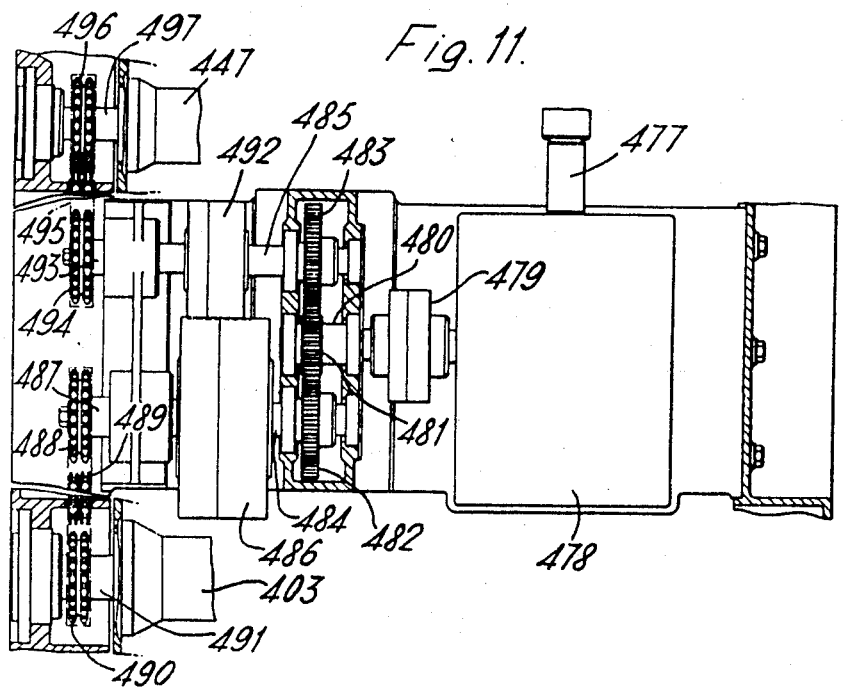
FIG. 11 is a sectional view through drive mechanism for the loading unit shown in FIG. 9.

The driving means for the pallet and tool magazine loaders is shown in FIG. 11. It comprises a hydraulic motor, adapted to operate at two speeds, having an output shaft 477 which drives, through a reduction gear box 478, a coupling 479. The coupling connects with a shaft 480 carrying a gear 481 which meshes with gears 482 and 483 mounted respectively on shafts 484 and 485.

The shaft 484 can, through a clutch 486, drive a shaft 487 carrying a sprocket 488 which drives a chain 489 passing round a sprocket 490 on a stub shaft 491 connected to the shaft 403 of the pallet loader. The shaft 485 can, through a clutch 492, drive a shaft 493 carrying a sprocket 494 which drives a chain 495 passing round a sprocket 496 on a stub shaft 497 connected to the shaft 447 of the tool magazine loader. Tensioning sprockets 498 and 499 (see FIG. 9) are provided for the chains 489 and 495 respectively.

The pallet loader and magazine loader can thus be driven independently, by appropriate engagement or disengagement of their respective clutches, from a common motor.

TRANSFER MECHANISM BETWEEN LOADING UNIT AND MACHINE TOOLS SHOWN IN FIGS. 12 TO 16

The means for transferring pallets and tool magazines between the machine tool and the pallet loader and between the machine tool and the magazine loader respectively is shown in FIGS. 12, 13, 14, 15 and 16. It comprises a beam 501 carried between pairs of opposed rubber rollers 502–507 (FIG. 12) of which the roller 505 is driven by a spindle 508 (see FIG. 14) having a connection 509 to a shaft 510 which is driven through an extendable connection 511 by an output shaft 512 of a hydraulic motor 513. The shaft 510 has slidably keyed to it a gear 514 which meshes with a gear 515 similarly slidably keyed to a shaft 516 which drives, through a connection 517, a spindle 518 on which the roller 504 is mounted. The connections 509 and 517 are such as to permit drive to be transmitted to the spindles 508 and 518 notwithstanding slight misalignment between these spindles and the shafts 510 and 516 which drive them. The connections 509 and 517 and the gears 514 and 515 are contained in a housing 519 mounted on a frame 520 in which bearings 521 and 522 are provided for the spindles 508 and 518. These spindles carry pulleys 523 and 524 respectively which drive rubber belts 525 (see FIG. 13) passing round similar pulleys 526 carried on spindles on which the rollers 502 and 503 are mounted. Thus, rotation of the output shaft 512 of the motor 513 drives the four rollers 502, 503, 504 and 505 which move the beam lengthwise. The hydraulic motor has two speeds and is reversible so that the beam 501 can be moved in either direction. The rollers 506 and 507 are idlers, and further idler rubber rollers 527–530 (FIG. 12) are provided in the machine tool to receive the beam, the rollers 502–507 being positioned between the machine tool and the pallet and tool magazine loaders.

The spindles of the rollers 502–507 pass through a member 531 which can be moved to occupy any of three positions at different distances from the frame 520, the three positions being shown respectively in FIGS. 14, 15 and 16. The member 531 is moved by a pneumatically operated device shown in FIG. 13 and comprising a cylinder 532 containing a piston 533 having a piston rod 534, the end of which is secured to the member 531 by a setscrew 535, and a second and separate piston 536 which can push against the piston 533 and has two stepped portions 536a and 544. The cylinder 532 has a cylinder head 532a which has an air connection 537. The cylinder 532 has air connections 538 and 539. The connections 537, 538 and 539 communicate respectively with the space between the second piston 536, and the cylinder head 532a, an annular space between the stepped portion 536a of the second piston and the piston 533, and a space round the piston rod 534. The pistons have rings 540, 541 and 542 and the cylinder is provided with a shoulder 543 against which the step 544 on the second piston 536 can abut to limit its movement. An exhaust hole 545 is provided adjacent the shoulder 543.

In FIGS. 13 and 14 the member 531 is shown in its innermost position. To move it to its central position (FIG. 15) air under pressure is introduced through the inlet 537 so pushing the piston 536, and hence the piston 533 and rod 534 outwardly (i.e. downwardly in FIG. 13) until the step 544 abuts against the shoulder 543 (air being exhausted through the hole 545 and the inlet 539). To move the member 551 to its outermost position (FIG. 16) air under pressure is introduced through the inlet 538 (air being exhausted through the inlet 539) so pushing the piston 533 and rod 534 out to the full extent of its travel. Introduction of air under pressure through the inlet 539 returns the piston 533 and hence the member 531 to its central position (air being exhausted through the inlet 538) at which it abuts the piston 536, and further air introduced through the inlet 539 moves both pistons back to their positions shown in FIG. 13 (exhaust taking place through both the inlets 537 and 538) where the number 531 is at its innermost position. Guide rods 546 and 547 slidable in fixed guides 548 and 549 and fixed to the member 531 maintain its alignment, and the connection 511 is extendable and the gears 514 and 515 are slidable on their shafts to permit movement of the member 531. Thus, the beam 501 can be moved to any of its three positions relative to the frame 520 by appropriate operation of the pneumatic device, a similar device which operates in parallel (not shown) being provided to cause corresponding movement of a member 550 (FIG. 12) on which the idler rollers 527–530 are mounted.

The beam 501 carries a projection 551 (FIGS. 12, 14, 15 and 16) having a lower arm whose tip 552 (FIG. 12) can, when the beam is at its innermost position (FIG. 14), engage against the end of a pair of pallets 553 and 554 carried on a paddle of the pallet loader at its upper vertical position. The beam 501 carries a further single arm projection 558 spaced from the projection 551 so that its tip can, when the beam is at its inner position, engage against the other end of the pair of pallets 553 and 554. In FIGS. 14, 15 and 16 the tip 552 is concealed behind the arm 558. The presence of the member 556b shown chain dotted in FIGS. 14, 15 and 16 should be ignored for the present. The projection 551 also has a second and upper arm whose tip 555 can, when the beam is at its outermost position (FIG. 16), engage in a U shaped hook 556a of an arm 556 on a tool magazine 557 carried on a paddle of the tool magazine loader at its lower vertical position. Thus, the tip 555 acts to move the magazine 557 either into, or out of, the machine tool. When the beam 501 is in its central position (FIG. 15) its projections are clear of both magazine tool and pallets.

The operation of the mechanism is as follows. When a pair of pallets is to be transferred from the upper vertical paddle of the pallet loader into the machine tool, the beam 501 is moved from its central position as in FIG. 15 (at which it normally rests) to its innermost position (as in FIG. 14) at which the tip 552 of the projection 551 can engage the end of the pair of pallets. The motor 513 then operates, initially at its higher speed, to move the beam, and hence the pallets, across into the machine tool (i.e. to the left as viewed in FIG. 12). When the trailing end of the beam releases a switch 559 on the member 531 the motor is caused to operate at its lower speed, and when the leading end of the beam engages a second switch 560 on the member 550 the motor is stopped and/or a brake is applied. The beam and pallets then occupy the positions shown in broken line in FIG. 12 in the machine tool. The beam is then moved to its central position as in FIG. 15 (to move the arm 558 clear of the pallets) and is withdrawn from the machine tool by driving the motor in the reverse direction at its higher speed until the trailing end of the beam releses the switch 559, when it operates at its lower speed until the trailing end of the beam releases a third switch 561 on the member 531 which stops the motor and/or applies a brake.

When a pair of pallets is to be transferred from the machine tool to the upper vertical paddle of the paddle loader the reverse procedure is followed, i.e. the beam, in its central position, is moved into the machine tool and is then moved to its innermost position so that the arm 558 can engage the other end of the pair of pallets before it is moved out of the machine tool (to the right as viewed in FIG. 12) with the arm 558 pushing the pallets, the switches operating as before.

The transfer of a tool magazine from the lower vertical paddle of the magazine loader to the machine tool occurs in a similar manner but with the beam moved to its outermost position (FIG. 16) so that the tip 555 of the projection 551 engages with the hook 556a of the arm 556 on the magazine, this tip and hook being so arranged that their engagement can push the magazine into or pull the magazine from the machine tool. Thus, a magazine change can be effected both before the commencement of, or during, a machining operation.

As described, pallets and tool magazines are moved into or out of the machine tool separately since the beam has to be in different positions to effect transfer of a magazine and pallets respectively. However, it may be desired to be able to move the tool magazine and the pair of pallets into, or out of, the machine tool simultaneously. In this case, the arm 556 on the tool magazine is provided with a further U shaped hook 556b, similar to the hook 556a, and shown in chain-dotted line in FIGS. 14, 15 and 16. The hook 556b is positioned along the arm 556 so that the tip 555 engages in it when the beam is in its innermost position, shown in FIG. 14, and so that the tip 555 is disengaged from the hook 556b when the beam 501 is in its central position (FIG. 15). When the beam 501 is in its innermost position (FIG. 14) a magazine and a pair of pallets may be moved into the machine tool, or removed therefrom simultaneously. This would occur respectively before and after a machining operation is carried out on the workpieces on the pallets. If it is necessary to change tool magazines during a machining operation, the beam 501 is moved to its outer position (FIG. 16) so that the magazine can be withdrawn from the machine tool and another one pushed into the machine tool whilst the pallets remain in the machine tool.

The pallets are supported during their transfer on rollers running in "T" slots in the base of the pallets not shown in FIGS. 12 to 16 and the tool magazine is supported by rollers running in side grooves in the magazine, such rollers similarly not being shown in these figures.

LOADING AND MACHINING OPERATIONAL CYCLE

The cycle of operations performed by the loading unit and machine tool to machine the workpieces on one pair of pallets will now be described.

After rotation of the pallet loader through a 270° stage which places the paddle carrying the pair of pallets at the upper vertical position, the pallets' number is read. The signal fed back indicative of this number is effective to interrogate the computer 173 to ascertain the identifying number of the tool magazine required, and the machining programme tape cassette number required for machining of the workpieces. The signal also initiates operation of the beam 501 by the machine function control to move it to its inner, pallet-engaging, position and then to feed the pair of pallets into the machine tool, after which the beam is moved to its central "neutral", position and withdrawn. On arrival in the machine tool the pallets are automatically shuffled into accurate position by devices as described in U.S. Pat. No. 3,243,178 issued Mar. 29, 1966. On receipt of the required tool magazine number from the computer 173 the machine function control effects rotation of the tool magazine loader to place the paddle carrying the required tool magazine at the lower vertical position (unless the read head indicates that the required magazine is already at that position), where the tool magazine number is read. When the signal indicative of this number is fed back the machine function control operates the beam 501 to move it to its outer, magazine-engaging, position and then to feed the tool magazine into the machine tool, after which the beam is moved to its central, "neutral", position and withdrawn. On receipt of the required tape cassette number from the computer 173, the machine function control selects the required tape from the random access tape store and places it on the tape deck, as described in U.S. patent application Ser. No. 725,822, filed May 1, 1968, by R. H. G. Raine. When signals indicative of both accurate pallet location in the machine tool and correct tape location on the tape deck are received the machine function control starts the tape and the machine tool performs its machining operations in accordance with the tape programme until an "end of tape" signal is fed back from the tape deck. On receipt of this signal the machine function control operates the beam 501 to feed it into the machine tool, move it to its inner, pallet-engaging position, and then withdraw it to feed the pair of pallets back on to the pallet loader paddle from which they came. After being moved to its central, "neutral", position the beam 501 is again fed into the machine tool, moved to its outer, magazine-engaging, position and withdrawn to feed the tool magazine back on to the magazine loader paddle from which it came, the beam then being returned to its central, "neutral", position. The numbers of the pallets and the tool magazine are read after they are returned to their respective paddles, and on receipt of signals indicative of these numbers the machine function control initiates rotation of the pallet loader through a further 270° stage to place the pair of pallets whose workpieces have just been machined at the right hand horizontal position, as viewed in FIG. 9, from which they can be withdrawn by the transporter 114, and to place the next pair of pallets to be fed into the machine tool at the upper vertical position, ready for commencement of another cycle.

Where the machining operations to be performed on a pair of workpieces require more than one tool magazine to provide the necessary tools, the tape programme issues a "change magazine" signal at the required time and then stops. This signal causes the machine function control to operate the beam 501 so that it is fed into the machine tool, then moved to its outer position at which it engages the tool magazine and is clear of the pallets in the machine tool, and then withdrawn to feed the tool magazine from the machine tool onto the paddle of the magazine loader from which it came. The signal is also effective to interrogate the computer 173 to ascertain the identifying number of the newly required tool magazine. After the withdrawn magazine is received on the loader and the beam 501 moved to its "neutral" position the function control, having received the newly required magazine number from the computer 173, rotates the magazine loader until the newly required tool magazine is at the lower vertical position. When the required number is read at this position, the beam 501 is operated to move to its outer, magazine-engaging, position and feed the new tool magazine into the machine tool, the beam then being moved to its neutral position and withdrawn. The tape restarts so that the machine tool continues its machining operations using tools from the newly delivered magazine.

If the arms 556 of the tool magazines are each provided with a further hook 556b, as described in the alternative above, so that at the inner position of the beam 501, both a tool magazine and a pair of pallets can be engaged and moved simultaneously, the above described cycle of operations is modified. The function control waits until the requred tool magazine is at the lower vertical position before operating the beam, and then moves the beam to its inner position to feed the pair of pallets and the tool magazine simultaneously into the machine tool, after which the beam is moved to its central, "neutral", position and withdrawn. Similarly, after completion of the machining operations and on receipt of the "end of tape" signal, the machine function control feeds the beam into the machine tool, moves it to its inner position, and withdraws it to feed the pair of pallets and the tool magazine simultaneously back on to their respective paddles, after which the beam is moved to its central, "neutral", position. The beam is then only moved to its outer position, at which it engages only a tool magazine, when a magazine change is effected in the manner described above.

If a fault occurs during machining operations (such as the breaking of a tool) the machine tool issues a "machine fault" signal to the computer 173, which issues a printed record of the signal, and its time of occurrence, to the human controller 189. The controller than arranges for maintenance staff to attend the machine. The machine tool has a display panel which can indicate the nature of the most common faults when they occur so that a maintenance engineer can speedily take appropriate action. By throwing a switch he can remove the machine from computer control so that he can carry out testing, if necessary. If he considers that the fault will require more than a certain period of time (e.g. thirty minutes) to be rectified, he can press a button or switch which signals to the computer that the machine will be out of action for at least that time so that the computer can reschedule its programme to make the best use of remaining machining capacity. When the fault has been rectified the maintenance engineer can operate a further switch or button to signal the computer that the machine is again usable, so that the computer can revert, as far as possible, to its original programme.

DESCRIPTION OF MACHINE TOOL 106 AND PALLET LOADER—FIGS. 17-20

Figure 17:
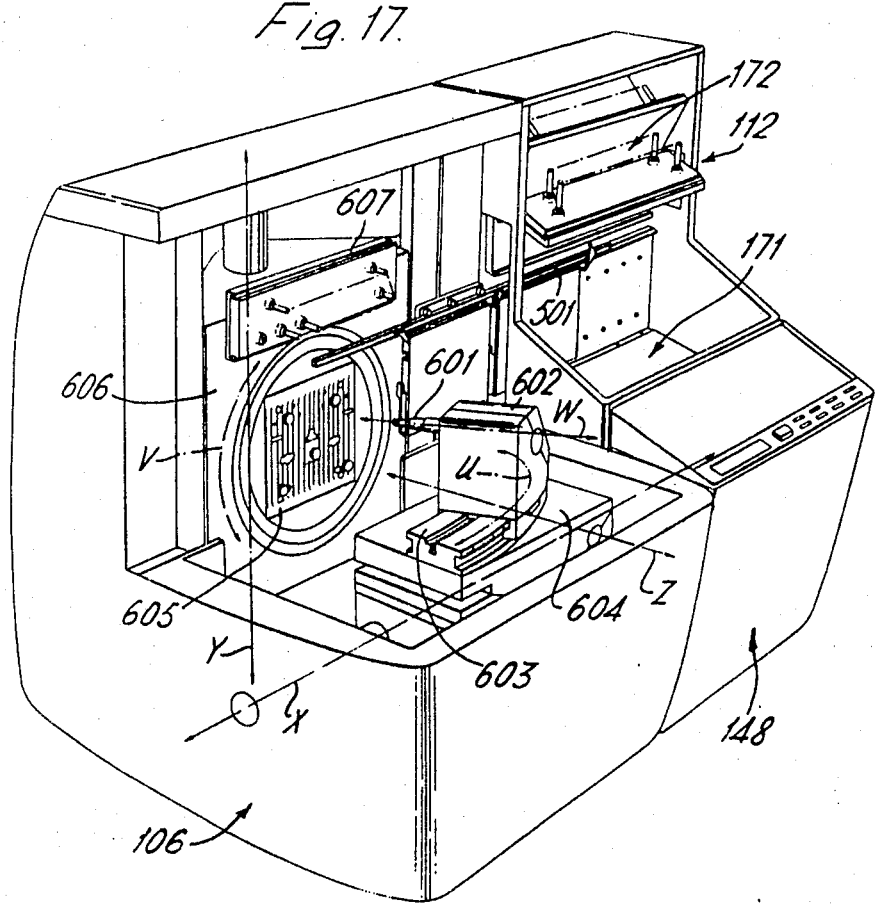
FIG. 17 is a perspective view of a 6-axis single spindle machine tool and an associated leading unit comprising a pallet loader and a tool magazine loader.

The six-axis machines 105 and 106, of which machine 106 is shown with its associated pallet loader and tool magazine loader in FIG. 17, each have a single spindle 601 mounted in a head 602 which is movable along an arcuate guide 603 on a main support member 604. A pallet loaded with a workpiece to be machined is received on a vertical backing plate 605 (provided with devices as disclosed in U.S. Pat. No. 3,243,178 issued Mar. 29, 1966 for shuffling the pallet accurately into position relative thereto) carried on a support 606, which can be moved vertically. The backing plate 605 is rotatable in a vertical plane relatively to its support 606. Above the backing plate 605 is a holder 607 for a tool magazine from which a tool can be selected for use in the spindle 601. The six axes of movement are achieved (i) by horizontal movement of the support member 604 in the direction indicated by the arrow X, (ii) by vertical movement of the support 606 (and hence of the backing plate 605) as indicated by the arrow Y, (iii) by horizontal movement of the support member 604 in the direction indicated by the arrow Z, (iv) by movement of the head 602 relative to the guide 603 in a horizontal arc as indicated by the arrow U, (v) by rotational movement in a vertical plane of the backing plate 605 relative to its support as indicated by the arrow V, and (vi) by movement of the spindle 601 to project further or less from the head 602 as indicated by the arrow W.

The pallet loaders associated with the single spindle six-axis machines differ from those on the other machine tools in that each of the paddles of a single spindle machine pallet loader is split into two halves, and the half nearer to the machine tool is provided with mechanism, shown in FIGS. 18 and 19, for unlinking and relinking the pallets of a pair delivered to the pallet loader so that the pallets can be fed into the machine tool one at a time.

Each paddle-half 608 adjacent the machine tool is movable relatively to the other half, and carries behind it (as viewed in FIG. 18) four rollers 609, each having a peripheral "V" groove (see FIG. 19), which can run along two rails 610 which are fixed to a part of the paddle loader relatively to which the paddle-half 608 is movable. The rollers 609 are free to rotate on shafts 609a which are themselves carried be eccentric stubs 609b (FIG. 19) for initial adjustment of the position of the shafts to ensure good location of the rollers 609 against the rails 610. The paddle-half 608 also carries behind it (as viewed in FIG. 18) an element 611 providing a can track 612 along which can run a roller 613 mounted at one end of an arm 614 which is movable about a fixed central pivot 615. At the other end of the arm 614 is mounted a further roller 616. Pusher rods 617 and 618 carrying springs 619 and 620 contained in fixed housings 621 and 622 are arranged to bear against the rollers 616 and 613 respectively, the rods 617 and 618 being provided respectively with stops 623 and 624 to limit their movement relatively to the housings, and end heads 625 and 626 to contain the springs.

At the position where a pallet is fed into the machine tool i.e. when the paddle carrying the pallet is in its upper vertical position (which is the same paddle position as that at which pallets are delivered from the machine tool to the paddle), there are provided two hydraulically operated rams 627 and 628 which can respectively engage against the end heads 625 and 626 to operate the pusher rods 617 and 618. In FIG. 18 the ram 628 is shown extended and the ram 627 is shown retracted, so that the arm 614 assumes the position illustrated at which the roller 613 supports the element 611, and hence the paddle half 608, in its raised position. If the ram 628 were now retracted and the ram 627 extended, the pusher rod 618 would, under the action of the spring 620, move to the left as viewed in FIG. 18 and the pusher rod 617 would move to the right pushing the roller 616 and causing the arm 614 to rotate clockwise about its pivot 615. The roller 613 would then run up the cam track 612 permitting the element 611, and hence the paddle-half 608 to drop to its lower position. Reversal of the operation of the rams 627 and 628, i.e. extension of the ram 628 and withdrawal of the ram 627, would cause the parts to reassume their positions shown in FIG. 18 thus again raising the paddle half 608. Operation of the rams 627 and 628, which is automatically controlled in timed relationship to the feeding of pallets into and from the six-axis machine tool, thus raises and lowers the paddle-half 608. The vertical up and down movement of the paddle half 608 is guided by the rollers 609 running up and down the rails 610.

The paddle half 608 is provided, with rollers 629 which run in "T" slots provided in the base of the pallets as previously described, so that movement of the paddle-half 608 causes corresponding movement of a pallet carried thereby. Further rollers 630 are mounted along a fixed top guide 631 and run in slots along the side of the pallets. When the paddle-half 608 is in its raised position (as shown in FIG. 18) a pallet carried thereby is aligned with the other pallet of a linked pair carried by the other paddle-half, and the extent of movement of the paddle-half 608, ie. the distance it moves down to its lower position, is sufficient to disengage the links of the two pallets.

FIG. 20 shows diagrammatically the relative movements of the pallets of a linked pair delivered to the paddle loader of a single spindle six-axis machine tool. In this figure the right hand column represents the pallet loader and the left hand column the machine tool, while the rows show different positional stages of the pallets which are, for convenience, indicated as A and B.

Stage (i) shows the pair of linked pallets which have been delivered from the pallet store by the transporter onto a paddle (indicated as P1) of the pallet loader with pallet A leading.

At stage (ii) the paddle carrying the pallets is in its upper vertical position, at which a pallet can be fed into the machine tool, and the pallets are moved towards the machine tool (by means of a beam as previously described) until the pallet B occupies the position occupied in stage (i) by pallet A, i.e. so that pallet B is carried on the paddle half 608 adjacent the machine tool, and pallet A has moved part way into the machine tool. The pallets are shown at stage (ii) in FIG. 17 in which the beam 501 that moves the pallets can clearly be seen.

At stage (iii) pallet B has been lowered (by operation of the hydraulic ram 627 and resultant lowering of the paddle-half 608) to disengage the links connecting the pallets.

At stage (iv) pallet A has been moved across (by the beam previously described) into the machine tool for machining of the workpiece loaded on the pallet, pallet B remaining in its lower position.

After stage (iv) both the hydraulic rams 627 and 628 are withdrawn to enable the pallet loader to be rotated to locate an empty paddle (indicated as P2) in the upper vertical position at which it can receive the pallet A from the machine tool after machining, the paddle-half 608 of the paddle P2 being in its raised position so that the pallet A (moved by the beam) is received thereon as shown at stage (v).

At stage (vi) the ram 627 has been operated to lower pallet A on paddle P2, and both rams are then withdrawn, again to permit rotation of the pallet loader.

The pallet loader is rotated to relocate the paddle P1 to the upper vertical position, pallet B still being (from stage (iv)) in its lower position as shown at stage (vii).

At stage (viii) the hydraulic ram 628 has been operated to raise the pallet B for transfer (by the beam) into the machine tool for machining operations as shown at stage (ix).

Both rams are withdrawn and the pallet loader rotated to relocate paddle P2, which carries pallet A in its lower position (from stage (vi)), for receipt of pallet B from the machine tool after machining. Pallet B is then moved (by the beam) to a position adjacent pallet A as shown at stage (x).

The hydraulic ram 628 then operates to raise pallet A and connect it to pallet B by engagement of their links as shown at stage (xi).

At stage (xii) the pair of linked pallets have been moved across (by the beam) onto the paddle P2 ready for transfer therefrom by the transporter back to the pallet store.

As explained above, the hydraulic rams 627 and 628 are both withdrawn when the pallet loader is rotated, and to ensure that a pallet is in the correct desired (raised or lowered) position when the paddle carrying that pallet is at the upper vertical delivery and receipt location, the appropriate ram is operated even when the pallet was at the correct desired position when the paddle was last at that location prior to rotation. Thus, for example, although pallet A is at its lower position on paddle P2 at stage (vi) and the pallet loader is rotated to subsequently return paddle P2 to the upper vertical location at stage (x) when it is desired that pallet A should still be in its lower position, the ram 627 is operated when paddle P2 returns to the upper vertical location to ensure that pallet A is in fact in the desired lower position for stage (x).

TRANSPORTERS 114, 138 and 146—FIGS. 24-31

Figure 29:
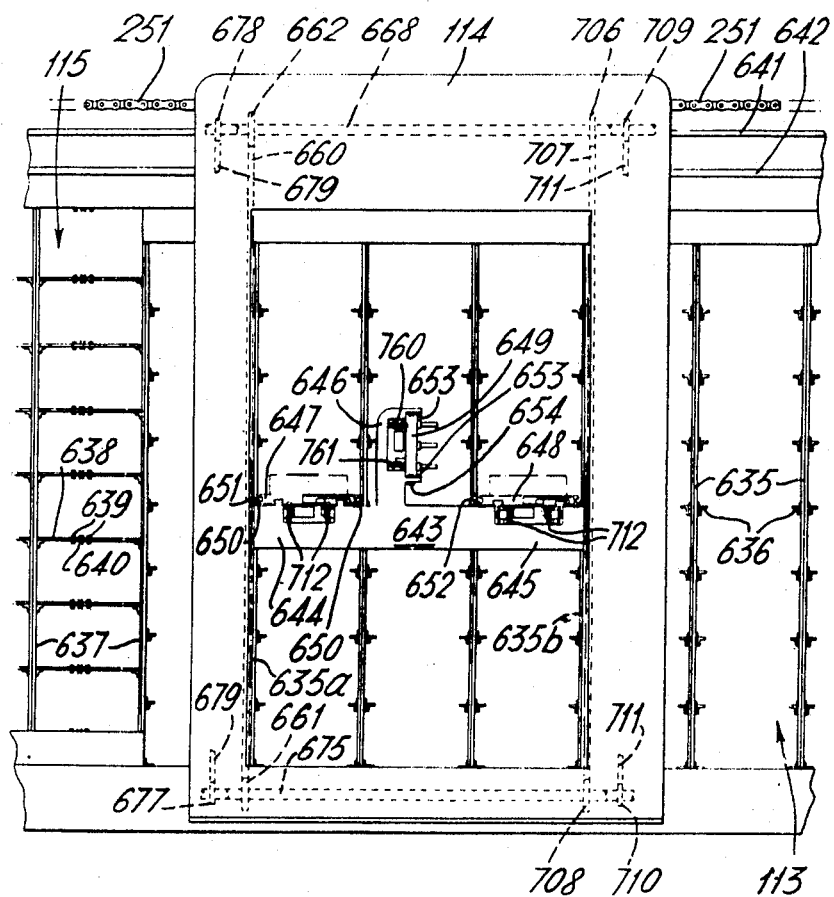
FIG. 29 is a front elevational view of and through a transporter.

The transporter 114 is shown in FIG. 29 in front of the pallet rack 113 and the tool magazine rack 115. The pallet rack 113 has equispaced vertical partitions 635 carrying horizontal angle irons 636 defining through compartments each of which can contain a pair of pallets in a horizontal position resting on the angle irons. The tool magazine rack 115 has similar vertical partitions 637, at the same spacing as the partitions 635, and supporting horizontal base plates 638 which define compartments each of which can contain a tool magazine in a vertical position. Mounted on the base plates 638 are guides 639, between which the sides of a tool magazine can pass, and rollers 640 arranged to run in side grooves in the tool magazine.

Mounted on top of the pallet rack 113 and tool magazine rack 115, and extending across to the transit sections 116 and 117 (FIGS. 2, 3 and 4A) is a member providing rails 641 and 642 along which the transporter can run, by means of rollers (not shown) running between the rails. The transporter 114 is moved along the racks by means of an endless chain 251 connected to the transporter and (see FIG. 4A) passing round a sprocket 250 driven from a hydraulic motor 195, the chain further passing round an idle sprocket 252.

Returning to FIG. 29, the transporter 114 has a platform member 643 comprising tow horizontal pallet-carrying platforms 644 and 645 and a vertical tool magazine carrier 646. Each of the platforms 644 and 645 is adapted to carry a pair of pallets in horizontal position, the pallet pairs being indicated as 647 and 648 respectively. The carrier 646 is adapted to carry one tool magazine, indicated as 649, in a vertical position. The platforms 644 and 645 are provided with guides 650, between which a pair of pallets can be received and held, and read heads 651 and 652 respectively, capable of reading the identifying number of a pair of pallets carried on the platform. The carrier 646 has guides 653, so that a tool magazine can be received and held between the guides and the carrier, and a read head 654 capable of reading the identifying number of a tool magazine being carried.

The platforms 644 and 645 are so spaced that when one is aligned with one vertical column of compartments in the pallet rack the other is aligned with the next but one column of compartments. Thus, as shown in FIG. 29, the platform 644 is aligned with the column of compartments to the right of the partition 635a while the platform 645 is aligned with the column of compartments to the left of the partition 635b. By this spacing of the platforms a pair of pallets can, when required, be received from a compartment in one column on one platform while another pair of pallets is simultaneously delivered to a compartment in the next but one column from the other platform.

To achieve accurate location of the transporter 114 relative to the columns of compartments in the pallet rack 113 and magazine rack 115, the transporter is provided, as shown in FIG. 30, with hydraulically operated locators 655 and 656, consisting of nylon capped steel rods which can project from the transporter at 45° and locate against the partitions 635 or 637 of the racks. Preferably four such locators are provided so that two locate against each of two partitions, shown as 635a and 635b in FIG. 30, near the top and the bottom of the partition. When the transporter comes to rest, as more fully described later, in approximately the required position relative to the racks, the locators 655 and 656 are hydraulically operated to project from the transporter and locate it accurately. The transit sections 116 and 117 (FIGS. 2, 3 and 4A) of the tool magazine rack have associated stops in appropriate position against which the locators 655 and 656 can engage to accurately locate the carrier 646 in alignment with the single column of compartments of either of the transit sections.

The platform member 643 can be moved vertically to align the platforms 644 and 645 with any horizontal row of compartments in the pallet rack 113, or the carrier 646 with any horizontal row of compartments in the tool magazine rack 115, by mechanism shown in FIG. 28. Each vertical column in the pallet and tool magazine racks contains eight compartments and therefore the member 643 must be capable of assuming any of eight vertically displaced positions. In FIG. 28 the member 643 is shown in the lowest of these positions, i.e. at which the platforms 644 and 645 and the carrier 646 are aligned with the bottom row of compartments in the pallet and tool magazine racks respectively.

The platform member 643 is carried on an endless chain 660 passing round sprockets 661 and 662, and a further endless chain 663 passing round sprockets 664 and 665, by means of mountings 666 and 667 connecting the member 643 to the chains. The sprocket 662 is mounted on a shaft 668 carrying a bevel gear 669 which meshes with a bevel gear 670 on one end of a shaft 671. The other end of the shaft 671 carries a bevel gear 672 which meshes with a bevel gear 673 on a shaft 674 on which the sprocket 665 is mounted. By this drive connection movement of the chain 660 causes corresponding movement of the chain 663.

The sprocket 661 is mounted on a shaft 675 and the sprocket 664 on a shaft 676. The shaft 675 carries a further sprocket 677 and the shaft 678 carries a further sprocket 678. A chain 679, whose ends are attached to fixed parts 680 and 681, passes round the sprockets 677 and 678. Between the fixing 680 and the sprocket 677, the chain 679 passes round sprockets 682, 683 and 684, and between the sprockets 678 and the fixing 681 the chain 679 passes round sprockets 685, 686 and 687.

The sprockets 682 and 687 are respectively carried by brackets 688 and 689 attached to opposite ends of a rod 690 of a fixed hydraulic jack 691 having fluid inlets 692 and 693. The sprockets 683 and 686 are similarly carried by brackets 694 and 695 respectively attached to opposite ends of a rod 696 of a fixed hydraulic jack 697 having fluid inlets 698 and 699, and the sprockets 684 and 685 are respectively carried by brackets 700 and 701 attached to opposite ends of a rod 702 of a fixed hydraulic jack 703 having fluid inlets 704 and 705.

The stroke of the jack 703 is such as to move the platform member 643 by a distance corresponding to the vertical pitch of compartments in the pallet rack and tool magazine rack, for example to raise the member 643 from its lowermost position shown in FIG. 28 so that the platforms 644 and 645 and the carrier 646 align with the row of compartments next above the botton row in the pallet and tool magazine racks respectively. Fluid under pressure admitted through the inlet 704 acts against a piston head on the rod 702 to lower the rod until the sprockets 684 and 685 occupy the positions indicated as 684a and 685a respectively. During this downward motion the sprocket 685 draws the chain 679 round the sprocket 678 while the sprocket 684 feeds out the chain 679 to travel round the sprocket 677, thereby rotating the shafts 668 and 675, and hence the sprockets 662 and 661, clockwise as viewed in FIG. 28. Such rotation causes upward movement of the left hand vertical run of the chain 660, and of the right hand vertical run of the chain 663, thereby raising the platform member 643 by one pitch. The reverse operation by releasing the fluid pressure at the inlet 704 and applying fluid pressure at the inlet 705, raises the sprockets 684 and 685 back to their original positions, thereby lowering the member 643 by one pitch.

The stroke of the jack 691 is twice that of the jack 703 so that fluid pressure applied to the inlet 692 lowers the sprockets 682 and 687 to the positions indicated as 682a and 687a, thereby raising the platform member 643 by two pitches in the same manner as described above. Releasing the fluid pressure at the inlet 692 and applying pressure at the inlet 693 similarly lowers the member 643 by two pitches. By operation of both the jacks 703 and 691 the platform member 643 can thus be raised (and, on reverse operation, lowered) by three pitches.

The stroke of the jack 697 is four times that of the jack 703 so that application of fluid pressure to the inlet 699 raises the sprockets 683 and 686 to the positions 683a and 686a causing movement of the chains 660 and 663 to raise the platform member 643 by four pitches. On reversal, by releasing pressure at the inlet 699 and applying pressure to the inlet 698, the member 643 is lowered by four pitches. Operation of the two jacks 697 and 703 thus moves the member 643 by five pitches, operation of the two jacks 697 and 691 moves the member 643 by six pitches, and operation of all three jacks 691, 697 and 703 moves the member 643 by seven pitches.

The platform member 643 can therefore be moved to occupy any of the eight positions at which the platforms 644 and 645 and the carrier 646 align with a row of compartments in the pallet and tool magazine racks respectively by appropriate operation of one or more of the jacks 691, 697 and 703.

The mechanism shown in FIG. 28 is located at the left hand side of the transporter 114 as viewed in FIG. 29, and the shafts 668 and 675 extend across the transporter, as shown, and carry further sprockets 706 and 708 respectively about which an endless chain 707, to which theplatform member 643 is also attached, passes. The shafts 674 and 676 also extend across the transporter, behind the shafts 668 and 675 as viewed in FIG. 29, and carry further sprockets about which an endless chain attached to the member 643 passes. The shafts 668 and 675 respectively carry, towards their right hand as seen in FIG. 29, sprockets 709 and 710 for a chain 711 fixed at its ends in a similar manner to the chain 679 and passing round sprockets mounted on a pneumatic counter or balancing jack (not shown) which serves to assist in maintaining the platform member at its required position achieved by appropriate operation of the jacks 691, 697 and 703.

It will be seen that either of the platforms 644 and 645, or the carrier 646, can be aligned with any desired compartment in the pallet or magazine rack respectively by appropriate horizontal movement of the transporter 114 along the racks to align the platform or carrier with the required vertical column of compartments, and appropriate vertical movement of the member 643 to align the platform or carrier with the desired compartment in that column. Similarly, either of the platforms 644 and 645, or the carrier 646, can be aligned with the pallet delivery position of the pallet loader or the tool magazine delivery position of the magazine loader respectively of any of the machine tools. The pallet and tool magazine delivery positions of the machine tool pallet and magazine loaders are located directly opposite vertical columns of compartments in the pallet and tool magazine rack so that the transporter can locate against the vertical partitions of the racks to align the platform or carrier with the delivery position. The carrier 646 can also be aligned with any of the compartments in the transit sections 116 and 117. (FIGS. 3 and 4A).

Each of the platforms 644 and 645 has an associated mechanism for drawing a pair of pallets onto or delivering a pair of pallets from the platform, the mechanism for the platform 644 being shown in FIGS. 24 to 27. Referring firstly to FIGS. 24 and 25 it comprises a pair of endless chains 712 extending along the platform, i.e. in the direction of travel of the pallets, and passing round sprockets 713 mounted on shafts 714 bearing driven sprockets 715 (FIG. 24). Endless chains 716, passing round sprockets 717 on a shaft 718 driven by a hydraulic motor 719, pass round and drive the sprockets 715. The chains 712 pass round idler and tensioning sprockets 720, 721 and 722 and carrying projecting pushers 723. The direction of drive is such that the pushers 723 move from left to right, as viewed in FIGS. 24 and 25, along the upper horizontal run of the chains 712. The pushers 723 can engage against the rear face of the trailing pallet 301 of a pair, and against the inner face of the front side of the leading pallet 302, the base of the pallets being recessed. For convenience the pallets shown in full line in FIG. 25 and broken line in FIG. 24 have the same references, 301 and 302, as are used in FIG. 6.

To draw a pair of pallets to be received on the platform into the range of action of the pushers 723, and to effect final delivery of the pallets clear of the platform movable end members 724 and 725 are provided. These members have pivoted fingers 726 and 727 which can be raised to locate in the space between the end face of a pallet and the lug projecting therefrom, so that movement of the member 724 or 725 can effect movement of the linked pair of pallets.

The end member 725 is shown in detail in FIGS. 26 and 27, the end member 724 being the same as the member 725. The pivoted finger 727 is urged downwardly by a spring 728 and can be raised, to the position shown in broken line in FIG. 27, by a hydraulically operated plunger 729 which engages against the finger. The plunger 729 projects through a hole in a disc 730 and carries a piston head 731 movable in a cylindrical chamber 732. When fluid under pressure is fed from a duct 734 and through an inlet 733 into the chamber 732 below the head 731 the plunger 729 rises, thereby raising the finger 727. When the pressure at the inlet 733 is released, the finger 727, and hence the plunger 729, are lowered under the action of the spring 728.

The end member 724 is fixed to a slide rod 735 (FIG. 24) bearing a piston head 736 movable along a cylinder 737 having annular end chambers 738 and 739. Hydraulic pressure applied to the chamber 739 causes movement of the slide 735, and hence the member 724, to the left as viewed in FIG. 24, and the slide 735 and member 724 can be returned, i.e. moved to the right, by releasing the pressure in the chamber 739 and applying fluid pressure to the chamber 738.

Alongside the cylinder 737 is a cylinder 740 which communicates through a port 741 with a bore 742 in a rod 743. The bore 742 communicates with the duct in the member 724 corresponding to the duct 734 in FIG. 27, so that hydraulic pressure applied to the cylinder 740 can act through the port 741 and bore 742 to raise the finger 726. It will be noted that the port 741 remains in communication with the cylinder 740 throughout movement of the member 724 and rod 743 by operation of the slide rod 735. The right hand end, as viewed in FIG. 24, of the rod 743, is accommodated by a bore 745 in a housing 744, in which the cylinders 737 and 740 are provided. A flexible and extendable connector 746 fits between the end member 724 and the housing member 744.

The right hand portion of the slide rod 735 is accommodated in a bore 747 in a slidable sleeve 748 having a piston head 749 movable along a cylinder 650. This cylinder has annular end chambers 751 and 752 and the sleeve 748 is integral with a rod 753 fixed to the end member 725. Thus fluid under pressure applied to the chamber 752 causes movement to the right of the sleeve 748, rod 753 and member 725. The sleeve, rod and member can be returned, i.e. moved to the left, by releasing the pressure in the chamber 752 and applying hydraulic pressure to the chamber 751.

Alongside the cylinder 750 is a cylinder 754 which communicates through a port 755 with a bore 756 in a rod 757 whose left hand portion is accommodated in a bore 758. The bore 756 connects with the duct 734 (FIG. 27) so that the finger 727 can be raised by application of fluid pressure to the cylinder 724. Again, communication between the port 755 and the cylinder 754 is maintained throughout movement of the rod 757 and member 725 by operation of the slidable sleeve 748. A flexible and extendable connector 759 is provided between the end member 725 and the housing 744 in which the cylinders 750 and 754 are provided.

For a reason explained later the extent of movement of the slide rod 735, and hence the end member 724 is greater than that of the slidable sleeve 748 and end member 725, as can be seen by comparison of the lengths of the cylinders 737 and 750.

The platform 645 is provided with the same mechanism as described above in relation to the platform 644, except that the chains 712 are driven in the opposite direction, the drive mechanism comprising the motor 719, shaft 718, sprockets 717, chains 716 and driven sprockets 715 for the chains 712 in the platform 645 being located near the opposite end of the platform from the end near which the drive mechanism for the chains 712 in the platform 644 is located. By this arrangement pairs of pallets are received on the platform 644 from one side of the transporter 114 (the near side as viewed in FIG. 29) and delivered therefrom at the opposite side, while pairs of pallets are received on the platform 645 from said opposite side of the transporter 114 (the far side as viewed in FIG. 29) and delivered therefrom at said one side. Thus a pair of pallets transported from the pallet rack to a machine tool pallet loader is carried on the platform 645 and a pair of pallets transported from a pallet loader to the pallet rack is carried on the platform 644.

The operation of the transporter 114 will now be described with reference to FIG. 31 which diagrammatically illustrates the transport of a pair of pallets from a compartment of the pallet rack 113 to a pallet loader 107–112. In this figure the end members associated with the platform 645 corresponding to the members 725 and 724 are indicated as 725a and 724a, and their fingers as 727a and 726a. The pallets of the pair are indicated as A and B.

When the on-line computer 173 instructs the transporter 114 to collect the pair of pallets from their allocated compartment in the pallet rock, the hydraulic motor 195 is started to drive the chains 251 and move the transporter along the racks 113 and 115 in the appropriate direction. At closely spaced intervals along the racks there are provided speed regulating devices (not shown), such as switches or photo-electric devices, which are effective to detect the position of the transporter along the racks at any time. The memory store of the computer 173 includes information giving the required speed of the transporter as it passes the said devices while approaching its desired destination, and the devices are effective to regulate the speed of the motor 195 so that the transporter acquires the required speed. The maximum speed of the transporter is about 10 feet per second and as it approaches its destination the speed regulating devices reduce its speed until it falls to about 1 inch per second, when the drive from the motor 195 is cut off and the transporter comes to rest with the platform 645 in approximate alignment with the vertical column containing the compartment in which the pair of pallets is stored. When the transporter stops the locators 655 and 656 are hydraulically operated to project from and accurately locate the transporter with the platform 645 aligned with the said column of compartments. The instruction from the computer 173 giving the required compartment is also operative to actuate, if necessary, one or more of the jacks 691, 697 and 703 to raise or lower the platform member 643 so that the platform 645 is raised or lowered to align with the desired compartment in the said column.

On achieving such alignment the end member 725a is extended (by operation of the sleeve 748—FIG. 24) to position itself beneath the projecting lug of the pallet A, and the finger 727a is raised (by fluid pressure applied to the cylinder 754—FIG. 24) to engage between the lug and the side of the pallet, as shown in view (a) of FIG. 31. The member 725a is then withdrawn, pulling the pair of pallets toward the platform 645 and as the leading side of the pallet A comes onto the upper run of the chains 712 their driving motor is started to move the chains so that pushers 723 engage against the inner face of the leading side of pallet A and can take over the drive of the pallets from the finger 727a (view (b)). The finger 727a is then lowered and the pallets are moved on to the platform 645 by the pushers 723 (view (c)) until both pallets A and B are completely on the platform (view (d)), when the drive to the chains 712 is stopped.

The read head 652 (FIG. 29) can then read the identifying number of the pallets, indicating to the computer 173 that they have been collected, and can continue to read their number while they remain on the platform. On receipt of the signal indicative that the pallets have been collected, locators 655 and 656 are withdrawn and the computer 173 then instructs the transporter to move along the racks to align itself with the machine tool pallet loader for which the pallets are destined.

Normally the transporter is first instructed to align the platform 644 with the delivery position of the pallet loader, and to collect a pair of pallets waiting at that position, and then to align the platform 645 with the delivery position to deliver the pallets A and B.

On such alignment, achieved as explained above, the chains 712 are driven so that the pushers 723 push the pallets from the platform 645. The pushers 723 are so spaced along the chains 712 that pushers 723 can take over the drive of the pallets by engagement against the rear face of the pallet B as the front of pallet A leaves the chains (see view (d)), and the pallets are thus moved by the pushers 723 until the trailing end of pallet B leaves the upper run of the chains 712 (view (e)). The finger 726a of the member 724a is then raised to engage between the rear face of pallet B and its projecting lug, and the member 724a extended, by movement of its slide 735a, to continue the drive of the pallets (view (f)) until they are clear of the platform 645 and on the paddle of the pallet loader (view (g)). The read head 652 then ceases to read the number of the pallets, indicating to the computer 173 that they have been delivered. The finger 726a is then lowered and the member 724a withdrawn.

The transporter can then be moved to deliver the pair of pallets received on the platform 644 from the pallet loader to their allocated compartment in the pallet rack.

Movement of the end members 724a and 725a is effected in timed relationship with movement of the pushers 723 so that movement of the pallets is not interrupted as their drive is taken over by the pushers 723 from the finger 727a, or by the finger 726a from the pushers 723. The extent of movement of the member 724a is greater than that of the member 725a, as previously mentioned, because the transporter 114 is positioned closer to the pallet rack 113 than to the loading units 107–112.

The tool magazine carrier 646 is provided with a tool magazine receiving and delivering mechanism essentially the same as that described in relation to the pallet carrying platforms 644 and 645, except that it has two endless chains 760 and 761 which are independently driven in opposite directions, and whose pushers, corresponding to the pushers 723, are retractable so that the pushers on one chain do not foul a tool magazine being moved by the other chain. When a change of tool magazine in a magazine loader of one of the machine tools is required, the transporter 114, on instruction from the computer 173, is moved to align the empty carrier 646 with the magazine delivery position of the loader, and an end member, corresponding to the member 724, and the chain 760 are operated to draw the tool magazine from the paddle of the loader onto the carrier 646. The tool magazine number is then read by the read head 654 indicating receipt of the magazine to the computer 173. The transporter is then moved to align the carrier 646 with the allocated compartment of that magazine in the magazine rack 115, to which the magazine is delivered by operation of the chain 760 and an end member, corresponding to the member 725. On removal of the magazine from the carrier 646 the read head 654 ceases to read the magazine number indicating that it has been delivered. The transporter 114 is then moved to collect the newly required tool magazine from its allocated compartment in the magazine rack 115 and deliver it to the tool magazine loader, collection and delivery being effected by operation of the chain 761 and the end members.

The hydraulic operating devices for the slides and end member fingers are housed in the transporter 114.

The construction and operation of transporter 138 is essentially similar to that of the transporter 114 but its platform member 643 does not have a tool magazine carrier 646 since the transporter 138 is not required to transport tool magazines. The transporter 138 runs on rails on top of and is moved along the pallet rack 113 and magazine rack 115 by means of a driven sprocket 253 (FIGS. 2 and 4B) carrying an endless chain 254 connected to the transorter and passing round an idler sprocket 255. The sprocket 253 is driven from the hydraulic motor 195, which in fact consists of two separate hydraulic motors providing independent drives to the sprockets 250 (FIG. 4A) and 253. As explained more fully elsewhere, the transporter 138 transports pallets between the pallet rack 113 and the work-setting and work resetting stations, which have pallet-receiving and pallet-collection positions directly opposite vertical columns of compartments in the pallet and tool magazine racks so that the transporter can align with these positions by location against the partitions of the racks.

The on-line computer 173 keeps, in effect, a "Pallet Status File" which provides a continuous reference as to the location of each pallet in the system, as to whether each pallet is empty or loaded, and, if loaded, as to the state of the workpiece carried on the pallet. The computer is further informed as to the job number of each of the workpieces carried on pallets by reason of its programme having allocated particular pallet numbers to each job number. The pallet numbes are read after the pallets are loaded and ready for collection from a work-setting station or table so that the "Pallet Status File" can then associate the job number with the numbers of the pallets onto which workpieces of that job have been loaded, and the pallet numbers are similarly read after the completely machined workpieces are unloaded from the pallets and the empty pallets are awaiting collection at a work-setting station or table, so that the "Pallet Status File" can then dissociate the pallet numbers from the job number. The "Pallet Status File" is continuously updated as monitoring read heads in the system feed back signals indicative of changes of location of pallets, and changes of state of workpieces loaded on pallets. The computer is thus continuously informed as to which pallets are empty, which pallets are loaded with unmachined workpieces awaiting initial machining, which pallets are loaded with partly machined workpieces awaiting further machining, which pallets are loaded with workpieces awaiting resetting, and which pallets are loaded with completely machined workpieces awaiting unloading.

The commencement and completion of a pallet transport operation by one of the transporters 114 or 138 are indicated to the computer 173 as explained above through a read head on the transporter reading the identifying number of a pair of pallets when it collects them and while it is carrying them, and ceasing to read the number when it delivers them. The commencement and completion of transport operations involving tool magazines are similarly signalled through the read head 654 on the transporter 114, the computer 173 keeping, in effect, a "Tool Magazine Status File" as explained elsewhere.

The bin transporter 146 is generally similar to the transporters 114 and 138 but its platform member corresponding to the member 643 provides a single horizontal platform adapted to carry one bin, having an associated mechanism as described above in relation to the tool magazine carrier 646 for drawing a bin onto and delivering a bin from the platform at either side of the transporter. The bin transporter 146 runs along rails on top of the bin rack, which is like the tool magazine rack having vertical partitions carrying horizontal base plates defining compartments each of which can contain one bin. A read head is suitably located on the bin transporter 146 to read the identifying number of a bin carried on the platform, and serves to signal to the computer 173 the commencement and completion of a bin transport operation in the manner explained above, the computer keeping, in effect, a "Bin Status File" as explained elsewhere.

It will be appreciated that the monitoring read heads throughout the system serve not only to inform the computer 173 of the actual time that a pair of pallets, a tool magazine or a bin leaves or reaches a particular location, but also, by reading the identifying number, provide a check that it is the intended pair of pallets, tool magazine or bin at the location.

WORK-SETTING AND WORK-RESETTING STATIONS—FIGS. 21, 22 AND 23

A work-setting or work-fixing table or station 118 to 133 which functions as a staging area for the conveyor 139, is shown in FIG. 21. The table has a movable gate member 801 which is automatically opened by the computer 173 to extend across the upper run of the conveyor 139 when a bin destined for the table is placed on the conveyor by the bin transporter 146. The gate member 801 deflects the bin from the conveyor 139 to the work-setting table and the gate then automatically closes. The bin slides down an inclined ramp 802 at the lower end of which is a compartment 804 in which a bin rests while the work-setter is working from it. The compartment 804 has a base 805 movable about a pivot 803 which the work-setter can open, by means of a handle 806, to release a bin on which he (or she) has finished working for travel down an incline (not shown) onto the lower run of the conveyor 139, which returns the bin to the bin preparation area. A read head (not shown) is provided to read the identifying number of a bin in the compartment 804.

The work-setting table or station receives pallets from the transporter 138 at a receiving position 807 and has devices, including chains 808, to move the pallets in a horizontal path through the work-setting table over a plate 809, at which the actual work-setting is carried out, and to a collection position (not visible in FIG. 21) at which the transporter 138 can collect the pallets. The passage of a pair of pallets A and B from the transporter 138 through the work-setting table and back to the transporter 138 is illustrated diagrammatically in FIG. 22, in which full line arrows indicate movement of pallet A and broken line arrows movement of pallet B.

The pair of linked pallets A and B is delivered from one platform (the left hand one as viewed in FIG. 22) of the transporter to the receiving position 807 of the work-setting table, at which the pallets A and B respectively occupy the positions indicated as 810 and 811. The pallets A and B are then moved, as a linked pair, to the right as viewed in FIG. 22, to occupy respectively the positions 812 and 813, and then forwardly (still as a linked pair) to occupy respectively the positions 814 and 815. This latter position 815 occupied at this time by the pallet B is on the plate 809 and the work-setter can then perform the required work-setting operation of the pallet. After the operation, pallet B is moved to the right (thereby unlinking the pallets) to occupy position 816 and pallet A is moved forward to position 815 at which the work-setter performs the appropriate work-setting operation on pallet A. Pallet B is then moved rearwardly to position 817 and pallet A is moved across to position 816 (pallet A being lifted slightly as it is so moved to permit its lug to pass over the lug of pallets B, and then lowered to re-link the pallets). Pallets A and B are then moved rearwardly as a linked pair,.to occupy respectively the positions 818 and 819, at the collection position 820 from which the linked pair of pallets can be received on the right hand platform (as viewed in FIG. 22) of the transporter 138. The two platforms of the transporter 138 are so spaced that one pair of pallets can be delivered to the receiving position 807 of the work-setting table while another pair of pallets is simultaneously collected from the collection position 820.

It will be seen that by this arrangement of the work-setting table there can be provided a buffer store of two pairs of incoming pallets (at positions 810, 811 and 812, 813) and one pair of outgoing pallets (at positions 818 and 819) between the transporter 138 and the positions (814, 815, 816 and 817) actually used by the work-setter when moving the pallets of a pair through a work-setting operation. The plate 809 is provided with bearings, and preferably air-bearings 821, (see FIG. X) to assist the operator's movement of pallets across the plate.

Read-heads are provided to read the identifying numbers of the pallets of a pair (the numbers of the two pallets being the same) at the delivery position 820.

In front of the operator, i.e. above and slightly to the rear of the plate 809, is a panel containing indicators 822 which can, under control of the on-line computer 173, light up to inform the operator of the type of work-setting operation to be performed. Thus an indicator, when lit, displays a legend such as "Set", "Re-Set" or "Unload". Below the indicators is a digital clock 823, (also operated by the computer 173), having plus and minus signs, which displays to the operator the time remaining for completion of a job by giving a count-down from its commencement, and further displays between jobs the cumulative difference between the time norm and the actual time taken for work-setting operations performed through the day.

Next to the indicator and clock panel is a support guide 824 for a work-setting template, and next to that is an intercommunication loudspeaker/microphone 825 connecting with the human controller 189 (and which may also be used to relay music during working hours). A torque-limiting pneumatic screw-driver 826 is provided for use in fixing tooling to pallets and workpieces to tooling, together with a holder 827 for change tools for use in the screw-driver. The operations performed at and by the work-setting table are as follows.

When work-setting operations on a job are to be performed, the bin containing the workpiece tooling, template etc. of that job is (under control of the on-line computer 173) placed on the upper run of the conveyor 139 and the gate 801 of the work-setting table designated by the computer, is opened to deflect the bin from the conveyor to that table. On arrival of the bin in the compartment 804 its number is read and is signalled back to the computer 173. The computer 173 has allocated a group of pallets to that job, and instructs the transporter 138 to collect the first pair of pallets of that group from the pallet rack and deliver them to the receiving position 807 of the work-setting table. The computer 173, responsively to the reading of the bin number, also lights up the "Set" indicator on the display panel. The operator can then study the work-setting instructions in the bin, and mount the work-setting template in the guide 824, while delivery of the pallets is awaited.

On arrival of the first pair of pallets at the receiving position 807 (when the transporter 139 is simultaneously withdrawing the last pair of pallets of the preceding job, if any, from the collection position 820) the computer 173, starts the count-down on the clock 823, and operates the devices (including the chains 808) to move the pair of pallets until they reach the positions 814 and 815. Whilst a pair of pallets is on the transporter their presence is continually being signalled back to the computer 173 due to the presence of their identifying numbers in front of the read head of the transporter. The computer is thus aware of the pallets leaving the tranporter.

The operator then carries out the necessary work-setting operations on the leading pallet and then on the second pallet of the pair using the scrw driver 826 (the actual operations being carried out in a manner as described in U.S. patent application Ser. No. 718,887 filed Apr. 4, 1968, by P. G. Davis. While the operator is performing these operations on the first pair of pallets the transporter 138 can deliver two further pairs of pallets, the first further pair being automatically moved on arrival to the positions 812 and 813.

When the operator has completed operations on and has relinked the two pallets of the first pair they are moved forward to the collection position 820, where their number is read and the computer 173 responsively causes the first further pair of pallets to move forward from positions 812 and 813 to positions 814 and 815 (for operations to be performed on them by the work-setter) and the second further pair of pallets to move sideways from positions 810 and 811 to positions 812 and 813. The computer also instructs the transporter 138 to collect the next pair of pallets of the group allocated to that job from the pallet rock and deliver them to the receiving position 807, simultaneously collecting the pair of pallets at the collection position 820. In this manner, while that job is being work-set, the presence of a pair of pallets at the collection position 820 initiates the delivery of a new pair of pallets to the table and moves the pairs of pallets, in sequence, through the actual work-setting positions.

Where the job is loaded into a number of bins, the bins are delivered (via the bin transporter 146 and conveyor 139) to the work-setting table at intervals responsively to the rate at which pallets are loaded by the work-setter. Thus, the arrival at the receiving position 807 of the last pair of pallets for the contents of one bin initiates the delivery of a further bin (whose number is read on arrival and which is received in the compartment 804 after the operator has returned the preceding bin to the conveyor 139).

As a check, when the number of a pair of pallets at the collection position is read, the bin number is also read (in the compartment 804) and signalled back to the computer 173 (with an address signal indicating the particular work-setting table). The loaded pallets collected from the work-setting table are taken by the transporter (which also reads their number) to their allocated compartment in the pallet rack.

When the worksetter has finished loading the last pair of pallets of the group allocated to the job, and has moved them to the collection position 820, the reading of their number causes the computer to stop the count-down on the clock 823 and to initiate the dispatch of the next job to the work-setting table. The work-setter, while waiting for arrival of the bin and pallets for the next job, removes the template from the guide 825 and places it and any other instructions which were used in the bin in the compartment 804 before returning the bin to the conveyor 139.

When (normally at the beginning of the 8 hour day shift) the work-setter is to unload pallets bearing machined workpieces or components a similar procedure is followed but the bins delivered to the work-setting table are empty and the pallets delivered are loaded. The "Unload" section of the display indicator is lit up by the computer and the work-setter removes the workpieces and tooling from the pallets and places them in the empty bins, the empty pallets being collected by the transporter 138 and taken to their allocated compartments in the pallet rack. The filled bins are deposited on the lower run of the conveyor 139 for dispatch to the bins preparation area. In practice, the automatic operations of delivery of the first empty bins and loaded pallets to the work-setting tables can take place before the work-setters arrive to commence their 8 hour shift, so that they are not delayed on commencement.

When the work-setter is required to perform work refixing or resetting operations, the bin containing any necessary tooling, template and instructions for resetting the job is delivered to the work-setting table and the reading of its number on arrival causes the computer 173 to light up the "Re-set" indicator on the panel, and to initiate the delivery of the pallets loaded with the workpieces to be reset by the transporter 138 from the pallet rack to the work resetting table associated with the work-setting table (each work resetting table being associated with a number of work setting tables). The operator, on seeing the lit "Reset" indicator then takes the bin to the resetting table.

The passage of pallets through the work resetting table is slightly different from that through the work-setting table and is diagrammatically shown in FIG. 23. A pair of pallets A and B is delivered from the left-hand platform (as viewed in FIG. 23) of the transporter 128 to a receiving position 828, at which the pallets occupy respectively positions 829 and 830. The pallets A and B are then moved forward to occupy respectively positions 831 and 832. At the position 832 is a turntable adapted firstly to lift the pallet on it to unlink it from the other pallet, and then to rotate the pallet (anticlockwise as viewed in plan) through 90° in order to correctly orientate the pallet for the next position. Pallet B (having been rotated through 90°) is then moved to the right to position 833 at which there is a horizontal platform having associated hydraulically operated devices (as disclosed in U.S. Pat. No. 3,243,178 issued Mar. 29, 1966) for automatically shuffling the pallet accurately into position relative to the axes of movement of microscopes (which correspond to the axes of movement of the cutter spindle in a machine tool) in the same way as the pallet is automatically shuffled accurately into position in the machine tool, the pallet being rotated through 90° at position 832 to achieve the same orientation of the pallet at position 833 as that which it assumes in the machine tool. Pallet B, after being shuffled into position, has the necessary work re-setting operations performed on it at position 833, the operations consisting of altering the attitude of the workpiece (e.g. inverting it) relative to the pallet, and/or otherwise re-fixing it (e.g. by application of different clamps), the microscopes being used to ensure that the attitude of the retired workpiece bears an accurate predetermined relationship to its attitude before refixing. After the refixing operations on pallet B, it is moved to the right to position 834, where there is a further turntable adapted to rotate the pallet clockwise through 90° so that it resumes its original orientation. The pallet B is then moved rearward to position 835. Pallet A is then moved forward from position 831 to position 832, rotated anticlockwise through 90°, moved to the right position 833, and automatically shuffled into position for the work resetting operations, after which it is moved to position 834, lifted and rotated clockwise through 90°, and then lowered to relink it with pallet A. The pair of linked pallets A and B is moved rearward to positions 836 and 837 respectively, which together constitute a collection position 838 from which the pallets can be received on the right-hand platform of the transporter 138.

Apart from these differences of path and travel, the passage of pallets through the work resetting table is generally similar to that through the work-setting table. Thus, read heads are provided to read the number of a pair of pallets at the collection position 838. The arrival of the first pair of pallets of a job at the receiving position initiates the countdown on a clock at the work re-setting table, which countdown is terminated on reading the number of the last pair of pallets carrying workpieces of a particular batch or variety at the collection position (this latter reading also serving to initiate the delivery of a further job to the work-setting table). The work resetting table, unlike the work setting table does not have provision to receive bins from or to deliver them to the conveyor 139, the worksetter bringing the bins from, and returning them to the work-setting table.

After completing the work resetting operations, the operator returns with the bin (into which the re-setting template, instructions and any tooling discarded during the re-setting operations are placed) to the work-setting table from which the bin is returned to the conveyor 139.

It will be appreciated that, if desired, instead of the work-setting table operators moving to the work resetting tables to perform work resetting operations, the work re-setting tables could be manned by separate operators and provision made for receipt and delivery of bins to the work resetting tables in the same way as described in relation to the work-setting table.

Further, work re-setting operations which do not require moving the workpiece relative to the pallet (e.g. which simply require the application of different clamps) and which therefore do not require the use of microscopes to achieve accurate relation of the workpiece, can be carried out at the work setting table. In this case the panel includes an indicator giving the instruction "Normal Reset" when the reset is to be performed at the work-setting table and an indicator giving the instruction "Microscope Reset" when it is to be performed at the resetting table.

BIN PREPARATION AREA—FIGS. 3 AND 4B

Referring again to FIGS. 3 and 4B, the bin preparation area 140 includes a bin rack, previously described, a bin unloading and loading bench in two parts 201 and 202, and two conveyors 203 and 204 moving in opposite directions (as indicated by the arrows) and adapted to receive bins returning to the bin preparation area on the conveyor 139. Mechanism (not shown) is provided for lifting a bin returning on the lower run of the conveyor 139 and for depositing it on one of the conveyors 203 and 204. Bins containing machined workpieces or components which have been unloaded from pallets at the work-fixing tables are deposited on the conveyor 204 and moved to the right hand portion 202 of the bench as viewed in FIGS. 3 and 4B. Bins containing tooling, and/or templates and work-fixing instructions are deposited on the conveyor 203 and moved to the left hand portion 201 of the bench.

The lifting mechanism referred to above has monitoring means, in the form of a read head, to read the identifying number of a bin received and to transmit a signal indicative of the number to the on-line computer 173 which (having a reference associating the bin number with its contents) ascertains whether or not the bin contains a machined workpiece or component and controls the lifting mechanism to direct the bin to the appropriate conveyor 203 or 204.

At the right hand portion 202 (as viewed in FIGS. 3 and 4B) of the bin loading and unloading bench is a device indicated as 205 (connecting with the AID point 180). The device 205 includes a monitoring read head to read and feed back to the on-line computer 173 a signal indicative of the identifying number of a bin. On instruction from the computer 173 the device 205 can issue a print-out or ticket bearing information including the next destination of the machined workpieces or components in the bin. For example, the workpieces or components may be going to an anodizing or an etching department or a finished parts store. When the bin is unloaded the machined workpieces or components are placed in a further bin to be taken to their destination, the further bin not having an identifying number so that the bins which do have identifying numbers are used only in the system or installation described and do not leave it. Also in this further bin is placed the print-out or ticket. The device 205 also has a further read-head to read and feed back to the on-line computer 173 a signal indicative of the number of the job being loaded into a bin. The job number appears on the template used during the fixing of workpieces in that job to pallets. The identifying number of the bin is read by the previously mentioned monitoring read-head in device 205 so that the computer can thereafter associate that job number with that bin. At the left hand portion 201 (as viewed in FIGS. 3 and 4B) of the bin unloading bench there is a monitoring read-head which can read and feed back to the computer a signal indicative of the identifying number of a bin being unloaded of tooling, and/or templates and work-setting instructions, so that the computer 173 can then dissociate the number of that bin from the number of the job it contained.

A bin as used in the system or installation is shown in FIG. 8 and comprises a box-like member 206 with an open top and a partly open inclined front face with a cross bar 207. The identifying number of the bin is located on one outer side of a rim 208, and is in the form of magnetic and non-magnetic plugs in holes 209 to provide a number based on a binary system as previously described in relation to the identifying numbers of pallets. As previously mentioned, any other suitable system could be employed. Also, the numbers could be on the bin base near the front face.

The bin transporter 146 is essentially similar to the pallet transporter 138 but has a single platform adapted to carry one bin at a time and also has associated means to draw a bin onto, or to deliver a bin from, the platform at either side of the transporter and a read head to read the identifying number of a bin being carried. The transporter runs along a rail provided on top of the part 141 and the transit sections 143, 144 and 145 of the bin rack, and is moved along the rack by a chain 210 connected to it and passing round an idler sprocket 211 and a sprocket 212 driven by a hydraulic motor 197.

The operations performed in the bin preparation area will now be described. The on-line computer 173 keeps, in effect, a "Bin Status" File which enables it to determine the location, contents and availability of all the bins at any time, such file being based on and continuously updated by signals fed back from the monitoring read heads in the bin preparation area and at the work-setting tables.

The scheduling computer 174 issues to a material preparation area (not shown) associated with the bin preparation area a print-out designating the jobs to be loaded into bins on one day (for work-setting and machining on the next day). This print-out provides sufficient information to enable human operators in the material preparation area to collect and provide the necessary tooling, templates, and work-fixing instructions for those jobs and to prepare the necessary workpieces which are cut off from light alloy billets, having one surface faced as necessary, and are drilled with fixing holes required for work-fixing. This print-out may, in fact, merely inform the material preparation area of the part number and number-off of components required (the job number conveniently being the same as the part number). In this case the material preparation area will have a file or envelope for each part number containing the necessary information and including a drawing of the work-piece blank, a punched card or template for use in drilling holes required for work-fixing, work-fixing instructions such as a work-setting drawing or photograph, a work-setting template, and a list of tooling required for work-setting. If the workpiece will require resetting the file or envelope will also contain a re-setting drawing or photograph, a resetting template, and a list of tooling required for resetting.

The human operators in the bin preparation area take empty bins from the first transit section 143 of the bin rack and load them at the bin loading bench 202, each bin being loaded with the material required for a particular job number, and the job number and bin number being fed back to the computer 173 by the device 205 for subsequent association in its "Bin Status" File as previously described. Where the size of a job (i.e. the number-off of workpieces) necessitates the job being loaded into a number of bins, the job number is associated with the identifying number of each of the bins, and the work-setting template bearing the job number is placed in the first bin identified to the computer 173, which will dispatch that bin first to the work-fixing table. Each loaded bin is placed by the human operator in the second transit section 144 of the bin rack from which it is transferred by the bin transporter 146 to its allocated compartment in the main section 141 and 142.

Resetting of a workpiece and subsequent machining is considered as a separate job so that when the print out issued to the material preparation area by the computer 174 on one day includes a job having workpieces which will require resetting, the print out issued on the next day (when those workpieces are undergoing their initial work-setting and machining operations) will include a job requiring the necessary tooling, template and instructions for resetting of those workpieces to be loaded into a bin, which bin will have its number and the job number of the template it contains read when loaded as previously.

In the manner explained above the day's programme of bin loading is carried out and the loaded bins are transferred to the main section 141 and 142 of the bin rack where they remain until the next day. On the next day the bin transporter 146, under control of the computer 173, transfers the loaded bins from the main section of the bin rack on to the conveyor 139 for transport to the work-fixing tables (the computer 173 operating the deflector at the work-fixing table for which a bin is destined when it causes that bin to be placed on the conveyor 139).

Bins returning from the work-setting tables and containing templates and instructions which the work-setters have used for fixing the workpieces contained in the bins to pallets, are received at the left hand portion 201 (as viewed to FIGS. 3 and 4B) of the work unloading bench, where they are unloaded, the bin's identifying number being read so that the computer can up-date its "Bin Status" File to dissociate the number of that bin from the job number it contained and can register it as an empty bin. The empty bin is placed by the human operator in the third transit section 145 of the bin rack, from which it is transferred by the bin transporter 146 to its allocated compartment in the main section 141 and 142. The operator returns the unloaded template and instructions to the material preparation area. Returned bins which also contain tooling discarded during a work resetting operation are similarly dealt with.

When (normally at the beginning of each day) the work-setters are to unload machined workpieces or components from pallets, the bin transporter 146, under control of the computer 173, transfers empty bins from the main section 141 and 142 of the bin rack on to the conveyor 139 for dispatch to the work-setting tables. The computer 173 updates its "Bin Status" File to associate the number of the bin it dispatches with the number of the job about to be unloaded into it. These bins, when they return containing the machined workpieces or components (and the tooling by which they were fixed to pallets) are received at the right hand portion 202 (as viewed in FIGS. 3 and 4B) of the bin unloading bench and are unloaded, the components being transferred to other bins with a print out or ticket as described before, and the tooling being returned to the material preparation area. The empty bins are placed in the third transit section 145 of the bin rack for transfer by the transporter 146 to their allocated compartments of the main section, the computer updating its "Bin Status" File and dissociating the bin number from its contents as described previously.

To reduce the number of transport operations which have to be performed by the bin transporter 146, some of the bins which have been unloaded could, instead of being placed by the human operators in the transit section 145 of the bin rack, be placed on a separate support to form a queue of empty bins from which the operators can take bins for loading instead of from the transit section 143.

In the above description resetting of a workpiece and subsequent machining is considered as a separate job which takes place on the day after the workpiece has undergone its initial setting and machining operations. However, the scheduling computer could arrange its programme so that, as far as practicable, those workpieces which require resetting have their initial work-setting and machining operations performed as early as possible in the day so that they can be sent to the work-resetting tables to undergo resetting operations on the same day before the end of the 8 hour shift worked by the work-setting operators. The machining operations on the reset workpieces can then be carried out during the 16 hours following the 8 hours shift, and thus the machining of the workpieces both before and after the resetting can be completed in the same 24 hour day. In this case, the bin containing the template, instructions and, if necessary, tooling required for resetting can be loaded at the same time as the bin containing the workpieces, template, instructions and tooling for the initial work-setting, i.e. on the day before the work-setting and machining operations are performed. Alternatively, the bin containing the material required for work resetting can be loaded during the early part of the next day, while the workpieces are undergoing their initial work-setting and machining operations. Whichever of these alternatives is followed, the bin loaded with work-resetting material is placed, via transit section 144 and bin transporter 146, in its allocated compartment in the main section 141 and 142 of the bin rack after loading to await dispatch to the appropriate work-setting table on instruction by the computer 173.

TOOL MAGAZINE PREPARATION—FIGS. 3, 4B AND 7

Tool magazine preparation, i.e. the unloading of tools from magazines and the loading of magazines with tools, takes place at a tool magazine loading bench 220 (FIGS. 3 and 4B). When the machining operations to be performed by a machine tool require tools not presently available in a magazine on its tool magazine loader or in the tool magazine rack 115, the computer 173 instructs the transporter 114 to collect a magazine containing tools which are not presently needed from its compartment in the tool magazine rack (or direct from the magazine loader of the machine tool which last used that magazine) and deposit it in a compartment of the transit section 117. A human operator then removes the magazine from the transit section 117, and takes it to the bench 220 where its tools, or some of them, are unloaded and replaced by the newly required tools. The operator then places the newly loaded magazine in a compartment of the transit section 116 from which the transporter 114, on instruction from the computer 173, collects it and delivers it to its allocated compartment of the tool magazine rack 115 (or direct to the magazine loader of the machine tool for which it is destined).

The compartments of the transit sections 116 and 117 each have a switch operated by delivery of a tool magazine to the compartment which signals the computer 173 and the tool magazine preparation bench respectively that a magazine is present in the compartment ready for collection. On collecting a magazine from the transit section 116 the transporter 114 reads and signals to the computer 173 the identifying number of the tool magazine, to enable the computer to instruct the transporter as to the magazine's destination.

The computer 173 keeps, in effect, a "Tool Magazine Status File" which contains the information as to the tools contained in the tool magazines at any time, and which is updated when the tools in a magazine are changed. This File also provides a continuous reference as to the location of tool magazines in the system, i.e. whether a magazine is in its compartment of the magazine rack or on a magazine loader of one, and if so which, of the machine tools, the reference being updated as the computer instructs the transporter 114 to change the location of a magazine.

The scheduling computer 174 issues a daily print-out which informs the tool magazine preparation operators of the tool changes, if any, required in particular magazines (the print-out specifying the positions in each magazine for particular tools), and which further lists the cassetted tape numbers required in the random access tape store of each of the machine tools. The tape cassette numbers can then be checked from this list and any necessary changes of tape in the store made.

It will be appreciated that the tool magazine preparation bench 220 can be used not only for changing the types or dimensions of tools in a magazine when required, as described above but also for replacing worn or broken tools in a magazine.

The tool magazines used on the six axis single spindle machine tools 105 and 106 are generally of the same shape and size as those used on the twin spindle machines 101–104 but do not carry as many tools. The six axis machine tool magazines have thirteen sockets 451 (see FIG. 7) arranged in two rows, each socket being adapted to hold one tool. Thus sixty-five tools are readily available to the single spindle of each of the six axis machines by reason of their tool magazine loaders being capable of carrying five tool magazines (one on each paddle) each containing thirteen tools.

HUMAN CONTROLLER

The human controller 189 is provided with a display panel which includes a display of the cumulative time difference between the norm and the actual time taken for work-setting operations performed through the day for each of the work-setting tables or stations. From this the controller can see how the progress of work-setting operations compares with the schedule programme and can communicate through an intercommunication microphone and loudspeaker with any of the work-setting station operators when necessary. The display panel also includes a bank of indicators representing the compartments in the pallet rack and the controller has a five-way switch which can be used to interrogate the computer 173 to ascertain from its "Pallet Status File", so that it lights up the appropriate indicators, the identifying numbers and positions of empty pallets, pallets which have been loaded with workpieces and are awaiting machining, pallets loaded with partly machined workpieces awaiting further machining, pallets loaded with workpieces awaiting resetting, and pallets loaded with machined workpieces awaiting unloading. In addition the controller can receive print out messages from the computer 173 informing him of any fault or abnormal deviation which has become apparent in the system.

INSPECTION MACHINE

The system may contain an automatic inspection machine (not shown in any of the figures). When the first pair of pallets of a batch has had its workpiece completed, it is then routed by the computer 173 to the inspection machine where the accuracy of the job is checked with the workpiece still in position. This procedure can be undertaken before machining proceeds on the rest of the job or can be a routine part of the system.

IDENTIFYING NUMBER MODULAR CHECK

As previously described, the identifying numbers on the pallets, tool magazines and bins are in the form of thirteen positions (which in the example described are holes), different combinations of which contain elements (in the example described magnetic plugs) to provide numbers based on a binary system. The actual number may be provided by ten of these holes and the remaining three may be used to provide a modular check.

POSSIBLE OTHER MACHINE TOOLS

As has been already emphasised the row of machine tools 101 and 106 is neither fixed as regards the type of machine nor as to the quantity of them. The machines 101 and 102 are basically as disclosed in U.S. Pat. No. Re. 25,956 issued Feb. 22, 1966 but they may be adapted for ferrous metal production. In this case the spindle speed is much lower with the turbine drive replaced by a hydraulic motor drive, alternatively the turbine drive could be geared down. In addition other design features are changed. Machines may also be introduced into the line or row of machines adapted for the production of turned parts provided they are numerically, that is, data-controlled. Such machines may be as those disclosed in U.S. patent application Ser. No. 611,708 filed Jan. 25, 1967 by Williamson et al. In this case the data-controlled turning machines must be capable of receiving a workpiece fixed to a pallet with the pallet being fixed to the workpiece-holding part of the turning machine. Similarly, if so desired, grinding machines, or indeed any other type of machine tool, can be incorporated into the system, which is fully flexible.

The number of machines need not be confined to six. There can be as many as desired though of course other features of the system may have to be changed to accommodate an increased number.

COMPUTER FUNCTION

It will be appreciated that the programming of the on-line computer 173 on a day-to-day basis can provide an even loading of the system and maintain a continuous flow of workpieces through the system by reason of the communication between the on-line computer 173 and the scheduling computer 174 whereby each days programme can be modified to allow for deviations from the schedule of the preceding programme.

It will be noted that the connection between these two computers 173 and 174 is shown (FIG. 4A) as a broken line and this is intended to indicate that this connection may take various forms.

The essential functions of the unit or computer 173 are simple; it must be capable of emitting control signals, via the ring mains and data links, to the various elements of the system in a proper sequence, and it must be capable of sensing from data fed back to it (via the data links and the ring main), whether there has been a correct and complete response to each control signal before emitting further, possibly conflicting, control signals. If the fed back data indicates an incorrect and/or incomplete response, then the unit 173 must give some form of fault indication. Preferably however the unit 173 does possess some computing (or, more correctly, data-processing) capabilities and is programmed to take logical executive action in the event of a fault indication. Such capabilities may even be so extensive as to permit a rearrangement of the initially-planned sequence of operation of the system, should this become distorted during execution; such a facility is valuable because of the interdependence of the machine tools and computer-controlled transporters (whose operating times are predictable to a high degree of accuracy) and the human operators, whose predictability is purely statistical.

Such rearrangement of operation sequences may however be a function reserved to the scheduling computer 174; the latter may be permanently coupled to unit 173 and employed as an extension of the latter, in which case the unit 173 may be relatively simple. This however may only be economic if the computer 174 is a time-sharing computer i.e. it can perform work quite unconnected with the machine tool system, but can interrupt such extraneous work for such periods of time as the unit 173 may indicate (via the permanent connection) a need for the facilities of the computer 174.

SHIFT WORKING

In the description of the operation of the system it is stated that the human work-setting and bin-preparing operators work one 8 hour shift in a 24 hour day, and it will be understood that this is on the basis that the machining operations necessary for the components being produced are such that the machine tools 101-106 can machine in 24 hours the amount of work that human operators can deal with in 8 hours. It will be appreciated, however, that if the components being produced are such that human operations for more than 8 hours are needed to keep the machine tools occupied, human operators could work for such longer time on an appropriate shift basis. For example there could be two or even three 8 hour shifts of human operators in each 24 hours day if required.

What I claim as my invention and desire to secure by Letters Patent is:

1. The process of producing engineering components from workpieces by the removal of material therefrom by means of a plurality of data-controlled machine tools, each of which has automatic means for locating and securing thereon a common workpiece holder, said machine tools being complementary to each other in relation to the machining operations to be carried out on the workpieces; said process comprising securing each workpiece to a workpiece holder in a predetermined position and attitude with respect to the workpiece holder, delivering each workpiece holder to storage means and storing each workpiece holder so that each workpiece is selectively accessible, selecting each workpiece holder from said storage means, presenting each of said selecting workpiece holders to a selection of said machine tools in predetermined sequence, automatically and sequentially locating and securing each of said selected workpiece holders at a predetermined location and attitude in each of said selected machine tools and subsequently performing programmed machining operations on said workpiece in each of said selected machine tools while said workpiece holder is so located and secured therein.

2. The process according to claim 1 wherein each workpiece holder is a pallet.

3. The process according to claim 1 wherein said operating sequence of machining steps to be carried out by said machine tools on each of said workpieces is controlled by a common programmable control means.

4. The process according to claim 3 wherein said workpiece mounted on each of said workpiece holders is conveyed between said storage means and said selected machine tools by transport means controlled by said common programmable control means.

5. The process according to claim 4 further comprising locating a plurality of tools, for use by more than one of said plurality of machine tools, in said storage means; and selecting and transporting tools by said transport means from said storage means to selected machine tools in accordance with tool requirements for machining operations by said selected machine tools; said selecting and transporting of tools being under the control of said control means.

6. The process according to claim 5 wherein said selecting each workpiece holder from said storage means, presenting each workpiece holder to a selection of said machine tools, selecting tools from said storage means, and transporting said tools from said storage means to said machine tools, are performed by said transport means, said transport means being adapted for movement along a path from which there is access to said storage means and to each of said machine tools.

7. The process according to claim 3 wherein said selecting each workpiece holder with a workpiece secured thereto from said storage means and presenting each workpiece holder to a selection of said machine tools are performed by transport means adapted for movement along a path from which there is access to said storage means and to each of said machine tools, said selecting and presenting of workpiece holders being under the control of said common programmable control means.

8. The process according to claim 3 further comprising, after a machining operation on a workpiece secured to a workpiece holder by a selected machine tool has been completed, releasing said workpiece holder in said selected machine tool; returning said workpiece holder in said storage means, storing said workpiece holder in said storage means so that said workpiece is selectively accessible; and then selecting said workpiece holder from said storage means; presenting said workpiece holder to a different selected machine tool; securing said workpiece holder at a predetermined location and attitude in said different selected machine tool; and subsequently performing at least one further programmed machining operation on the workpiece secured to said workpiece holder in said different selected machine tool; said returning, storing, selecting and presenting of said workpiece holder being under the control of said common programmable control means.

9. The process according to claim 8, wherein said selecting each workpiece holder with a workpiece secured thereto from said storage means, presenting each workpiece holder to a selection of said machine tools, returning a workpiece holder to said storage means, selecting said workpiece holder from said storage means and presenting said workpiece holder to a different selected machine tool, are performed by transport means adapted for movement along a path from which there is access to said storage means and to each of said machine tools, said selecting, presenting, returning and storing of workpiece holders being under the control of the said common programmable control means.

10. The process according to claim 9 further comprising locating a plurality of tools, for use by more than one of said plurality of machine tools, in said storage means; and selecting and transporting tools from said storage means to selected of said machine tools in accordance with tool requirements for machining operations by said selected machine tools; said selecting and transporting of tools being performed by said transport means and being under the control of said common programmable control means.

11. The process according to claim 10 further comprising, after machining operations by selected machine tools, transporting said tools by said transport means from said selected machine tools to said storage means; storing said tools in said storage means; and then selecting and transporting said tools by said transport means from said storage means to selected machine tools for use by said selected machine tools in further machining operations; said storing, selecting and transporting of said tools being under the control of said control means.

12. The process of producing a plurality of different engineering components from workpieces of different forms by the removal of material therefrom by means of a plurality of data-controlled machine tools, each of which has automatic means for locating and securing thereon a common workpiece holder, said machine tools being complementary to each other in relation to the machining operations to be carried out on said workpieces; said process comprising securing each workpiece to a workpiece holder in a predetermined position and attitude with respect to the workpiece holder, delivering each workpiece holder to storage means and storing each workpiece holder so that each workpiece is selectively accessible, selecting each workpiece holder from said storage means, presenting each of said selected workpiece holders to selected of said machine tools in predetermined sequence, the sequence for each form of workpiece being different, automatically and sequentially locating and securing each of said selected workpiece holders at a predetermined location and attitude in each of said selected machine tools and subsequently performing programmed machining operations on each of said workpieces in each of said selected machine tools while the respective holder is so located and secured therein.

13. The process according to claim 12 wherein said operating sequence of machining steps carried out by said selected machine tools on each of said workpieces is controlled by a common programmable control means.

14. The process according to claim 13 wherein the operating sequence of transporting steps for conveying each of said workpieces mounted on said workpiece holders between said storage means and said selected machine tools is performed by transport means controlled by said common programmable control means.

15. The process according to claim 14 further comprising locating a plurality of tools, for use by more than one of said plurality of machine tools, in said storage means; and selecting and transporting tools by said transport means from said storage means to selected machine tools in accordance with tool requirements for machining operations by said selected machine tools; said selecting and transporting of tools being under the control of said common programmable control means.

16. The process according to claim 15 wherein said selecting each workpiece holder from said storage means, presenting each workpiece holder to a selection of said machine tools, selecting tools from said storage means, and transporting said tools from said storage means to said machine tools, are performed by said transport means, said transport means being adapted for movement along a path from which there is access to said storage means and to each of said machine tools.

17. The process according to claim 13 wherein said selecting each workpiece holder with a workpiece secured thereto from said storage means and presenting each workpiece holder to a selection of said machine tools are performed by transport means adapted for movement along a path from which there is access to said storage means and to each of said machine tools, said selecting and presenting of workpiece holders being under the control of said common programmable control means.

18. The process according to claim 13 further comprising, after a machining operation on a workpiece secured to a workpiece holder by a selected machine tool has been completed, releasing said workpiece holder in said selected machine tool; returning said workpiece holder to said storage means; storing said workpiece holder in said storage means so that said workpiece is selectively accessible; and then selecting said workpiece holder from said storage means; presenting said workpiece holder to a different selected machine tool; securing said workpiece holder at a predetermined location and attitude in said different selected machine tool; and subsequently performing at least one further programmed machining operation on the workpiece secured to said workpiece holder in said different selected machine tool; said returning, storing, selecting and presenting of said workpiece holder being under the control of said common programmable control means.

19. The process according to claim 18, wherein said selecting each workpiece holder with a workpiece secured thereto from said storage means, presenting each workpiece holder to a selection of said machine tools, returning a workpiece holder to said storage means, selecting said workpiece holder from said storage means and presenting said workpiece holder to a different selected machine tool, are performed by transport means adapted for movement along a path from which there is access to said storage means and to each of said machine tools, said selecting, presenting, returning and storing of workpiece holders being under the control of the said common programmable control means.

20. The process according to claim 19 further comprising locating a plurality of tools, for use by more than one of said plurality of machine tools, in said storage means; and selecting and transporting tools from said storage means to selected of said machine tools in accordance with tool requirements for machining operations by said selected machine tools; said selecting and transporting of tools being performed by said transport means and being under the control of said common programmable control means.

21. The process according to claim 20 further comprising, after machining operations by selected machine tools, transporting said tools by said transport means from said selected machine tools to said storage means; storing said tools in said storage means; and then selecting and transporting said tools by said transport means from said storage means to selected machine tools for use by said selected machine tools in further machining operations; said storing, selecting and transporting of said tools being under the control of said control means.

22. The process of producing a plurality of different engineering components from workpieces of different forms by performance of operations thereon by means of a plurality of data-controlled machine tools each of which has automatic means for locating and securing thereon a common workpiece holder, storage means having a plurality of locations for workpieces stored therein so that each workpiece is selectively accessible, transport means, and programmable control means, said machine tools being complementary to each other in relation to the operations to be carried out on said workpieces; said process comprising securing each workpiece to a workpiece holder in a predetermined position and attitude with respect to the workpiece holder, selecting each workpiece holder from a location in said storage means, transporting each selected workpiece holder by said transport means between said storage means and at least one preselected machine tool, automatically and sequentially locating and securing each of said workpiece holders at a predetermined location and attitude in each of said selected machine tools, and subsequently performing programmed operations on each of said workpieces in each of said selected machine tools while said workpiece holder is so located and secured therein, the operating sequence performed by said storage means, transport means and machine tools, including selecting, locating and securing workpiece holders, being under the control of said control means, the operating sequences of different workpieces, under the control of said control means, being different.

23. The process according to claim 22 wherein said workpiece holders are transported by said transport means along a path from which there is access to said storage means and to each of said machine tools.

24. The process according to claim 23 wherein said workpiece holders are transported by said transport means in both directions along said path.

25. The process according to claim 23 further comprising, after a machining operation on a workpiece secured to a workpiece holder by a selected machine tool has been completed, releasing said workpiece holder in said selected machine tool, transporting said workpiece holder by said transport means to said storage means, storing said workpiece holder so that said workpiece is selectively accessible, and then selecting and transporting said workpiece holder by said transport means from said storage means to a different selected machine tool, securing said workpiece holder at a predetermined location and attitude in said different selected machine tool, and subsequently performing further programmed machining operations on said workpiece in said different selected machine tool, said steps of transporting, storing and selecting said workpiece holder being under the control of said control means.

26. The process according to claim 22 further comprising locating a plurality of tools, for use by more than one of said plurality of machine tools, in said storage means; and selecting and transporting tools by said transport means from said storage means to selected machine tools in accordance with tool requirements for machining operations by said selected machine tools; said selecting and transporting of tools being under the control of said control means.

27. The process according to claim 26 wherein said workpiece holders and tools are transported by said transport means along a path from which there is access to said storage means and to each of said machine tools.

28. The process according to claim 27 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said storing, selecting and transporting of said tools being under the control of said control means.

29. The process of producing engineering components from a plurality of batches of different forms of workpieces by means of a machining system comprising a plurality of machine tools capable of performing different machining operations and adapted to use a series of selected tools, storage means for storing a plurality of workpieces so that each workpiece is selectively accessible, transport means to transport workpieces between a succession of said machine tools, and programmable control means, each batch comprising a plurality of workpieces requiring substantially the same machining operation and the workpieces of different batches requiring different machining operations; said process comprising:

mounting each workpiece on a pallet adapted for locating said workpiece at each of said machine tools required for machining said workpiece;

locating each pallet-mounted workpiece in said storage means so that each pallet-mounted workpiece is selectively accessible;

selecting each of said pallet-mounted workpieces from said storage means and transporting each of said selected pallet-mounted workpieces by said transport means to at least a selected one of said machine tools, selecting and mounting required tools in each of said selected machine tools and machining said pallet-mounted workpieces at each of said selected machine tools;

monitoring the location of each workpiece during the various stages of its transporting and machining sequence by periodically entering into said control means information relevant to each of said workpieces; and dismounting each machined workpiece from its associated pallet after completion of said transporting and machining sequence;

the operating sequence of storing, transporting and machining steps, including said selecting step, for each pallet-mounted workpiece being under the control of said control means, the pallet-mounted workpieces of different batches being controlled to follow different sequences.

30. The process according to claim 29 wherein said selecting and mounting of said tools required for performing said machining steps is under the control of said control means.

31. The process according to claim 29 wherein said pallet-mounted workpieces are transported by said transport means along a path from which there is access to said storage means and to each of said machine tools.

32. The process according to claim 31 further comprising, after a machining operation on a pallet-mounted workpiece by a selected machine tool has been completed, transporting said pallet-mounted workpiece by said transport means from said machine tool to said storage means; storing said pallet-mounted workpiece in said storage means so that it is selectively accessible; and then selecting and transporting said pallet-mounted workpiece by said transport means from said storage means to a different selected machine tool and performing a further machining operation on said pallet-mounted workpiece in said different selected machine tool, said steps of transporting, storing and selecting said pallet-mounted workpiece being under the control of said control means.

33. The process according to claim 32 wherein said storage means is adapted for storing said tools and said transport means is adapted for transporting tools between said storage means and selected of said machine tools along said path; said process further comprising locating a plurality of said tools, for use by more than one of said machine tools, in said storage means, and selecting and transporting tools from said storage means to selected machine tools in accordance with tool requirements for machining operations by said selected machine tools, said selecting and transporting of tools being performed by said transport means and being under the control of said control means.

34. The process according to claim 33 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said storing, selecting and transporting of said tools being under the control of said control means.

35. The process of producing engineering components from a plurality of batches of different forms of workpieces by means of a machining system comprising a plurality of complementary machine tools capable of performing different machining operations and adapted to use a series of selected tools, workpiece storage means adapted for storing a plurality of workpieces so that each workpiece is selectively accessible, transport means to transport workpieces between a succession of said machine tools and said workpiece storage means, tool storage means, and programmable control means, each batch comprising a plurality of workpieces requiring substantially the same machining operations and the workpieces of different batches requiring different machining operations, said process comprising:

mounting each workpiece on a pallet adapted for locating said workpiece at each of said machine tools required for machining said workpiece;

locating each pallet-mounted workpiece in said workpiece storage means so that each workpiece is selectively accessible;

supplying tools to said tool storage means;

selecting each of said pallet-mounted workpieces from said workpiece storage means and transporting each of said selected pallet-mounted workpieces by said transport means between said workpiece storage means and selected of said machine tools;

withdrawing tools from said tool storage means and mounting said tools in selected of said machine tools;

machining said selected pallet-mounted workpieces at each of said selected machine tools;

monitoring the location of each workpiece during the various stages of its storage, transporting and machining sequence by periodically entering into said control means information relevant to each of said workpieces; and dismounting each machined workpiece from its associated pallet after completion of said storage, transporting and machining sequence;

the operating sequence of storage, transporting and machining steps, including said selecting step, for each pallet-mounted workpiece being under the control of said control means, the workpieces of different batches being programmed to follow different operating sequences.

36. The process according to claim 35 wherein said withdrawing and mounting of tools in selected of said machine tools is under the control of said control means.

37. The process according to claim 36 wherein said pallet-mounted workpieces and said tools are transported by said transport means along a path from which there is access to said workpiece storage means, tool storage means and each of said machine tools; and said withdrawing of said tools from said tool storage means and said mounting of said tools in said selected machine tools is performed by said transport means; said withdrawing and mounting of tools being under the control of said control means.

38. The process according to claim 37 further comprising, after completion of a machining operation on a pallet-mounted workpiece by one of said machine tools, transporting the incompletely machined pallet-mounted workpiece by said transport means from said machine tool to said workpiece storage means; storing said incompletely machined pallet-mounted workpiece so that it is selectively accessible; and then selecting said incompletely machined pallet-mounted workpiece; transporting said incompletely machined pallet-mounted workpiece by said transport means to a different selected machine tool and performing a further machining operation on said incompletely machined pallet-mounted workpiece at said different selected machine tool; said transporting, storing and selecting of said pallet-mounted workpiece being under the control of said control means.

39. The process according to claim 38 further comprising, after machining operations by selected machine tools, transporting tools by said transport means from said selected machine tools to said tool storage means; storing said tools in said tool storage means; and then selecting and transporting said tools by said transport means from said tool storage means to selected machine tools; and mounting said tools in said selected machine tools; said storing, selecting and transporting of said tools being under the control of said control means.

40. The process of producing engineering components from a plurality of batches of different forms of workpieces to form machined products by means of a machining system comprising a plurality of machine tools capable of performing different machining operations, storage means adapted for storing a plurality of workpieces so that each workpiece is selectively accessible, transport means to transport selected of said workpieces in said storage means between said storage means and said machine tools, and programmable control means, each batch comprising a plurality of workpieces requiring substantially the same machining operations and the workpieces of different batches requiring different machining operations; said process comprising:
  delivering each workpiece into said storage means for storage so that it is selectively accessible;
  selecting and transporting each workpiece in turn by said transport means from said storage means to one of said machine tools for the performance of a first machining operation thereon;
  transporting said selected workpiece by said transport means back to said storage means after the completion of said first machining operation for storage so that said selected workpiece is selectively accessible;
  transporting said selected workpiece by said transport means to a further one of said machine tools for the performance of a second machining operation thereon; and
  transporting said selected workpiece by said transport means back to said storage means after the completion of said second machining operation;
  the operating sequence of storage, transporting and machining steps unique for each workpiece, including said selecting step, being under the control of said control means, the workpieces of different batches being subjected to a different predetermined sequence of storage, transporting, and machining steps whereby the time required for machining all of said workpieces is minimized.

41. The process according to claim 40 wherein said workpieces are transported by said transport means along a path from which there is access to said storage means and to each of said machine tools.

42. The process according to claim 40 wherein said storage means is adapted for storing tools for use by more than one of said plurality of machine tools and said transport means is adapted to transport selected of said tools between said storage means and said machine tools, said process further comprising:
  delivering tools to said storage means;
  entering into said programmable control means the identity of each tools; and
  selecting and transporting tools by said transport means from said storage means to selected machine tools, said selecting and transporting of tools being under the control of said control means.

43. The process according to claim 42 wherein said workpieces and tools are transported by said transport means along a path from which there is access to said storage means and to each of said machine tools.

44. The process according to claim 43 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations, said transporting of workpieces and tools by said transport means being along a path from which there is access to said storage means and to each of said machine tools and said storing, selecting and transporting of tools being under the control of said control means.

45. The process of producing engineering components from a plurality of baches of different forms of workpieces by means of a machining system comprising a plurality of machine tools capable of performing different machining operations, storage means adapted for storing a plurality of workpieces so that each workpiece is selectively accessible, and programmable control means adapted to control each machine tool, each batch comprising a plurality of workpieces requiring substantially the same machining operations and the workpieces of different batches requiring different machining operations; said process comprising:
  delivering each workpiece to said storage means and storing each workpiece so that it is selectively accessible, the total number of workpieces delivered to said storage means being greater than the number of said machine tools;
  selecting and transporting each workpiece in turn from said storage means to one of said machine tools for the performance of a first machining operation thereon;
  transporting said selected workpiece back to said storage means after the completion of said first machining operation;
  transporting said selected workpiece to a further one of said machine tools for the performance of a second machining operation thereon; and
  transporting said selected workpiece back to said storage means after the completion of said second machining operation;
  the operating sequence of storage, transporting and machining steps, including said selecting step, applicable to each said workpiece being under the control of said control means, the workpieces of different batches being subjected to a different predetermined sequence of storage, transporting and machining steps whereby the time required for machining all of said workpieces is minimized.

46. The process according to claim 45 in which each selected workpiece is transported for machining by a selection of said machine tools, at least some of said selected workpieces being transported to less than the total number of said machine tools.

47. The process according to claim 45 wherein said machining system further comprises transport means, said workpieces being transported by transport means along a path from which there is access to said storage means and to each of said machine tools.

48. The process according to claim 47 wherein said storage means is adapted for storing tools for use by more than one of said plurality of machine tools and said transport means is adapted for transporting said tools between said storage means and said machine tools along said path; said process further comprising delivering tools to said storage means and selecting and transporting tools by said transport means from said storage means, in accordance with at least some tool requirements for each machining operation by each of said machine tools, to said machine tools for use in said machining operations; said selecting and transporting of tools being under the control of said control means.

49. The process according to claim 48 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of tools being under the control of said control means.

50. The process of producing engineering components from a plurality of batches of different forms of workpieces by means of a plurality of machine tools capable of performing different operations upon the workpieces, storage means adapted for storing a plurality of workpieces greater in number than the number of said machine tools and so that each workpiece is selectively accessible, and programmable control means adapted to control each of said machine tools, each batch comprising a plurality of workpieces requiring substantially the same operations to be performed upon them by said machine tools, and the workpieces of different batches requiring different machine tool operations; said process comprising:
delivering each workpiece into said storage means and storing each workpiece so that it is selectively accessible;
selecting and transporting each workpiece from said storage means to one of said machine tools for the performance of a first machine tool operation thereon;
transporting said selected workpiece back to said storage means after the completion of said first machine tool operation;
transporting said selected workpiece to a further one of said machine tools for the performance of a second machine tool operation thereon; and
transporting said selected workpiece back to said storage means after the completion of said second machine tool operation;
the operating sequence of storage, transporting and machine tool operations, including said selecting step, applicable to each said workpiece being under the control of said control means, the workpieces of different batches being subjected to a different predetermined sequence of storage, transporting and machine tool operations whereby the time required for completing all of said machine tool operations on all of said workpieces is minimized.

51. The process according to claim 50 wherein said workpieces are transported by transport means along a path from which there is access to said storage means and to each of said machine tools.

52. The process according to claim 50 wherein said storage means is adapted for storing tools for use by more than one of said plurality of machine tools, said process further comprising:
delivering tools to said storage means;
entering into said programmable control means the identity of said tools; and
selecting and transporting tools from said storage means to selected machine tools, said selecting and transporting of tools being under the control of said control means.

53. The process according to claim 52 wherein said workpieces and tools are transported by transport means along a path from which there is access to said storage means and to each of said machine tools.

54. The process according to claim 53 further comprising, after machine tool operations by selected machine tools, transporting tools by said transport means from said selected machine tools to said storage means; storing said tools in said storage means; and then selecting and transporting said tools by said transport means from said storage means to selected machine tools for use by said selected machine tools in further machine tool operations; said transporting, storing and selecting of said tools being under the control of said control means.

55. The process of producing engineering components from a plurality of batches of different forms of workpieces by means of a machining system comprising a plurality of machine tools capable of performing different machining operations, storage means adapted for storing a plurality of workpieces so that each workpiece is selectively accessible, and programmable control means, each batch comprising a plurality of workpieces requiring substantially the same machining operations and the workpieces of different batches requiring different machining operations; said process comprising:
mounting each workpiece on a pallet adapted for locating said workpiece at each of said machine tools required for machining said workpiece;
delivering each pallet-mounted workpiece into said storage means for storage so that it is selectively accessible;
selecting and transporting each pallet-mounted workpiece from said storage means to one of said machine tools for the performance of a first machining operation thereon;
transporting said selected pallet-mounted workpiece back to said storage means after the completion of said first machining operation;
transporting said selected pallet-mounted workpiece to another of said machine tools for the performance of a second machining operation thereon; and
transporting said selected pallet-mounted workpiece back to said storage means after the completion of said second machining operation;
the operating sequence of storage, transporting and machining steps, including said selecting step, applicable to each said workpiece being under the control of said control means; the workpieces of different batches being subjected to a different predetermined sequence of storage, transporting and machining steps whereby the time required for machining all of said workpieces is minimized.

56. The process according to claim 55 wherein said workpieces are transported by transport means along a path from which there is access to said storage means and to each of said machine tools.

57. The process according to claim 55 wherein said storage means is adapted for storing tools for use by more than one of said plurality of machine tools, said process further comprising:
  delivering tools to said storage means;
  entering into said programmable control means the identity of said tools; and
  selecting and transporting tools from said storage means to selected machine tools, said selecting and transporting of tools being under the control said control means.

58. The process according to claim 57 wherein said workpieces and tools are transported by transport means along a path from which there is access to said storage means and to each of said machine tools.

59. The process according to claim 58 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

60. The process of producing engineering components from a plurality of workpieces of different forms by means of a machining system comprising a plurality of machine tools capable of performing different machining operations, storage means adapted for storing a plurality of workpieces so that each workpiece is selectively accessible, transport means for transporting said workpieces, and programmable control means; and process comprising:
  selecting each workpiece from said storage means and transporting said selected workpiece along a predetermined route including at least one stop at a preselected machine tool for at least one machining operation on said selected workpiece and at least one stop at said storage means, different selected workpieces following different predetermined routes and having different combinations of storage, transporting and machining sequences; and
  the operating sequence of storage and transporting steps for each workpiece and the machining operation by said at least one machine tool being under the control of said control means, the operating sequence of at least one workpiece being different from the operating sequences of other workpieces.

61. The process according to claim 60 wherein said workpieces, following different predetermined routes, are transported by said transport means along a path from which there is access to said storage means and to each of said machine tools.

62. The process according to claim 60 wherein said storage means is adapted for storing tools for use by more than one of said plurality of machine tools and said transport means is adapted to transport selected of said tools between said storage means and said machine tools, said process further comprising:
  delivering tools to said storage means;
  entering into said programmable control means the identity of said tools; and
  selecting and transporting tools by said transport means from said storage means to selected machine tools, said selecting and transporting of tools being under the control of said control means.

63. The process according to claim 62 wherein said workpieces and tools are transported by said transport means along a path from which there is access to said storage means and to each of said machine tools.

64. The process according to claim 63 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

65. The process of producing engineering components from a plurality of workpieces of different forms by means of a machining system comprising a plurality of machine tools capable of performing different machining operations, storage means for storing a plurality of workpieces so that each workpiece is selectively accessible, transport means, and programmable control means; said process comprising:
  mounting each workpiece on a pallet adapted for locating said workpiece at each of said machine tools required for machining said workpiece;
  locating each pallet-mounted workpiece in said storage means so that it is selectively accessible;
  operating said machining system including the selection of each pallet-mounted workpiece from said storage means and the transporting of each selected pallet-mounted workpiece by said transport means between said storage means and at least one machine tool; and
  monitoring the location of each pallet-mounted workpiece at the various stages of its operating sequence by periodically entering into said control means information relevant to each workpiece;
  the operating sequence of storage, transporting and machining steps, including said selection step, of each said pallet-mounted workpiece being under the control of said control means, the operating sequences of different pallet-mounted workpieces being different.

66. The process according to claim 65 wherein said pallet-mounted workpieces are transported by said transport means along a path from which there is access to said storage means and to each of said machine tools.

67. The process according to claim 66 wherein said pallet-mounted workpieces are transported by said transport means in both directions along said path.

68. The process according to claim 66 comprising transporting each selected pallet-mounted workpiece by said transport means from said storage means to a selected machine tool, machining said pallet-mounted workpiece at said selected machine tool to form an incompletely machined pallet-mounted workpiece, transporting said incompletely machined pallet-mounted workpiece by said transport means from said selected machine tool to said storage means, storing said incompletely machined pallet-mounted workpiece in said storage means so that it is selectively accessible, selecting and transporting said incompletely machined pallet-mounted workpiece by said transport means from said storage means to a selected further machine tool, and further machining said incompletely machined pallet-mounted workpiece at said selected further machine tool, said transporting, storing and selecting of said pallet-mounted workpiece being under the control of said control means.

69. The process according to claim 65 wherein said storage means is adapted for storing tools for use by more than one of said plurality of machine tools and said transport means is adapted to transport selected of said tools between said storage means and said machine tools, said process further comprising:
  delivering tools to said storage means;
  entering into said programmable control means the identity of said tools; and
  selecting and transporting tools by said transport means from said storage means to selected machine tools, said selecting and transporting of tools being under the control of said control means.

70. The process according to claim 69 wherein said pallet-mounted workpieces and tools are transported by said transport means along a path from which there is access to said storage means and to each of said machine tools.

71. The process according to claim 70 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

72. The process according to claim 71 comprising transporting each selected pallet-mounted workpiece by said transport means from said storage means to a selected machine tool, machining said pallet-mounted workpiece at said selected machine tool to form an incompletely machined pallet-mounted workpiece, transporting said incompletely machined pallet-mounted workpiece by said transport means from said selected machine tool to said storage means, storing said incompletely machined pallet-mounted workpiece in said storage means so that it is selectively accessible, selecting and transporting said incompletely machined pallet-mounted workpiece by said transport means from said storage means to a selected further machine tool, and further machining said incompletely machined pallet-mounted workpiece at said selected further machine tool, said transporting, storing and selecting of said pallet-mounted workpiece being under the control of said control means.

73. The process of producing engineering components from a plurality of batches of different forms of workpieces by means of a machining system comprising a plurality of machine tools capable of performing different machining operations, storage means having a plurality of selectively accessible locations for workpieces, transport means, and programmable control means, each batch comprising a plurality of workpieces requiring substantially the same machining operations and the workpieces of different batches requiring different machining operations; said process comprising:
  selecting each workpiece from a predetermined location in said storage means and transporting said selected workpiece by said transport means along a predetermined route including stops at preselected of said machine tools and at least one predetermined location in said storage means;
  the operation sequence of storage, transporting and machining steps, including said selecting step, of each said workpiece being under the control of said control means, the operating sequences of the workpieces of each batch being the same and the operating sequences of the workpieces of different batches having different combinations of storage, transporting and machining steps.

74. The process according to claim 73 wherein each workpiece is transported by said transport means to said storage means after completion of machining by each of said preselected machine tools and stored at said storage means until it is transported by said transport means to the next preselected machine tool for further machining.

75. The process according to claim 74 wherein said workpieces are transported by said transport means along a path from which there is access to said storage means and to each of said machine tools.

76. The process according to claim 73 wherein said storage means is adapted for storing tools for use by more than one of said plurality of machine tools and said transport means is adapted to transport selected of said tools between said storage means and said machine tools, said process further comprising:
  delivering tools to said storage means;
  entering into said programmable control means the identity of said tools; and
  selecting and transporting tools by said transport means from said storage means to selected machine tools, said selecting and transporting of tools being under the control of said control means.

77. The process according to claim 76 wherein said workpieces and tools are transported by said transport means along a path from which there is access to said storage means and to each of said machine tools.

78. The process according to claim 77 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

79. The process of producing engineering components from a plurality of batches of different forms of workpieces by means of a machining system comprising a plurality of machine tools capable of performing different machining operations, a common tool store from which tools are drawn to be mounted in said machine tools and to which tools are returned from said machine tools, workpiece and tool transport means, and programmable control means, each batch comprising a plurality of workpieces requiring substantially the same machining operations and the workpieces of different batches requiring different machining operations; said process comprising:
  mounting each workpiece on a pallet adapted for locating said workpiece at each of said machine tools required for machining said workpiece;
  locating each pallet-mounted workpiece in said machining system for the commencement of its operating sequence;

locating tools in said common tool store;

transporting each palled-mounted workpiece by said transport means to at least one predetermined machine tool;

transporting selected tools by said transport means between said common tool store and selected of said machine tools;

monitoring the location of each workpiece at the various stages of its operating sequence by periodically entering into said control means information relevant to each workpiece;

monitoring the location of said tools by periodically entering into said control means information relevant to said tools; and replacing defective tools in said common tool store; the schedule of operating sequences of transporting and machining of all of said workpieces and the withdrawing and transporting of selected tools being under the control of said control means to optimize substantially the overall use of machine tool time.

80. The process according to claim 79 wherein said machining system further comprises workpiece storage means for storing said pallet-mounted workpieces; said process further comprising:

locating each pallet-mounted workpiece at said workpiece storage means so that it is selectively accessible; and selecting each pallet-mounted workpiece from said workpiece storage means and transporting said selected pallet-mounted workpiece by said transport means between said workpiece storage means and at least one machine tool, said selecting and transporting of said pallet-mounted workpieces being under the control of said control means.

81. The process according to claim 80 wherein said pallet-mounted workpieces and tools are transported by said transport means along a path from which there is access to said workpiece storage means, to said common tool store and to each of said machine tools.

82. The process according to claim 81 wherein a pallet-mounted workpiece is selected and transported by said transport means from said workpiece storage means to a selected machine tool for the performance of a machining operation thereon; after completion of said machining operation, said pallet-mounted workpiece is transported by said transport means from said machine tool back to said workpiece storage means and stored therein so that it is selectively accessible; and then said pallet-mounted workpiece is selected and transported by said transport means from said workpiece storage means to a further selected machine tool for the performance of a further machining operation thereon; said selecting, transporting and storing of said pallet-mounted workpiece being under the control of said control means.

83. The process according to claim 82 wherein said tools are selected and transported by said transport means from said common tool store to selected machine tools for use in machining operations; after use of said tools by said machine tools in machining operations, said tools are transported by said transport means from said machine tools to said common tool store and stored therein; and then said tools are selected and transported by said transport means from said common tool store to selected machine tools for further machining operations; said selecting, transporting and storing of said tools being under the control of said control means.

84. The process according to claim 79 wherein said tools are transported by said transport means along a path from which there is access to said common tool store and to each of said machine tools.

85. The process according to claim 84 wherein said tools are selected and transported by said transport means from said common tool store to selected machine tools for use in machining operations; after use of said tools by said machine tools in machining operations, said tools are transported by said transport means from said machine tools to said common tool store and stored therein; and then said tools are selected and transported by said transport means from said common tool store to selected machine tools for further machining operations; said selecting, transporting and storing of said tools being under the control of said control means.

86. The process of producing engineering components from a plurality of batches of different forms of workpieces by means of a machining system comprising a plurality of machine tools capable of performing different machining operations, a common tool store from which tools are drawn to be mounted in said machine tools and to which tools are returned from said machine tools, transport means for transporting said workpieces and for transporting said tools between said common tool store and said machine tools, and programmable control means, each batch comprising a plurality of workpieces requiring substantially the same machining operations and the workpieces of different batches requiring different machining operations; said process comprising:

mounting each workpiece on a pallet adapted for locating said workpiece at each of said machine tools required for machining said workpiece;

locating each pallet-mounted workpiece in said machining system for the commencement of its operating sequence;

locating tools in said common tool store;

transporting each pallet-mounted workpiece by said transport means to at least one predetermined machine tool;

selecting and transporting tools by said transport means between said common tool store and selected of said machine tools; and monitoring the location of each workpiece at the various stages of its operating sequence by periodically entering into said control means information relevant to each workpiece;

the machining operations performed on said workpieces by said plurality of machine tools and the transporting of said workpieces being under the control of said control means.

87. The process according to claim 86 wherein the selection of tools for each particular machining operation and the transporting of said selected tools by said transport means is under the control of said control means.

88. The process according to claim 87 wherein said tools are transported by said transport means along a path from which there is access to said common tool store and to each of said machine tools.

89. The process according to claim 88 wherein said tools are selected and transported by said transport means from said common tool store to selected machine tools for use in machining operations; after use of said tools by said machine tools in machining operations, said tools are transported by said transport means from said machine tools to said common tool store and stored therein; and then said tools are selected and transported by said transport means from said common tool store to selected machine tools for further machining operations; said selecting, transporting and storing of said tools being under the control of said control means.

90. The process according to claim 86 wherein said machining system further comprises workpiece storage means for storing said pallet-mounted workpieces; said process further comprising:

locating each pallet-mounted workpiece at said storage means; and selecting and transporting each pallet-mounted workpiece by said transport means between said storage means and at least one machine tool, said selecting and transporting of said pallet-mounted workpiece being under the control of said control means.

91. The process according to claim 90 wherein said pallet-mounted workpieces and tools are transported by said transport means along a path from which there is access to said workpiece storage means, to said common tool store and to each of said machine tools.

92. The process according to claim 91 wherein a pallet-mounted workpiece is selected and transported by said transport means from said workpiece storage means to a selected machine tool for the performance of a machining operation thereon; after completion of said machining operation, said pallet-mounted workpiece is transported by said transport means from said machine tool back to said workpiece storage means and stored therein so that it is selectively accessible; and then said pallet-mounted workpiece is selected and transported by said transport means from said workpiece storage means to a further selected machine tool for the performance of a further machining operation thereon; said selecting, transporting and storing of said pallet-mounted workpiece being under the control of said control means.

93. The process according to claim 92 wherein said tools are selected and transported by said transport means from said common tool store to selected machine tools for use in machining operations; after use of said tools by said machine tools in machining operations, said tools are transported by said transport means from said machine tools to said common tool store and stored therein; and then said tools are selected and transported by said transport means from said common tool store to selected machine tools for further machining operations; said selecting, transporting and storing of said tools being under the control of said control means.

94. A method of machining a plurality of batches of different forms of workpieces requiring different machining operations from a plurality of machine tools capable of performing different machining operations, each batch comprising a plurality of workpieces of similar form, comprising mounting each workpiece on a pallet adapted for locating said workpiece in each of said machine tools required for machining said workpiece, locating each pallet-mounted workpiece so that it is selectively accessible at a location in storage means for the commencement of its operating sequence, entering into control means details of each workpiece whereby the location of each workpiece at various stages of its operating sequence is monitored by said control means, machining each pallet-mounted workpiece including transporting each pallet-mounted workpiece, selected from one of said locations at said storage means, between said storage means and at least one machine tool, and dismounting each workpiece from its associated pallet after completion of said operating sequence, the operating sequence of machining and transporting steps for each workpiece being under the control of said control means, the operating sequences for different workpieces being different.

95. The method according to claim 94 further comprising selecting and mounting tools in predetermined machine tools, said selecting and mounting of tools being under the control of said control means, said different operating sequences for different workpieces using different tools.

96. The method according to claim 94 further comprising locating tools for use by more than one of said machine tools in said storage means and selecting and transporting tools between said storage means and said machine tools, said selecting and transporting of said tools being under the control of said control means.

97. The method according to claim 96 wherein said pallet-mounted workpieces and tools are transported by transport means along a path from which there is access to said storage means and to each of said machine tools.

98. The method according to claim 97 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of tools being under the control of said control means.

99. The method according to claim 98 further comprising, after completion of a machining operation by a machine tool, transporting an incompletely machined pallet-mounted workpiece by said transport means from said machine tool to said storage means; storing said incompletely machined pallet-mounted workpiece in said storage means so that it is selectively accessible; and then selecting said transporting said incompletely machined pallet-mounted workpiece by said transport means from said storage means to a different selected machine tool; and performing a further machining operation on said incompletely machined pallet-mounted workpiece at said different selected machine tool; said transporting, storing and selecting of said pallet-mounted workpiece being under the control of said control means.

100. The method according to claim 94 wherein said pallet-mounted workpieces are transported by transport means along a path from which there is access to said storage means and to each of said machine tools.

101. The method according to claim 100 wherein said pallet-mounted workpieces are transported by said transport means in both directions along said path.

102. The method according to claim 100 comprising selecting and transporting each of said pallet-mounted workpieces by said transport means from said workpiece storage means to a selected machine tool and machining said selected pallet-mounted workpieces at the respective of said selected machine tools.

103. The method according to claim 102 further comprising, after completion of a machining operation by a machine tool, transporting an incompletely machined pallet-mounted workpiece by said transport means from said machine tool to said storage means; storing said incompletely machined pallet-mounted workpiece in said storage means so that it is selectively accessible; and then selecting and transporting said incompletely machined pallet-mounted workpiece by said transport means from said storage means to a different selected machine tool and performing a further machining operation on said incompletely machined pallet-mounted workpiece at said different selected machine tool; said transporting, storing and selecting of said pallet-mounted workpiece being under the control of said control means.

104. A method of machining a plurality of batches of different forms of workpieces requiring different machining operations from a plurality of machine tools capable of performing different machining operations, each batch comprising a plurality of workpieces of similar form, comprising mounting each workpiece on a pallet adapted for locating said workpiece in each of said machine tools required for machining said workpiece, locating each pallet-mounted workpiece for the commencement of its operating sequence, supplying a plurality of tools of different forms to storage means, entering into control means details of said workpieces in each batch, including at least one selected machining operation to be performed on each workpiece, whereby the location of said workpiece at various stages of its operating sequence is monitored by said control means, delivering selected pallet-mounted workpieces to selected machine tools; automatically selecting and withdrawing tools of different forms from said storage means as required for said at least one selected machining operation to be performed on each of said selected workpieces of said batches, and delivering said selected tools to more than one selected machine tool for the performance of said selected machining operations thereby, the operating sequence of storage, transporting and machining steps for each workpiece, including said delivery of said selected pallet-mounted workpieces to said selected machine tools, and the selecting, withdrawing and delivering of tools to said selected machine tools for said selected machining operations to be performed on each of said selected pallet-mounted workpieces while located at said selected machine tools being under the control of said control means, the operating sequences for different workpieces being different.

105. The method according to claim 104 wherein the withdrawal and delivery of selected tools for performing said machining operations is under the control of said control means, the different operating sequences for different workpieces using different tools.

106. The method according to claim 104 further comprising locating said pallet-mounted workpieces in said storage means so that each workpiece is selectively accessible, selecting each of said pallet-mounted workpieces from said storage means, and transporting said selected pallet-mounted workpiece to at least one of said machine tools in accordance with its operating sequence, said selecting and transporting of said pallet-mounted workpieces being under the control of said control means.

107. The method according to claim 106 wherein said pallet-mounted workpieces and tools are transported by transport means along a path from which there is access to said storage means and to each of said machine tools.

108. The method according to claim 107 further comprising, after completion of a machining operation by a machine tool, transporting an incompletely machined pallet-mounted workpiece by said transport means from said machine tool to said storage means; storing said incompletely machined pallet-mounted workpiece in said storage means so that it is selectively accessible; and then selecting and transporting said incompletely machined pallet-mounted workpiece by said transport means from said storage means to a different selected machine tool; and performing a further machining operation on said incompletely machined pallet-mounted workpiece at said different selected machine tool; said transporting, storing and selecting of said pallet-mounted workpiece being under the control of said control means.

109. The method according to claim 108 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

110. The method according to claim 104 wherein said pallet-mounted workpieces and tools are transported by transport means along a path from which there is access to said storage means and to each of said machine tools.

111. A method of producing engineering components from a plurality of batches of different forms of workpieces requiring the performance thereon of different operations by a plurality of machine tools, each batch consisting of workpieces of similar form, comprising delivering each workpiece into storage means capable of holding a plurality of workpieces so that each workpiece is selectively accessible, entering into programmable control means the identity of each workpiece, selecting and transporting each workpiece in turn from said storage means to a first machine tool for the performance of a first operation thereon, transporting said selected workpiece back to said storage means after the completion of said first operation, and subsequently to a second machine tool for the performance of a second operation thereby and then back to said storage means, each said transporting step being under the control of said programmable control means in accordance with a predetermined sequence of storage, transporting and machine tool operations unique for said selected workpiece, workpieces of different forms being subjected to different sequences of said operations whereby the minimum practical time for completion of the engineering components from said workpieces is achieved.

112. The method according to claim 111 wherein said workpieces are transported by transport means along a path from which there is access to said storage means and to each of said machine tools.

113. The method according to claim 111 further comprising locating tools, for use by said plurality of machine tools, in said storage means, and selecting and transporting tools from said storage means to selected machine tools, said selecting and transporting of tools being under the control of said control means.

114. The method according to claim 113 wherein said workpieces and tools are transported by transport means along a path from which there is access to said storage means and to each of said machine tools.

115. The method according to claim 114 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

116. A method of machining a plurality of batches of different forms of workpieces requiring different machining operations from a plurality of machine tools capable of performing different machining operations, each batch consisting of workpieces of similar form, comprising delivering each workpiece to storage means and storing said workpieces in said storage means so that each workpiece is selectively accessible, the total number of workpieces located at any one time at said machine tools and in said storage means being larger than the number of machine tools; entering into programmable control means means for determining the identity of each workpiece; selecting and transporting each workpiece in turn from said storage means to a first machine tool for the performance of a first machining operation thereof; transporting said selected workpiece back to said storage means after the completion of said first machining operation, storing said workpiece in said storage means so that it is selectively accessible, and subsequently selecting and transporting said workpiece from said storage means to a second machine tool for machining thereby and then back to said storage means; each said transporting step being under the control of said control means in accordance with a predetermined operating sequence of storing, transporting and machining steps unique to said selected workpiece, workpieces of a different form being subjected to a different predetermined operating sequence whereby the minimum practical time for machining all of said workpieces is achieved.

117. A method according to claim 116 in which each workpiece is transported for machining by a selection of machine tools comprising, in the case of at least some of the workpieces, less than the total number of machine tools.

118. The method according to claim 116 wherein said workpieces are transported by transport means along a path from which there is access to said storage means and to each of said machine tools.

119. The method according to claim 116 further comprising locating tools, for use by said plurality of machine tools, in said storage means, and selecting and transporting tools from said storage means to selected machine tools, said selecting and transporting of tools being under the control of said control means.

120. The method according to claim 119 wherein said workpieces and tools are transported by transport means along a path from which there is access to said storage means and to each of said machine tools.

121. The method according to claim 120 further comprising, after machining operations by selected machine tools, transporting tools by said transport means from said selected machine tools by said storage means; storing said tools in said storage means; and then selecting and transporting said tools by said transport means from said storage means to selected machine tools by use by said selected machine tools in further machining operations; said transporting, storing and selecting of said tools being under the control of said control means.

122. A method of machining a plurality of batches of different forms of workpieces requiring different machining operations from a plurality of machine tools capable of performing different machining operations, each batch consisting of workpieces of similar form, comprising delivering each workpiece to storage means adapted for storing said workpiece in said storage means so that each workpiece is selectively accessible, the number of workpieces being greater than the number of machine tools, selecting and transporting each workpiece in turn from said storage means to a first machine tool for the performance of a first machining operation thereon, transporting said selected workpiece back to said storage means after the completion of said first machining operation, storing said workpiece in said storage means so that it is selectively accessible, and subsequently selecting and transporting said workpiece from said storage means to a second machine tool for machining thereby and then back to said storage means, each of said transporting and machining operations being under the control of a programmable control means in accordance with a predetermined sequence of storage, transporting and machining operations unique to said selected workpiece, workpieces of different forms being subjected to a different sequence of storage, transporting and machining operations whereby the minimum practical time for machining all of said workpieces is achieved.

123. The method according to claim 122 wherein said workpieces are transported by transport means along a path from which there is access to said storage means and to each of said machine tools.

124. The method according to claim 122 further comprising locating tools, for use by said plurality of machine tools, in said storage means, and selecting and transporting tools from said storage means to selected machine tools, said selecting and transporting of tools being under the control of said control means.

125. The method according to claim 124 wherein said workpieces and tools are transported by transport means along a path from which there is access to said storage means and to each of said machine tools.

126. The method according to claim 125 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

127. A method of machining a plurality of batches of different forms of workpieces requiring different machining operations from a plurality of machine tools capable of performing different machining operations, each batch consisting of workpieces of similar form, comprising mounting each workpiece on a pallet adapted for locating said workpiece in each of said machine tools by which it is to be machined, delivering each pallet-mounted workpiece into storage means adapted for storing a plurality of the pallet-mounted workpieces so that each workpiece is selectively accessible, entering into programmable control means the identity of each workpiece and the location thereof in said storage means, selecting a pallet-mounted workpiece from said storage means and transporting said selected pallet-mounted workpiece to a first machine tool for the performance of a first machining operation thereon, transporting said selected pallet-mounted workpiece back to said storage means for storage so that each workpiece is selectively accessible after the completion of said first machining operation, and subsequently selecting and transporting said pallet-mounted workpiece from said storage means to a second machine tool for machining thereby and then back to the storage means, each of said transporting and machining operations being under the control of said control means in accordance with a predetermined sequence of storage, transporting and machining operations unique to said selected workpiece, workpieces of different forms being subjected to a different preprogrammed sequence of storage, transporting and machining operations whereby the minimum practical time for machining all of said workpieces is achieved.

128. The method according to claim 127 wherein said pallet-mounted workpieces are transported by transport means along a path from which there is access to said storage means and to each of said machine tools.

129. The method according to claim 127 further comprising locating tools, for use by said plurality of machine tools, in said storage means, and selecting and transporting tools from said storage means to selected machine tools, said selecting and transporting of tools being under the control of said control means.

130. The method according to claim 129 wherein said pallet-mounted workpieces and tools are transported by transport means along a path from which there is access to said storage means and to each of said machine tools.

131. The method according to claim 130 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

132. A method of machining a plurality of different workpieces requiring different forms of machining operations from a plurality of machine tools capable of performing different machining operations, comprising conveying each workpiece under the control of a programmable control means along a predetermined route including, for at least some of the workpieces, preselected machining stops at a plurality of machine tools and at least one stop at a selected location in storage means adapted for storing a plurality of workpieces so that each workpiece is selectively accessible, different selected workpieces being caused to follow different predetermined routes and to have different combinations of machining and storage sequences under the control of said control means.

133. The method according to claim 132 wherein said workpieces are conveyed by transport means along a path from which there is access to said storage means and to each of said machine tools, said different predetermined routes of said different selected workpieces being along said path.

134. The method according to claim 133 wherein said workpieces are transported by said transport means in both directions along said path.

135. The method according to claim 133 comprising selecting and transporting a workpiece by said transport means from said storage means to a selected machine tool, machining said workpiece at said selected machine tool to form an incompletely machined workpiece, transporting said incompletely machined workpiece by said transport means from said selected machine tool to said storage means, storing said incompletely machined workpiece in said storage means so that it is selectively accessible, and the selecting and transporting said incompletely machined workpiece by said transport means from said storage means to a selected further machine tool, and further machining said incompletely machined workpiece at said selected further machine tool, said transporting, storing and selecting of said workpiece being under the control of said control means.

136. The method according to claim 132 further comprising selecting tools from a plurality of tools in said storage means, for use by said plurality of machine tools, and conveying said selected tools, under the control of said control means, from said storage means to predetermined machine tools, different tools being conveyed to different machine tools.

137. The method according to claim 136 wherein said workpieces and tools are transported by transport means along a path from which there is access to said storage means and to each of said machine tools.

138. The method according to claim 137 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

139. The method according to claim 138 comprising selecting and transporting a workpiece by said transport means from said storage means to a selected machine tool, machining said workpiece at said selected machine tool to form an incompletely machined workpiece, transporting said incompletely machined workpiece by said transport means from said selected machine tool to said storage means, storing said incompletely machined workpiece in said storage means so that it is selectively accessible, and then selecting and transporting said incompletely machined workpiece by said transport means from said storage means to a selected further machine tool, and further machining said incompletely machined workpiece at said selected further machine tool, said transporting, storing and selecting of said workpiece being under the control of said control means.

140. A method of machining a plurality of different workpieces requiring different machining operations from a plurality of machine tools capable of performing different machining operations under the control of a programmable control means, comprising mounting each workpiece on a pallet adapted for locating said workpiece in each of said machine tools required for machining said workpiece; locating each pallet-mounted workpiece, for the commencement of its operating sequence, in storage means so that each workpiece is selectively accessible; selecting and transporting each pallet-mounted workpiece from said storage means to at least one of said machine tools; performing at least one machining operation on said selected pallet-mounted workpiece at said at least one of said machine tools; and entering into said control means details of said selected workpiece whereby the location of said selected workpiece at various stages of its operating sequence is monitored by said control means; the operating sequence of storage, transporting and machining steps being under the control of said control means, different workpieces having different operating sequences.

141. The method according to claim 140 wherein said pallet-mounted workpieces are transported by transport means along a path from which there is access to said storage means and to each of said machine tools.

142. The method according to claim 141 wherein said pallet-mounted workpieces are transported by said transport means in both directions along said path.

143. The method according to claim 141 wherein, after a machining operation on a pallet-mounted workpiece by a machine tool has been completed, transporting said pallet-mounted workpiece by said transport means from said machine tool to said storage means; storing said pallet-mounted workpiece in said storage means so that it is selectively accessible; and the selecting and transporting said pallet-mounted workpiece by said transport means from said storage means to a different selected machine tool; and performing a further machining operation on said pallet-mounted workpiece in said different selected machine tool; said transporting, storing and selecting of said pallet-mounted workpiece being under the control of said control means.

144. The method according to claim 140 further comprising locating tools, for use by said plurality of machine tools, in said storage means, selecting tools from said storage means and transporting said selected tools from said storage means to a selected one of said machine tools, said selecting and transporting of tools being under the control of said control means.

145. The method according to claim 144 wherein said pallet-mounted workpieces and tools are transported by transport means along a path from which there is access to said storage means and to each of said machine tools.

146. The method according to claim 145 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

147. The method according to claim 146 further comprising, after a machining operation on a pallet-mounted workpiece by a machine tool has been completed, transporting said pallet-mounted workpiece by said transport means from said machine tool to said storage means; storing said pallet-mounted workpiece in said storage means so that it is selectively accessible; and then selecting and transporting said pallet-mounted workpiece by said transport means from said storage means to a different selected machine tool; and performing a further machining operation on said pallet-mounted workpiece in said different selected machine tool; said transporting, storing and selecting of said pallet-mounted workpiece being under the control of said control means.

148. A method of machining a plurality of batches of different forms of workpieces requiring different machining operations from a plurality of machine tools capable of performing different machining operations, each batch comprising a plurality of workpieces of similar form, comprising conveying each workpiece along a predetermined route including, for at least some of the workpieces, preselected machining stops at a plurality of machine tools and at least one predetermined period of being located at a selected location in storage means in which each workpiece is selectively accessible, the operating sequence of machining, conveying and storage operations for each workpiece being under the control of programmable control means, workpieces of different forms following different combination of machining, conveying and storage sequences and workpieces of the same form following similar such combinations.

149. The method according to claim 148 wherein said workpieces are transported by transport means along a path from which there is access to said storage means and to each of said machine tools.

150. The method according to claim 149 wherein said workpieces are transported by said transport means in both directions along said path.

151. The method according to claim 148 in which each workpiece is transported to said storage means after completion of machining by each of said machine tools and is stored at said storage means so that it is selectively accessible until it is selected and transported from said storage means to the next machine tool by which it is to be machined.

152. The method according to claim 148 further comprising conveying tools, for use by more than one of said plurality of machine tools, from said storage means to selected machine tools, said conveying of said tools being under the control of said control means.

153. The method according to claim 152 wherein said workpieces and tools are transported by transport means along a path from which there is access to said storage means and to each of said machine tools.

154. The method according to claim 153 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

155. A method of machining a plurality of batches of different workpieces requiring different machining operations from a plurality of machine tools capable of performing different machining operations, each batch comprising workpieces of a similar form, comprising mounting each workpiece on a pallet adapted for locating said workpiece in each of said machine tools required for machining said workpiece; locating each pallet-mounted workpiece for the commencement of its operating sequence; supplying a plurality of tools of different forms to a common tool store; entering into programmable control means details of the workpieces in each batch, including at least one selected machining operation to be performed on each workpiece, whereby location of each workpiece at various stages of its operating sequence is monitored by said control means; entering into said control means the location and type designation of said plurality of tools at said common tool store for supplying said tools to said machine tools; delivering selected pallet-mounted workpieces to selected machine tools; selecting and withdrawing tools of different forms from said common tool store as required for said at least one selected machining operation to be performed on each of said selected workpieces of said batches; and delivering said selected tools to more than one of said selected machine tools for the performance of said selected machining operations thereby;

the operating sequences for all said workpieces, including delivery of said selected pallet-mounted workpieces to said selected machine tools, and the withdrawal of selected tools from said common tool store and delivery of said selected tools to said selected machine tools for said selected machining operations to be performed on each of said selected pallet-mounted workpieces while locate at said selected machine tools being under the control of said control means.

156. The method according to claim 155 wherein said tools are transported by transport means along a path from which there is access to said common tool store and to each of said machine tools.

157. The method according to claim 156 further comprising, after machining operations by selected machine tools, transporting tools by said transport means from said selected machine tools to said common tool store; storing said tools in said common tool store; and then selecting and transporting said tools by said transport means from said common tool store to selected machine tools for use by said selected maching tools in further machining operations; said transporting, storing and selecting of said tools being under the control of said control means.

158. The method according to claim 155 further comprising locating each pallet-mounted workpiece for the commencement of its operating sequence in workpiece storage means in a selectively accessible manner; and selecting each pallet-mounted workpiece from said workpiece storage means, selecting tools from said common tool store, and transporting said selected pallet-mounted workpieces and tools to selected machine tools under the control of said control means.

159. The method according to claim 158 wheren said pallet-mounted workpieces and tools are transported by transport means along a path from which there is access to said workpiece storage means, to said common tool store, and to each of said machine tools.

160. The method according to claim 159 further comprising, after a machining operation on a pallet-mounted workpiece by a machine tool has been completed, transporting said pallet-mounted workpiece by said transport means from said machine tool to said storage means; storing said pallet-mounted workpiece in said storage means so that it is selectively accessible; and then selecting and transporting said pallet-mounted workpiece by said transport means from said storage means to a different selected machine tool; and performing a further machining operation on said pallet-mounted workpiece in said different selected machine tool; said transporting, storing and selecting of said pallet-mounted workpiece being under the control of said control means.

161. The method according to claim 160 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

162. A method of machining a plurality of batches of different workpieces requiring different machining operations by a plurality of complementary machine tools, each batch comprising workpieces of a similar form, comprising mounting each workpiece on a pallet adapted for locating said workpiece in each of said machine tools required for machining said workpiece; locating each pallet-mounted workpiece for the commencement of its operating sequence; supplying a plurality of tools of different forms to a common tool store; entering into control means details of said workpieces in each batch, including at least one selected machining operation to be performed on each workpiece, whereby location of each workpiece at various stages of its operating sequence is automatically monitored by said control means; delivering selected pallet-mounted workpieces to selected machine tools; selecting and withdrawing tools of different forms from said common tool store as required for said at least one selected machining operation to be performed on each of said selected workpieces of said batches; and delivering said selected tools to more than one of said selected machine tools for the performance of said selected machining operations thereby; the machining operations to be performed on said selected pallet-mounted workpieces by a plurality of said selected machine tools, the delivery of said selecting pallet-mounted workpieces to said selected machine tools, the selection and withdrawal of selected tools from said common tool store, and the delivery of said selected tools to said selected of said machine tools by transport means for said selected machining operations to be performed on each of said selected pallet-mounted workpieces while located at said selected machine tools being under the control of said control means.

163. The method according to claim 162 wherein said tools are transported by said transport means along a path from which there is access to said common tool store and to each of said machine tools.

164. The method according to claim 163 further comprising, after machining operations by selected machine tools, transporting tools by said transport means from said selected machine tools to said common tool store; storing said tools in said common tool store; and then selecting and transporting said tools by said transport means from said common tool store to selected machine tools for use by said selected machine tools in further machining operations; said transporting, storing and selecting of said tools being under the control of said control means.

165. The method according to claim 162 further comprising locating each pallet-mounted workpiece for the commencement of its operating sequence in workpiece storage means so that it is selectively accessible; and selecting each pallet-mounted workpiece from said workpiece storage means, selecting tools from said common tool store, and transporting said selected pallet-mounted workpieces and tools by said transport means under the control of said control means.

166. The method according to claim 165 wherein said pallet-mounted workpieces and tools are transported by transport means along a path from which there is access to said workpiece storage means, to said common tool store, and to each of said machine tools.

167. The method according to claim 166 further comprising, after a machining operation on a pallet-mounted workpiece by a machine tool has been completed, transporting said pallet-mounted workpiece by said transport means from said machine tool to said workpiece storage means; storing said pallet-mounted workpiece in said workpiece storage means so that it is selectively accessible; and then selecting and transporting said pallet-mounted workpiece by said transport means from said workpiece storage means to a different selected machine tool; and performing a further machining operation on said pallet-mounted workpiece at said different selected machine tool; said transporting, storing and selecting of said pallet-mounted workpiece being under the control of said control means.

168. The method according to claim 167 further comprising, after machining operations by selected machine tools, transporting tools by transport means from said selected machine tools to said common tool store; storing said tools in said common tool store; and then selecting and transporting said tools by said transport means from said common tool store to selected machine tools for use by said selected machine tools in further machining operations; said transporting, storing and selecting of said tools being under the control of said control means.

169. The process of producing engineering components from a plurality of workpieces of different forms by means of a machining system comprising a plurality of machine tools capable of performing different machining operations, storage means for storing a plurality of workpieces so that each workpiece is selectively accessible, transport means, and programmable control means, said process comprising:
   mounting each workpiece on a pallet adapted for locating said workpiece at each of said machine tools required for machining said workpiece;
   locating each pallet-mounted workpiece in said machining system for the commencement of its machining sequence;
   operating said machining system, including the transporting of each selected pallet-mounted workpiece by said transport means to and from said storage means and the transporting of each selected pallet-mounted workpiece by said transport means between said storage means and at least one machine tool; and
   monitoring the location of each workpiece at the various stages of its operating sequence by periodically entering into said control means information relevant to each workpiece;
   the operating sequence of storage and transporting steps for each workpiece and the machining operation by said at least one machine tool being under the control of said control means, the operating sequence of at least one workpiece being different from the operating sequences of other workpieces.

170. The process according to claim 169 wherein said pallet-mounted workpieces are transported by said transport means along a path from which there is access to said storage means and to each of said machine tools.

171. The process according to claim 170 wherein said pallet-mounted workpieces are transported by said transport means in both directions along said path.

172. The process according to claim 170 comprising storing said pallet-mounted workpieces in said storage means so that each workpiece is selectively accessible, selecting and transporting each of said pallet-mounted workpieces by said transport means from said storage means to at least one of said machine tools in accordance with its operating sequence, and performing at least one machining operation on said pallet-mounted workpiece at said at least one machine tool, said selecting, transporting and machining of said pallet-mounted workpieces being under the control of said control means.

173. The process according to claim 172 further comprising, after a machining operation on a pallet-mounted workpiece by a machine tool has been completed, transporting said pallet-mounted workpiece by said transport means from said machine tool to said storage means; storing said pallet-mounted workpiece in said storage means so that it is selectively accessible; and then selecting and transporting said pallet-mounted workpiece by said transport means from said storage means to a different selected machine tool; and performing a further machining operation on said pallet-mounted workpiece in said different selected machine tool; said transporting, storing, selecting and machining of said pallet-mounted workpiece being under the control of said control means.

174. The process according to claim 173 wherein said storage means is adapted for storing tools for use by more than one of said plurality of machine tools and said transport means is adapted for transporting said tools between said storage means and said machine tools along said path, said process further comprising delivering tools to said storage means; entering into said programmable control means the identity of said tools; and selecting and transporting tools by said transport means from said storage means to selected machine tools; said selecting and transporting of said tools being under the control of said control means.

175. The process according to claim 174 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

176. The process according to claim 169 in which said control means comprises central control means and program storage means associated with each machine tool, said process comprising selecting, from said program storage means, programs for said selected machining operations by said selected machine tools.

177. A method of machining, by means of a plurality of machine tools, a plurality of batches of different forms of workpieces requiring different machining operations, each batch comprising a plurality of workpieces of similar form, comprising:
   storing each workpiece in storage means so that each workpiece is selectively accessible;
   detecting when a machine tool has completed a machining operation on a particular workpiece and is ready to receive another workpiece;
   transporting said particular workpiece from said machine tool;
   transporting a selected further workpiece from said storage means to said machine tool; and
   machining further workpieces by following similar detecting and transporting steps in relation to appropriate workpieces and appropriate machine tools;
   said machining and transporting operations being under the control of control means.

178. The method according to claim 177 wherein said workpieces are transported by transport means along a path from which there is access to said storage means and to each of said machine tools.

179. The method according to claim 178 comprising, after a machining operation on a workpiece by a machine tool has been completed, transporting said workpiece by said transport means from said machine tool to said storage means; storing said workpiece in said storage means so that it is selectively accessible; and then selecting and transporting said workpiece by said transport means from said storage means to a different selected machine tool; and performing a further machining operation on said workpiece in said different selected machine tool; said tranporting, storing and selecting of said workpiece being under the control of said control means.

180. The method according to clam 179 further comprising storing tools in said storage means and selecting and transporting tools by said transport means from said storage means to selected of said machine tools, said selecting and transporting of said tools being under the control of said control means.

181. The method according to claim 180 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

182. A method of machining, by means of a plurality of machine tools, a plurality of batches of different forms of workpieces requiring different machining operations, each batch comprising a plurality of workpieces of similar form, comprising:
   storing each workpiece in storage means so that each workpiece is selectively accessible;
   detecting when a machine tool has completed a machining operation on a particular workpiece and is ready to receive another workpiece;
   transporting said particular workpiece from said machine tool to a selected location in said storage means;
   transporting a selected further workpiece from said storage means to said machine tool; and
   machining further workpieces by following similar detecting and transporting steps in relation to appropriate workpieces and appropriate machine tools;
   said machining, storage and transporting operations being under the control of control means.

183. The method according to claim 182 wherein said workpieces are transported by transport means along a path from which there is access to said storage means and to each of said machine tools.

184. The method according to claim 183 further comprising storing tools in said storage means and selecting and transporting tools by said transport means from said storage means to selected of said machine tools, said selecting and transporting of said tools being under the control of said control means.

185. The method according to claim 184 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

186. A method of machining by means of a plurality of machine tools a source of workpieces, and common transport means for transporting workpieces between said source and said machine tools, a plurality of batches of different workpieces requiring different machining operations under the control of programmable control means, each batch comprising workpieces of a similar form, comprising:
   locating each workpiece at said source so that it is selectively accessible;
   detecting when a machine tool has completed a machining operation on a workpiece and is ready to receive a further workpiece;
   operating said common transport means to select and deliver a further workpiece from said source to said machine tool;
   operating said machine tool to perform the appropriate machining operation on said further workpiece;
   detecting when said machining operation on said further workpiece has been completed;
   operating said common transport means to remove said further workpiece from said machine tool; and
   proceeding in similar manner to machine still further workpieces by said machine tool and the other of said machine tools;
   the operation of said machine tools and said transport means being under the control of said control means.

187. The method according to claim 186 wherein said workpieces are transported by said common transport means along a path from which there is access to said source of workpieces and to each of said machine tools.

188. The method according to claim 187 wherein said workpieces are transported by said common transport means in both directions along said path.

189. The method according to claim 187 further comprising storing tools in a storage means and selecting and transporting tools by said transport means from said storage means to selected of said machine tools for use by said selected machine tools, said path having access to said storage means and said selecting and transporting of said tools being under the control of said control means.

190. The method according to claim 189 further comprising, after machining operations by selected machine tools, transporting tools by said transport means from said selected machine tools to said storage means; storing said tools in said storage means; and then selecting and transporting said tools by said transport means from said storage means to selected machine tools for use by said selected machine tools in further machining operations; said transporting, storing and selecting of said tools being under the control of said control means.

191. The process of producing engineering components from a plurality of workpieces of different forms by means of a plurality of complementary machine tools capable of performing different machining operations and adapted to use a series of selected tools, workpiece storage means, tool storage means, transport means to transport workpieces between said machine tools and said workpiece storage means and tools between said machine tools and said tool storage means, and programmable control means, the workpieces of different forms requiring different machining operations; said process comprising:
   (a) mounting each workpiece on a pallet adapted for locating said workpiece at each of said machine tools required for machining said workpiece;

(b) locating each pallet-mounted workpiece in said workpiece storage means, for the commencement of its machining sequence, so that each workpiece is selectively accessible;

(c) supplying tools to said tool storage means;

(d) selecting each of said pallet-mounted workpieces from said workpiece storage means and transporting each of said selected pallet-mounted workpieces between said workpiece storage means and selected of said machine tools;

(e) automatically and sequentially locating and securing each of said pallets at a predetermined location and attitude in each of said selected machine tools;

(f) withdrawing selected tools from said tool storage means and transporting and mounting said selected tools in each of said selected machine tools;

(g) machining said pallet-mounted workpieces at each of said selected machine tools;

(h) monitoring the location of each pallet-mounted workpiece during the various stages of its storage, transporting and machining sequence; and (i) dismounting each machined workpiece from its associated pallet after completion of said storage, transporting and machining sequence;

(j) the operating sequences of storage, selecting and transporting steps for each selected pallet-mounted workpiece and tool and the machining of each selected pallet-mounted workpiece being under the control of said control means, the operating sequences of workpieces of different forms being different.

192. The process of producing a plurality of different engineering components from workpieces of different forms by performance of operations thereon by means of a plurality of data-controlled machine tools each of which has automatic means for locating and securing thereon a workpiece, storage means having a plurality of locations for workpieces stored therein so that each workpiece is selectively accessible, transport means, and programmable control means, said machine tools being capable of performing different machining operations; said process comprising selecting each workpiece from a location in said storage means, transporting each selected workpiece by said transport means between said storage means and at least one preselected machine tool, automatically and sequentially locating and securing each of said workpieces at a predetermined location and attitude in each of said selected machine tools, and subsequently performing programmed operations on each of said workpieces in each of said selected machine tools while said workpiece is so located and secured therein, the operating sequence performed by said storage means, transport means and machine tools being under the control of said control means, the operating sequences of different workpieces, under the control of said control means, being different.

193. The process according to claim 192 wherein said workpieces are transported by said transport means along a path from which there is access to said storage means and to each of said machine tools.

194. The process according to claim 193 further comprising, after a machining operation on a workpiece by a selected machine tool has been completed, releasing said workpiece in said selected machine tool, transporting said workpiece by said transport means to said storage means, storing said workpiece so that said workpiece is selectively accessible, and then selecting and transporting said workpiece by said transport means from said storage means to a different selected machine tool, securing said workpiece at a predetermined location and attitude in said different selected machine tool, and subsequently performing further programmed machining operations on said workpiece in said different selected machine tool, said steps of transporting, storing and selecting said workpiece being under the control of said control means.

195. The process according to claim 192 further comprising locating a plurality of tools, for use by more than one of said plurality of machine tools, in said storage means; and selecting and transporting tools from said storage means to selected machine tools in accordance with tool requirements for machining operations by said selected machine tools; said selecting and transporting of tools being performed by said transport means and being under the control of said control means.

196. The process according to claim 195 wherein said workpieces and tools are transported by said transport means along a path from which there is access to said storage means and to each of said machine tools.

197. The process according to claim 196 further comprising, after machining operations by selected machine tools, transporting tools by said transport means from said selected machine tools to said storage means; storing said tools in said storage means; and selecting and transporting said tools by said transport means from said storage means to selected machine tools for use by said selected machine tools in further machining operations; said storing, selecting and transporting of said tools being under the control of said control means.

198. A method of machining a plurality of batches of different workpieces requiring different machining operations by a plurality of machine tools capable of performing different machining operations, each batch comprising workpieces of a similar form, comprising locating each workpiece for the commencement of its operating sequence; supplying a plurality of tools of different forms to a common tool store; entering into control means details of said workpieces in each batch, including at least one selected machining operation to be performed on each workpiece, whereby location of each workpiece at various stages of its operating sequence is automatically monitored by said control means; delivering selected workpieces to selected machine tools; selecting and withdrawing tools of different forms from said common tool store as required for said at least one selected machining operation to be performed on each of said selected workpieces of said batches; and delivering said selected tools to more than one of said selected machine tools for the performance of said selected machining operations thereby; the machining operations to be performed on said selected workpieces by a plurality of said selected machine tools, the delivery of said selected workpieces to said selected machine tools, the selection and withdrawal of selected tools from said common tool store, and the delivery of said selected tools to said selected of said machine tools by transport means for said selected machining operations to be performed on each of said selected workpieces while located at said selected machine tools, being under the control of said control means.

199. The method according to claim 198 wherein said tools are transported by said transport means along a path from which there is access to said common tool store and to each of said machine tools.

200. The method as claimed in claim 199 further comprising, after machining operations by selected machine tools, transporting said tools by said transport means from said selected machine tools to said common tool store; storing said tools in said common tool store; and then selecting and transporting said tools by said transport means from said common tool store to selected machine tools for use by said selected machine tools in further machining operations; said storing, selecting and transporting of said tools being under the control of said control means.

201. The method according to claim 198 further comprising locating each workpiece for the commencement of its operating sequence in workpiece storage means so that it is selectively accessible; and selecting each workpiece from said workpiece storage means, selecting tools from said common tool store, and transporting said selected workpieces and tools by said transport means to selected machine tools under the control of said control means.

202. The method according to claim 201 wherein said workpieces and tools are transported by said transport means along a path from which there is access to said workpiece storage means, to said common tool store, and to each of said machine tools.

203. The method according to claim 202 further comprising, after a machining operation on a workpiece by a machine tool has been completed, transporting said workpiece by said transport means from said machine tool to said workpiece storage means; storing said workpiece in said workpiece storage means so that it is selectively accessible; and then selecting and transporting said workpiece by said transport means from said workpiece storage means to a different selected machine tool; and performing a further machining operation on said workpiece at said different selected machine tool; said transporting, storing and selecting of said workpiece being under the control of said control means.

204. The method according to claim 203 further comprising, after machining operations by selected machine tools, transporting said tools by said transport means from said selected machine tools to said common tool store; storing said tools in said common tool store; and then selecting and transporting said tools by said transport means from said common tool store to selected machine tools for use by said selected machine tools in further machining operations; said storing, selecting and transporting of said tools being under the control of said control means.

205. The process of producing engineering components from a plurality of batches of different forms of workpieces by means of a machining system comprising a plurality of machine tools capable of performing different machining operations and adapted to use a series of selected tools, workpiece storage means adapted for storing a plurality of workpieces so that each workpiece is selectively accessible, central tool storage means, transport means to transport workpieces between a succession of said machine tools and said workpiece storage means and to transport tools between said machine tools and said tool storage means, and programmable control means, each batch comprising a plurality of workpieces requiring substantially the same machining operations and the workpieces of different batches requiring different machining operations, said process comprising:

locating each workpiece in said workpiece storage means so that each workpiece is selectively accessible;

supplying a plurality of tools to said tool storage means;

selecting each of said workpieces from said workpiece storage means and transporting each of said selected workpieces by said transport means between said workpiece storage means and selected of said machine tools;

selecting, withdrawing and transporting tools by said transport means from said tool storage means to selected machine tools and mounting said selected tools in said selected machine tools;

machining said selected workpieces at each of said selected machine tools; and monitoring the location of each workpiece during the various stages of its storage, transporting and machining sequence by periodically entering into said control means information relevant to each of said workpieces;

the operating sequence of storage, transporting and machining steps, including said selecting step, for each workpiece and of selecting, withdrawing, transporting and mounting steps for said tools being under the control of said control means, the workpieces of different batches being programmed to follow different operating sequences.

206. The process according to claim 205 wherein said workpieces and said tools are transported by said transport means along a path from which there is access to said workpiece storage means, tool storage means and each of said machine tools and said selecting and withdrawing of said tools from said tool storage means and said mounting of said tools in said selected machine tools is performed by said transport means, said selecting, withdrawing, transporting and mounting of tools being under the control of said control means.

207. The process according to claim 206 further comprising, after completion of a machining operation on a workpiece by one of said machine tools, transporting the incompletely machined workpiece by said transport means from said machine tool to said workpiece storage means; storing said incompletely machined workpiece so that it is selectively accessible; and then selecting said incompletely machined workpiece; transporting said incompletely machined workpiece by said transport means to a different selected machine tool and performing a further machining operation on said incompletely machined workpiece at said different selected machine tool; said transporting, storing and selecting of said workpiece being under the control of said control means.

208. The process according to claim 207 further comprising, after machining operations by selected machine tools, transporting tools by said transport means from said selected machine tools to said tool storage means; storing said tools in said tool storage means; and then selecting and transporting said tools by said transport means from said tool storage means to selected machine tools; and mounting said tools in said selected machine tools; said storing, selecting and transporting of said tools being under the control of said control means.

209. The process of producing engineering components from a plurality of batches of different forms of workpieces by means of a machining system comprising a plurality of machine tools capable of performing different machining operations, workpiece storage means for storing workpieces so that each workpiece is selectively accessible, a common tool store from which tools are drawn to be mounted in said machine tools and to which tools are returned from said machine tools, workpiece and tool transport means, and programmable control means, each batch comprising a plurality of workpieces requiring substantially the same machining operations and the workpieces of different batches requiring different machining operations; said process comprising:

locating each workpiece in said workpiece storage means, so that it is selectively accessible, for the commencement of its operating sequence;

locating a plurality of tools in said common tool store;

selecting and transporting each workpiece by said transport means between said workpiece storage means and predetermined machine tools;

selecting and transporting tools by said transport means between said common tool store and selected of said machine tools;

monitoring the location of each workpiece at the various stages of its operating sequence by periodically entering into said control means information relevant to each workpiece;

monitoring the location of said tools by periodically entering into said control means information relevant to said tools; and replacing defective tools in said common tool store;

the schedule of operating sequences of selecting, transporting and machining of all of said workpieces and the selecting and transporting of tools being under the control of said control means to optimize substantially the overall use of machine tool time.

210. The process according to claim 209 wherein said workpieces and tools are transported by said transport means along a path from which there is access to said workpiece storage means, to said common tool store, and to each of said machine tools.

211. The process according to claim 210 comprising selecting and transporting said tools from said common tool store by said transport means to selected machine tools for use in machining operations; after machining operations by said selected machine tools, transporting said tools by said transport means from said machine tools to said common tool store; storing said tools in said common tool store; and then selecting and transporting said tools by said transport means from said common tool store to selected machine tools for use by said selected machine tools in further machining operations; said transporting, storing and selecting of said tools being under the control of said control means.

212. The process of producing engineering components from a plurality of batches of different forms of workpieces by means of a machining system comprising a plurality of machine tools capable of performing different machining operations, workpiece storage means for storing workpieces so that each workpiece is selectively accessible, a common tool store from which tools are drawn to be mounted in said machine tools and to which tools are returned from said machine tools, transport means for transporting said workpieces between said workpiece storage means and said machine tools and for transporting said tools between said common tool store and said machine tools, and programmable control means, each batch comprising a plurality of workpieces requiring substantially the same machining operations and the workpieces of different batches requiring different machining operations; said process comprising:

locating each workpiece in said workpiece storage means, so that it is selectively accessible, for the commencement of its operating sequence;

locating a plurality of tools in said common tool store;

selecting and transporting each workpiece by said transport means from said workpiece storage means to at least one predetermined machine tool;

selecting and transporting tools by said transport means between said common tool store and selected of said machine tools; and monitoring the location of each workpiece at the various stages of its operating sequence by periodically entering into said control means information relevant to each workpiece:

the machining operations performed on said workpieces by said plurality of machine tools and the transporting of said workpieces being under the control of said control means.

213. The process according to claim 212 wherein the selection of tools for each particular machining operation and the transporting of said selected tools by said transport means is under the control of said control means.

214. The process according to claim 213 wherein said workpieces and tools are transported by said transport means along a path from which there is access to said workpiece storage means, to said common tool store, and to each of said machine tools.

215. The process according to claim 214 comprising selecting and transporting said tools by said transport means from said common tool store to selected machine tools for used in machining operations; after machining operations by selected machine tools, transporting said tools by said transport means from said selected machine tools to said common tool store; storing said tools in said common tool store; and then selecting and transporting said tools by said transport means from said common tool store to selected machine tools for use by said selected machine tools in further machining operations; said transporting, storing and selecting of said tools being under the control of said control means.

216. A method of machining a plurality of batches of different forms of workpieces requiring different machining operations from a plurality of machine tools capable of performing different machining operations, each batch comprising a plurality of workpieces of similar form, comprising locating each workpiece in workpiece storage means, so that it is selectively accessible, for the commencement of its operating sequence; entering into control means details of each workpiece whereby the location of said workpiece at various stages of its operating sequence is monitored by said control means; selecting and transporting each of said workpieces from said workpiece storage means to at least one of said machine tools in accordance with its operating sequence; supplying a plurality of tools to tool storage means; and selecting and transporting tools from said tool storage means to selected machine tools for the performance of said machining operations; the operating sequence of selecting, transporting and machining steps for each workpiece and of selecting and transporting of tools being under the control of said control means, the operating sequences of different workpieces being different.

217. The method according to claim 216 wherein said workpieces are transported between said workpiece storage means and said machine tools and said tools are transported between said tool storage means and said machine tools by a common transport means.

218. The method according to claim 217 wherein said workpieces and tools are transported by said transport means along a path from which there is access to said workpiece storage means, to said tool storage means and to each of said machine tools.

219. The method according to claim 218 wherein the different operating sequences for different workpieces require the utilization of different tools by said machine tools.

220. The method according to claim 219 further comprising, after completion of a machining operation by a machine tool, transporting an incompletely machined workpiece by said transport means from said machine tool to said workpiece storage means; storing said incompletely machined workpiece in said workpiece storage means so that it is selectively accessible; and then selecting and transporting said incompletely machined workpiece by said transport means from said workpiece storage means to a different selected machine tool; and performing a further machining operation on said incompletely machined workpiece at said different selected machine tool; said transporting, storing and selecting of said workpiece being under the control of said control means.

221. The method according to claim 220 further comprising, after machining operations by selected machine tools, transporting tools by said transport means from said selected machine tools to said tool storage means; storing said tools in said tool storage means; and then selecting and transporting said tools from said tool storage means to selected machine tools for use by said selected machine tools in further machining operations; said transporting, storing and selecting of said tools being under the control of said control means.

222. A method of machining a plurality of batches of different workpieces requiring different machining operations from a plurality of machine tools capable of performing different machining operations, each batch comprising workpieces of a similar form, comprising locating each workpiece in workpiece storage means, so that it is selectively accessible, for the commencement of its operating sequence; entering into programmable control means details of the workpiece whereby location of each workpiece at various stages of its operating sequence is monitored by said control means; selecting and transporting each of said workpieces from said workpiece storage means to at least one of said machine tools in accordance with its operating sequence; supplying a plurality of tools to a common tool store; entering into said control means the location and type designation of said plurality of tools at said common tool store for supplying tools to more than one of said machine tools; and selecting and transporting tools from said common tool store to selected machine tools for the performance of said machining operations; the operating sequences for all of said workpieces and the selecting and transporting of said tools from said common tool store for selected machining operations being under the control of said control means.

223. The method according to claim 222 wherein said workpieces are transported between said workpiece storage means and said machine tools and said tools are transported between said tool storage means and said machine tools by a common transport means.

224. The method according to claim 223 wherein said workpieces and tools are transported by said transport means along a path from which there is access to said workpiece storage means, to said tool storage means to each of said machine tools.

225. The method according to claim 224 further comprising, after a machining operation on a workpiece by a machine tool has been completed, transporting said workpiece by said transport means from said machine tool to said workpiece storage means; storing said workpiece in said workpiece storage means so that it is selectively accessible; and then selecting and transporting said workpiece by said transport means from said workpiece storage means to a different selected machine tool; and performing a further machining operation on said workpiece in said different selected machine tool; said transporting, storing and selecting of said workpiece being under the control of said control means.

226. The method according to claim 225 further comprising, after machining operations by selected machine tools, transporting tools by said transport means from said selected machine tools to said tool storage means; storing said tools in said tool storage means; and then selecting and transporting said tools by said transport means from said tool storage means to selected machine tools for use by said selected machine tools in further machining operations; said transporting, storing and selecting of said tools being under the control of said control means.

227. A method of machining a plurality of batches of different workpieces requiring different machining operations by a plurality of machine tools capable of performing different machining operations, each batch comprising workpieces of a similar form, comprising locating each workpiece in workpiece storage means, so that it is selectively accessible, for the commencement of its operating sequence; entering into control means details of each workpiece whereby the location of said workpiece at various stages of its operating sequence is automatically monitored by said control means; selecting and transporting each of said workpieces from said workpiece storage means to at least one of said machine tools in accordance with its operating sequence; supplying a plurality of tools to tool storage means; and selecting and transporting tools from said tool storage means to selected machine tools for the performance of said machining operations; the machining operations to be performed on said workpieces by a plurality of said machine tools and the selection and withdrawal of selected tools from said tool storage means, for delivery to selected of said machine tools by transport means, being under the control of said control means.

228. The method according to claim 227 wherein said workpieces and tools are transported by said transport means along a path from which there is access to said workpiece storage means, to said common tool store, and to each of said machine tools.

229. The process according to claim 228 comprising, after machining operations by selected machine tools, transporting tools by said transport means from said selected machine tools to said common tool store; storing said tools in said common tool store; and then selecting and transporting said tools by said transport means for use by said selected machine tools in further machining operations; said transporting, storing and selecting of said tools being under the control of said control means.

230. A method of machining by means of a plurality of machine tools, a source of workpieces arranged to store said workpieces so that each workpiece is selectively accessible, a central tool store for storing and supplying tools to more than one of said machine tools, and common transport means for transporting workpieces between said source and said machine tools; a plurality of batches of different workpieces requiring different machining operations under the control of programmable control means, each batch comprising workpieces of a similar form, comprising:

locating each workpiece at said source so that it is selectively accessible;

transporting selected tools from said central tool store to selected machine tools for use in machining operations thereby;

detecting when a machine tool has completed a machining operation on a workpiece and is ready to receive a further workpiece;

operating said common transport means to select and deliver a further workpiece to said machine tool from said source of workpieces;

operating said machine tool to perform the appropriate machining operation on said further workpiece;

detecting when said machining operation on said further workpiece has been completed;

operating said common transport means to remove said further workpiece from said machine tool; and proceeding in similar manner to machine still further workpieces by said machine tool and the other of said machine tools;

the transport of tools from said central tool store and the operation of said machine tools and said transport means being under the control of said control means.

231. The method according to claim 230 wherein said workpieces and tools are transported by said common transport means along a path from which there is access to said source of workpieces, to said central tool store, and to each of said machine tools.

232. The method according to claim 231 further comprising, after machining operations by selected machine tools, transporting said tools by said transport means from said selected machine tools to said central tool store; storing said tools in said central tool store; and then selecting and transporting said tools by said transport means from said central tool store to selected machine tools for use by said selected machine tools in further machining operations; said transporting, storing and selecting of said tools being performed by said transport means and being under the control of said control means.

233. A method of machining, by means of a plurality of machine tools, a plurality of batches of workpieces, each batch consisting of a plurality of workpieces of similar form and requiring similar machining operations, the workpieces of different batches being of different form and requiring different machining operations; said method comprising storing said workpieces of different forms in storage means so that each workpiece is selectively accessible; selecting each workpiece from said storage means; transporting each said selected workpiece by transport means between said storage means and at least one selected machine tool; selecting the program required for a selected workpiece delivered to a selected machine tool; and performing the programmed machining operation on said selected workpiece while located at said selected machine tool; said selecting of workpieces and transporting of said selected workpieces being under the control of control means; at least a portion of said workpieces being subjected to different sequences of storing, transporting and machining steps to minimize the time required for machining all of said workpieces.

234. A process for producing engineering components from workpieces by the removal of material therefrom by means of a plurality of data-controlled machine tools, each of which has automatic means for locating and securing therein a workpiece, said machine tools being capable of performing different machining operations on the workpieces; said process comprising delivering each workpiece to storage means and storing each of said delivered workpieces so that it is selectively accessible; selecting each workpiece from said storage means; presenting each of said selected workpieces to at least one selected of said machine tools; automatically locating and securing each of said selected workpieces at a predetermined location and attitude in said at least one selected of said machine tools; and subsequently performing programmed machining operations on each of said selected workpieces in the respective of said at least one selected of said machine tools while said selected workpieces are located and secured therein.

235. The process according to claim 234 further comprising automatically detecting the identity of each of said selected workpieces presented to the respective of said at least one selected of said machine tools and, in response to said detecting, automatically performing the respective of said programmed machining operations on said selected workpiece by said respective of said at least one selected of said machine tools.

236. A method of machining, by means of a plurality of machine tools, a plurality of batches of different forms of workpieces requiring different machining operations, each batch comprising a plurality of workpieces of similar form; comprising:

storing each workpiece in storage means so that it is selectively accessible;

detecting when a machine tool has completed a machining operation on a particular workpiece and is ready to receive another workpiece;

transporting said particular workpiece from said machine tool;

selecting a further workpiece from said storage means and transporting said selected further workpiece from said storage means to said machine tool; and machining further workpieces by following similar detecting and transporting steps in relation to appropriate workpieces and appropriate machine tools;

said transporting operations being under the control of central control means and said machine tools each being operated by programmable means for performing an appropriate machining operation on each workpiece transported thereto.

237. The method according to claim 236 wherein each of said machine tools is operated by programmable means at the respective machine tool.

238. The process according to any of claims 1, 12, 22, 29, 35, 40, 45, 50, 55, 60, 65, 73, 79, 86, 191, 192, 205, 209, 212 or 234 including the step of passing at least some workpieces through inspection means and checking the accuracy of the machining operations performed on said at least some of said workpieces.

239. The method according to any of claims 94, 106, 111, 116, 122, 127, 132, 140, 151, 158, 167, 169, 179, 182, 186, 203, 220, 225, 227, 230, 233 or 236 including the step of passing at least some workpieces through inspection means and checking the accuracy of the machining operations performed on said at least some of said workpieces.

240. The process according to any of claims 1, 12, 22, 24, 35, 40, 45, 50, 55, 60, 65, 73, 79, 86, 191, 192, 205, 209, 212 or 234 including the step, after at least one machining operation on each of at least some of said workpieces has been completed and before commencement of a further machining operation on said workpiece, of passing said at least some of said workpieces through inspection means and checking the accuracy of the machining operations performed on said at least some of said workpieces.

241. The method according to any of claims 94, 106, 111, 116, 122, 127, 132, 140, 151, 158, 167, 169, 179, 182, 186, 203, 220, 225, 227, 230, 233 or 236 including the step, after at least one machining operation on each of at least some of said workpieces has been completed and before commencement of a further machining operation on said workpiece, of passing said at least some of said workpieces through inspection means and checking the accuracy of the machining operations performed on said at least some of said workpieces.

242. The process according to any of claims 1, 12, 22, 24, 35, 40, 45, 50, 55, 60, 65, 73, 79, 86, 191, 192, 205, 209, 212 or 234 including the step, after at least one machining operation on each of at least some of said workpieces has been completed, of passing said at least some of said workpieces through cleaning means and removing swarf from said at least some of said workpieces.

243. The method according to any of claims 94, 106, 111, 116, 122, 127, 132, 140, 151, 158, 167, 169, 179, 182, 186, 203, 220, 225, 227, 230, 233 or 236 including the step, after at least one machining operation on each of at least some of said workpieces has been completed, of passing said at least some of said workpieces through cleaning means and removing swarf from said at least some of said workpieces.

244. The method according to any of claims 104, 155, 162, 177, 182, 198, 216 or 197 in which said control means comprises central control means and program storage means associated with each machine tool, said method comprising selecting, from said program storage means, programs for said selected machining operations by said selected machine tools.

* * * * *